US010547520B2

(12) United States Patent
Cimprich et al.

(10) Patent No.: US 10,547,520 B2
(45) Date of Patent: Jan. 28, 2020

(54) MULTI-CLOUD PROVISIONING ARCHITECTURE WITH TEMPLATE AGGREGATION

(71) Applicant: Accenture Global Services Limited, Dublin (IE)

(72) Inventors: Patrick Francis Cimprich, Bellevue, WA (US); Michael Gerald DeLuca, Redwood City, CA (US); Jack Q. W. Cantwell, Bainbridge Island, WA (US); Sean David Peterson, Arlington, TX (US); Marshall J. Wells, Pleasant Hill, CA (US)

(73) Assignee: Accenture Global Services Limited, Dublin (IE)

( * ) Notice: Subject to any disclaimer, the term of this patent is extended or adjusted under 35 U.S.C. 154(b) by 1029 days.

(21) Appl. No.: 14/832,652

(22) Filed: Aug. 21, 2015

(65) Prior Publication Data
US 2016/0164753 A1 Jun. 9, 2016

Related U.S. Application Data

(60) Provisional application No. 62/088,474, filed on Dec. 5, 2014.

(51) Int. Cl.
*H04L 12/24* (2006.01)
*G06F 9/50* (2006.01)
(Continued)

(52) U.S. Cl.
CPC ........ *H04L 41/5048* (2013.01); *G06F 9/5011* (2013.01); *G06F 9/5072* (2013.01);
(Continued)

(58) Field of Classification Search
None
See application file for complete search history.

(56) References Cited

U.S. PATENT DOCUMENTS 6,070,190 A    5/2000  Reps et al.
6,510,434 B1   1/2003  Anderson et al.
(Continued)

FOREIGN PATENT DOCUMENTS

WO   WO 2010035281 A1   4/2010
WO   WO 2012/021324 A2  2/2012

OTHER PUBLICATIONS

Non-Final Rejection, U.S. Appl. No. 14/832,679, dated Mar. 29, 2018, pp. 1-15.
(Continued)

*Primary Examiner* — Kevin T Bates
*Assistant Examiner* — Ronak Patel
(74) *Attorney, Agent, or Firm* — Brinks Gilson & Lione

(57) ABSTRACT

Provisioning resources into the cloud is a constantly increasing technical challenge as more cloud service providers emerge, each offering disparate computing platforms, services, assets, supported technical components, and other features. A cloud computing provisioning architecture implements a sequence of complex technical analyses that successfully provisions complex cloud computing services. The provisioning architecture disaggregates resources into individual provisioning actions, and also selectively re-aggregates the resources into template blocks which a service provider accepts for native provisioning.

20 Claims, 45 Drawing Sheets

(51) Int. Cl.
*H04L 29/08* (2006.01)
*H04L 12/911* (2013.01)
*H04L 12/807* (2013.01)
*H04L 12/721* (2013.01)
*H04L 12/927* (2013.01)

(52) U.S. Cl.
CPC .......... *G06F 9/5077* (2013.01); *H04L 41/022* (2013.01); *H04L 41/082* (2013.01); *H04L 41/0806* (2013.01); *H04L 41/14* (2013.01); *H04L 41/145* (2013.01); *H04L 45/40* (2013.01); *H04L 47/27* (2013.01); *H04L 47/70* (2013.01); *H04L 47/808* (2013.01); *H04L 67/02* (2013.01); *H04L 67/10* (2013.01); *H04L 67/1097* (2013.01); *H04L 67/16* (2013.01); *H04L 67/2823* (2013.01)

(56) References Cited

U.S. PATENT DOCUMENTS

| | | | |
|---|---|---|---|
| 6,725,378 B1 | 4/2004 | Schuba | |
| 6,925,642 B1 | 8/2005 | Commander | |
| 6,963,828 B1 | 11/2005 | McDonald | |
| 7,249,176 B1 | 7/2007 | Salas et al. | |
| 7,376,693 B2 | 5/2008 | Neiman et al. | |
| 7,529,867 B2 | 5/2009 | McCrory et al. | |
| 7,668,703 B1 | 2/2010 | Rolia | |
| 7,747,750 B1 | 6/2010 | Simon et al. | |
| 7,987,262 B2 | 7/2011 | Tung et al. | |
| 8,117,314 B2 | 2/2012 | Croft et al. | |
| 8,250,213 B2 * | 8/2012 | Glover | H04L 47/781 709/220 |
| 8,261,265 B2 | 9/2012 | Chen et al. | |
| 8,341,270 B2 | 12/2012 | Mazzaferri et al. | |
| 8,484,355 B1 | 7/2013 | Lochhead et al. | |
| 8,838,748 B2 | 9/2014 | Nair et al. | |
| 8,886,806 B2 | 11/2014 | Tung et al. | |
| 8,904,395 B2 | 12/2014 | Biran et al. | |
| 9,137,110 B1 | 9/2015 | Adogla et al. | |
| 9,154,589 B1 | 10/2015 | Klein et al. | |
| 9,256,467 B1 | 2/2016 | Singh et al. | |
| 9,256,908 B2 * | 2/2016 | Dai | G06Q 50/06 |
| 9,351,218 B2 * | 5/2016 | Oh | H04W 36/245 |
| 9,467,393 B2 | 10/2016 | Cimprich et al. | |
| 9,658,878 B2 | 5/2017 | Ports et al. | |
| 9,667,643 B2 | 5/2017 | Cotton et al. | |
| 9,674,343 B2 * | 6/2017 | Foladare | H04M 3/42 |
| 9,749,218 B1 | 8/2017 | Felstaine et al. | |
| 9,754,303 B1 * | 9/2017 | Jagtap | G06Q 30/0631 |
| 9,934,269 B1 * | 4/2018 | Kahrs | G06F 17/30412 |
| 10,033,597 B2 | 7/2018 | Cimprich et al. | |
| 10,033,598 B2 | 7/2018 | Cimprich et al. | |
| 2002/0059425 A1 | 5/2002 | Belfiore et al. | |
| 2002/0087487 A1 | 7/2002 | Hassinger | |
| 2002/0194323 A1 | 12/2002 | Chantrain et al. | |
| 2003/0200300 A1 | 10/2003 | Melchione | |
| 2004/0006589 A1 | 1/2004 | Maconi et al. | |
| 2004/0111506 A1 | 6/2004 | Kundu | |
| 2004/0243699 A1 | 12/2004 | Koclanes et al. | |
| 2005/0027870 A1 | 2/2005 | Trebes, Jr. | |
| 2005/0038834 A1 | 2/2005 | Souder et al. | |
| 2005/0044220 A1 | 2/2005 | Madhavan | |
| 2005/0050070 A1 | 3/2005 | Sheldon | |
| 2005/0080838 A1 | 4/2005 | Colby et al. | |
| 2005/0138175 A1 | 6/2005 | Kumar et al. | |
| 2005/0154735 A1 | 7/2005 | Breh et al. | |
| 2005/0267892 A1 | 12/2005 | Patrick et al. | |
| 2006/0106866 A1 | 5/2006 | Green et al. | |
| 2006/0143220 A1 | 6/2006 | Spencer | |
| 2006/0153090 A1 | 7/2006 | Bishop | |
| 2006/0227810 A1 | 10/2006 | Childress et al. | |
| 2007/0043860 A1 | 2/2007 | Pabari | |
| 2007/0078960 A1 | 4/2007 | Dawson et al. | |
| 2007/0121152 A1 | 5/2007 | CupChoy et al. | |
| 2007/0174101 A1 | 7/2007 | Li et al. | |
| 2007/0242493 A1 | 10/2007 | Kuliyampattil et al. | |
| 2007/0294364 A1 | 12/2007 | Mohindra et al. | |
| 2008/0033785 A1 | 2/2008 | Anke | |
| 2008/0091806 A1 | 4/2008 | Shen | |
| 2008/0104244 A1 * | 5/2008 | Chen | H04L 67/16 709/226 |
| 2008/0114624 A1 | 5/2008 | Kitts | |
| 2008/0120129 A1 | 5/2008 | Seubert et al. | |
| 2008/0160966 A1 * | 7/2008 | McKiou | H04M 3/487 455/414.1 |
| 2008/0244233 A1 | 10/2008 | Wilson | |
| 2008/0244579 A1 | 10/2008 | Muller | |
| 2008/0250267 A1 | 10/2008 | Brown | |
| 2009/0083390 A1 | 3/2009 | Abu-Ghazaleh et al. | |
| 2009/0276771 A1 | 11/2009 | Nickolov et al. | |
| 2009/0300210 A1 | 12/2009 | Ferris | |
| 2009/0327495 A1 | 12/2009 | Betts-LaCroix et al. | |
| 2010/0005443 A1 * | 1/2010 | Kwok | G06Q 10/10 717/100 |
| 2010/0042720 A1 | 2/2010 | Stienhans et al. | |
| 2010/0058334 A1 | 3/2010 | Mohindra et al. | |
| 2010/0100879 A1 * | 4/2010 | Katiyar | G06F 8/20 718/1 |
| 2010/0125473 A1 | 5/2010 | Tung et al. | |
| 2010/0217864 A1 | 8/2010 | Ferris | |
| 2010/0226346 A1 * | 9/2010 | Caldwell | H04M 15/00 370/338 |
| 2010/0306377 A1 | 12/2010 | DeHann et al. | |
| 2010/0332617 A1 | 12/2010 | Goodwin et al. | |
| 2011/0022812 A1 | 1/2011 | van der Linden et al. | |
| 2011/0055385 A1 | 3/2011 | Tung et al. | |
| 2011/0060832 A1 | 3/2011 | Govil et al. | |
| 2011/0087776 A1 | 4/2011 | Tabone et al. | |
| 2011/0087783 A1 | 4/2011 | Annapureddy et al. | |
| 2011/0131306 A1 | 6/2011 | Ferris et al. | |
| 2011/0153727 A1 | 6/2011 | Li | |
| 2011/0166952 A1 | 7/2011 | Manchikanti | |
| 2011/0191838 A1 | 8/2011 | Yanagihara | |
| 2011/0252420 A1 | 10/2011 | Tung et al. | |
| 2011/0265087 A1 | 10/2011 | Chen et al. | |
| 2011/0296021 A1 | 12/2011 | Dorai et al. | |
| 2012/0030182 A1 | 2/2012 | Claman et al. | |
| 2012/0030356 A1 | 2/2012 | Fletcher | |
| 2012/0072581 A1 | 3/2012 | Tung et al. | |
| 2012/0084357 A1 | 4/2012 | Richards et al. | |
| 2012/0124211 A1 | 5/2012 | Kampas et al. | |
| 2012/0158920 A1 * | 6/2012 | Yang | G06F 8/61 709/220 |
| 2012/0226799 A1 | 9/2012 | Kapur et al. | |
| 2012/0239372 A1 | 9/2012 | Kruus | |
| 2012/0265569 A1 * | 10/2012 | Gonzalez-Diaz | G06Q 10/0631 705/7.12 |
| 2012/0272249 A1 * | 10/2012 | Beaty | G06F 9/5083 719/318 |
| 2012/0293605 A1 | 11/2012 | Seferian et al. | |
| 2012/0311106 A1 | 12/2012 | Edwin | |
| 2012/0311157 A1 | 12/2012 | Erickson et al. | |
| 2013/0041711 A1 | 2/2013 | Girard et al. | |
| 2013/0160010 A1 | 6/2013 | Park et al. | |
| 2013/0212129 A1 * | 8/2013 | Lawson | G05B 19/4185 707/779 |
| 2013/0219211 A1 | 8/2013 | Gopinath et al. | |
| 2013/0238788 A1 | 9/2013 | Caminiti et al. | |
| 2013/0254634 A1 | 9/2013 | Luby et al. | |
| 2013/0263209 A1 * | 10/2013 | Panuganty | H04L 43/04 726/1 |
| 2013/0304903 A1 | 11/2013 | Mick et al. | |
| 2014/0007086 A1 | 1/2014 | Ross et al. | |
| 2014/0033268 A1 * | 1/2014 | Julisch | H04L 63/20 726/1 |
| 2014/0068713 A1 | 3/2014 | Nicholson et al. | |
| 2014/0172782 A1 | 6/2014 | Schuenzel et al. | |
| 2014/0258450 A1 | 9/2014 | Suryanarayanan et al. | |
| 2015/0074659 A1 * | 3/2015 | Madsen | G06F 8/61 717/177 |
| 2015/0180730 A1 | 6/2015 | Felstaine et al. | |

(56) References Cited

U.S. PATENT DOCUMENTS

| | | | | |
|---|---|---|---|---|
| 2015/0378703 | A1* | 12/2015 | Govindaraju | G06F 8/60 717/174 |
| 2016/0127418 | A1* | 5/2016 | Maes | H04L 41/5048 726/1 |
| 2016/0139949 | A1 | 5/2016 | Jagannath et al. | |
| 2016/0216991 | A1* | 7/2016 | Ansari | G06F 9/45558 |
| 2016/0254965 | A1* | 9/2016 | Maes | H04L 67/10 709/223 |
| 2016/0306333 | A1 | 10/2016 | Shimizu et al. | |
| 2016/0357610 | A1* | 12/2016 | Bartfai-Walcott | G06F 9/5027 |

OTHER PUBLICATIONS

Buyya, et al., "Market-Oriented Cloud Computing Vision, Hype and Reality for Delivering IT Services as Computing Utilities," High Performance Computing and Communications, Sep. 25, 2008, pp. 5-13, HPCC 08, 10$^{th}$ IEEE International Conference, Piscataway, New Jersey.

Prodan, et al., "A Survey and Taxonomy of Infrastructure as a Service and Web Hosting Cloud Providers," Oct. 13, 2008, pp. 17-25, 10$^{th}$ IEEE International Conference on Grid Computing, Piscataway, New Jersey.

Qian, et al., "Cloud Computing: An Overview," Jan. 1, 2009, pp. 626-631, Cloud Computing, vol. 5931, Springer-Verlag GmbH, Germany.

Vecchiola, et al., "Aneka: A Software Platform for .NET-based Cloud Computing," 2009, pp. 1-30, IOS Press, Fairfax, Virginia.

Tag Instances, https://elasticbox.com/documentation/managing-your-organization/resource-tags/, downloaded Jul. 20, 2015, pp. 1-8, ElasticBox, Inc., San Francisco, California.

Hector Fernandez, Surprised by your Cloud Bill every month? Try Cross-Cloud Tagging, Oct. 23, 2014, pp. 1-3, ElasticBox, Inc., San Francisco, California.

Cisco Prime Service Catalog 10.1 Adapter Integration Guide, Nov. 2014, pp. 1-364, Cisco Systems, Inc., San Jose, California.

Designing Integrations with Service Link Standard Adapters, Chapter 4, Cisco Prime Service Catalog 10.1 Adapter Integration Guide, Nov. 2014, pp. 1-72, Cisco Systems, Inc., San Jose, California.

Final Rejection, U.S. Appl. No. 14/832,598 dated Dec. 12, 2017, pp. 1-19.

Non-Final Rejection, U.S. Appl. No. 15/343,324, dated Sep. 8, 2017, pp. 1-13.

Non-Final Rejection, U.S. Appl. No. 15/343,307, dated Dec. 13, 2017, pp. 1-15.

Final Rejection, U.S. Appl. No. 14/832,679, dated Nov. 28, 2017, pp. 1-15.

Notice of Allowance, U.S. Appl. No. 14/832,516, dated Jul. 17, 2017, pp. 1-16.

Notice of Allowance, U.S. Appl. No. 14/832,548, dated Jul. 19, 2017, pp. 1-12.

Extended European Search Report, EP App. No. 17152091.9 dated Apr. 24, 2017, pp. 1-10.

Examination Report, EP Appl. No. 16165962.8, dated Feb. 9, 2017, pp. 1-3.

Extended European Search Report, EP App. No. 16165962.8 dated Aug. 4, 2016, pp. 1-5.

Extended European Search Report, EP App. No. 16165967.7 dated Aug. 4, 2016, pp. 1-5.

Examination Report, EP Appl. No. 16165967.7, dated Feb. 9, 2017, pp. 1-3.

Non-Final Rejection, U.S. Appl. No. 14/832,679, dated Jun. 13, 2017, pp. 1-10.

Non-Final Rejection, U.S. Appl. No. 14/832,548, dated Feb. 24, 2017, pp. 113.

Notice of Allowance, U.S. Appl. No. 14/832,548, dated Jun. 14, 2017, pp. 1-12.

Non-Final Rejection, U.S. Appl. No. 14/832,598, dated Jul. 5, 2017, pp. 1-18.

Notice of Allowance, U.S. Appl. No. 15/066,541, dated Aug. 9, 2016, pp. 1-12.

International Search Report. App. No. PCT/EP2015/078653 dated Feb. 15, 2016, pp. 1-13.

Naik, et al., Architecture for Service Request Driven Solution Delivery Using Grid Systems, 2006, pp. 1-9, IEEE International Conference on Services Computing, Piscataway, New Jersey.

Non-Final Rejection, U.S. Appl. No. 14/832,458, dated Mar. 19, 2018, pp. 1-26.

Australia Patent Office, Examination Report No. 1, from Australia Patent Application No. 2015357043, dated Aug. 23, 2017, pp. 1-11.

Australia Patent Office, Examination Report No. 2 from Australian Patent Application No. 2015357043 dated Jan. 30, 2018, pp. 1-5.

Examination Report No. 1 for Australia Application No. 2018220059, dated Dec. 14, 2018, pp. 1-9.

Final Rejection, U.S. Appl. No. 14/832,458, dated Oct. 15, 2018, pp. 1-29.

Notice of Allowance, dated Jul. 13, 2018, pp. 1-17, issued in U.S. Appl. No. 14/832,598, U.S. Patent and Trademark Office, Alexandria, VA.

Examination Report No. 3 issued in Australian Application No. 2015357043, dated Aug. 6, 2018, pp. 1-7, IP Australia, Phillip, Australia.

* cited by examiner

300

| Type Table | 302 |
|---|---|
| Type Name 304 | Type Identifier 306 |
| Blue VM | 2 |
| Green VM | 3 |
| Black VM | 4 |
| Red VM | 5 |

•
•
•

| Type Properties | | | 320 |
|---|---|---|---|
| Property Identifier | Property 322 | Type Identifier 324 | Property Type 326 |
| 1 | VM Name | 5 | 0 |
| 2 | Processors | 5 | 0 |
| 3 | RAM | 5 | 0 |
| 4 | Disk Size | 5 | 0 |
| 5 | OS Disk | 5 | 0 |
| 6 | Identifier | 2 | 0 |
| 7 | Size | 2 | 0 |
| 8 | OS Disk | 2 | 2 |
| 9 | Network Name | 2 | 1 |

•
•
•

500

| Asset Equivalence | 502 |
|---|---|
| 1 | |
| 2 | |
| 3 | |
| 4 | |

•
•
•

| Asset Table | | 504 |
|---|---|---|
| Asset ID | Asset Equivalence ID  506 | Asset Name  508 |
| 1 | 1 | Disk A-27.vhd |
| 2 | 1 | abc.ami |
| 3 | 1 | GUID3 |

•
•
•

| Networks | 520 |
|---|---|
| Parent Network A | |
| Network 1 | Blue |
| Network 2 | Green |
| Network 3 | Red |
| Parent Network B | |

| Input Table | | 702 |
|---|---|---|
| Trans ID 708 | Input Property ID 710 | Input Parameter Name 712 |
| 1 | 1 | NULL |
| 2 | 2 | Procs |
| 2 | 3 | RAM |
| 3 | 6 | NULL |
| 4 | 7 | SizeInput |

•
•
•

| Translation Table | | 704 |
|---|---|---|
| Trans ID 714 | Path | 716 |
| 1 | | NULL |
| 2 | | script1 |
| 3 | | NULL |
| 4 | | script2 |

•
•
•

| Output Table | | 706 |
|---|---|---|
| Trans ID 718 | Output ID | 720 |
| 1 | | 6 |
| 2 | | 7 |
| 3 | | 1 |
| 4 | | 2 |
| 4 | | 3 |

```
"resources":
    [/*VirtualMachineDefinition*/{

"apiVersion": "2014-08-07-alpha",
        "type": "Compute/virtualMachines",
        "name": "Dev001",
        "location": [parameter (vmLocation)],
        "properties": {

"hardwareProfile": {

"vmSize": "Standard_A0"
            },

"osProfile": {

"computername": "Dev001.gmd.lab",
                "adminUsername": "gmd\****",
                "adminPassword": "****"
            }, "storageProfile": {

"sourceImage": {

"id": "/2ag9-dd3rr-2g/services/images/windowsserver2012.vhd"
                },

"destinationVhdsContainer": "http://shashblob.net/shashcontainer"
            }, "networkProfile": {

"networkInterfaces": [{

"name": "corpnet-001",
                    "properties": {

"ipConfigurations": [{

"name": "IPConfig",
                            "publicIPAddress": {

"id": "xyz"
                            }
                        }]
                    }
                }]
            }
        }
    }]
```

Figure 38

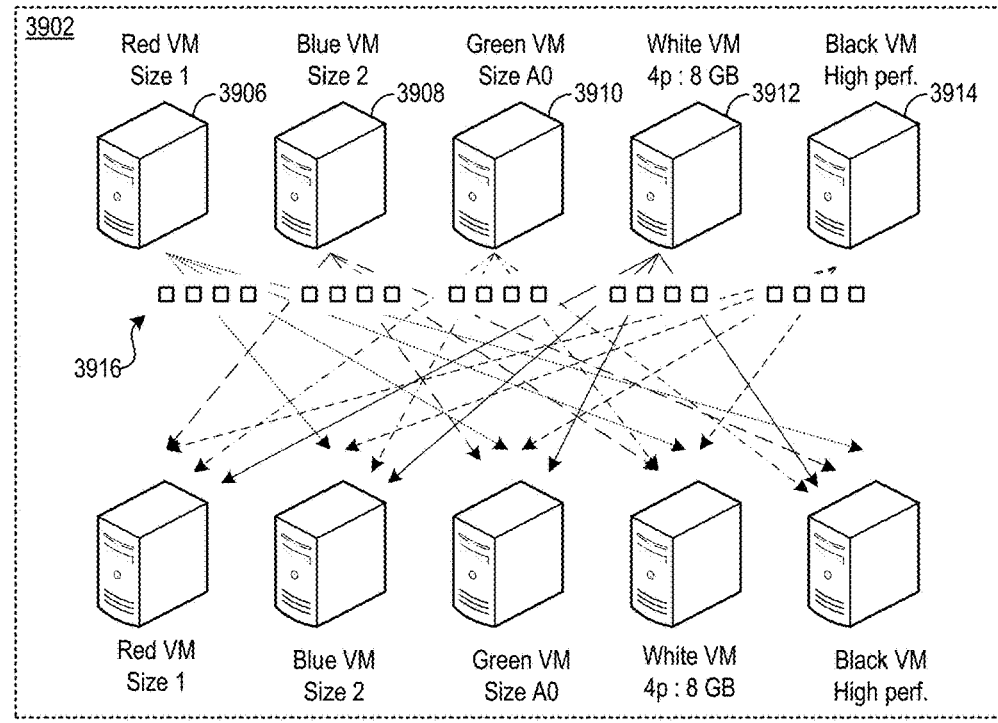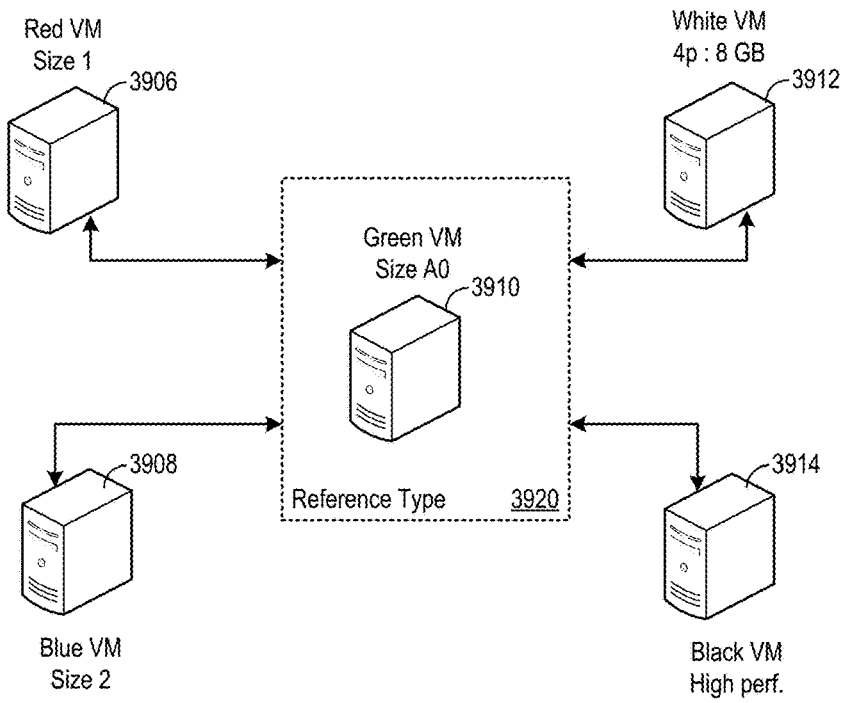
Figure 39

US 10,547,520 B2

MULTI-CLOUD PROVISIONING ARCHITECTURE WITH TEMPLATE AGGREGATION

PRIORITY CLAIM

This application claims priority to provisional application Ser. No. 62/088,474, filed 5 Dec. 2014, titled Hybrid Cloud Management, which is entirely incorporated by reference.

TECHNICAL FIELD

This application relates to analysis, control, and provisioning of technical components into a complex global network architecture of virtualized resources.

BACKGROUND

The processing power, memory capacity, network connectivity and bandwidth, available disk space, and other resources available to processing systems have increased exponentially in the last two decades. Computing resources have evolved to the point where a single physical server may host many instances of virtual machines and virtualized functions. These advances had led to the extensive provisioning of a wide spectrum of functionality for many types of entities into specific pockets of concentrated processing resources that may be located virtually anywhere, that is, relocated into a cloud of processing resources handling many different clients, hosted by many different service providers, in many different geographic locations. Improvements in cloud system control, deployment, and provisioning will drive the further development and implementation of functionality into the cloud.

BRIEF DESCRIPTION OF THE DRAWINGS

FIG. 5 shows database tables for equivalency mapping.
FIG. 7 shows database tables for type-to-type translation.
FIG. 38 shows a VM resource definition in a baseline technical service template.
FIG. 39 shows a multiple stage type-to-type translation architecture.

DETAILED DESCRIPTION

Figure 1:
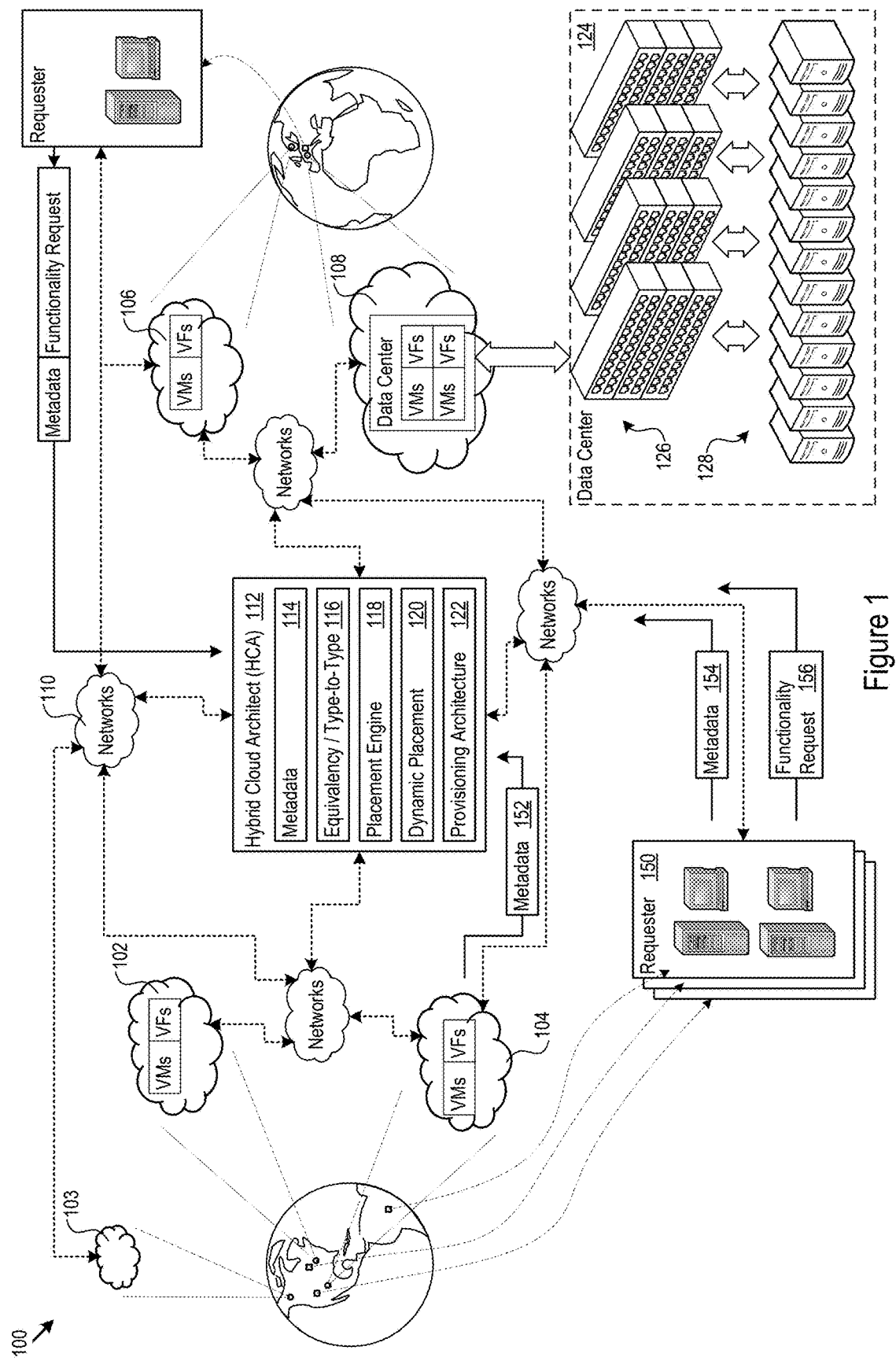
FIG. 1 shows an example of a global network architecture.
Figure 2:
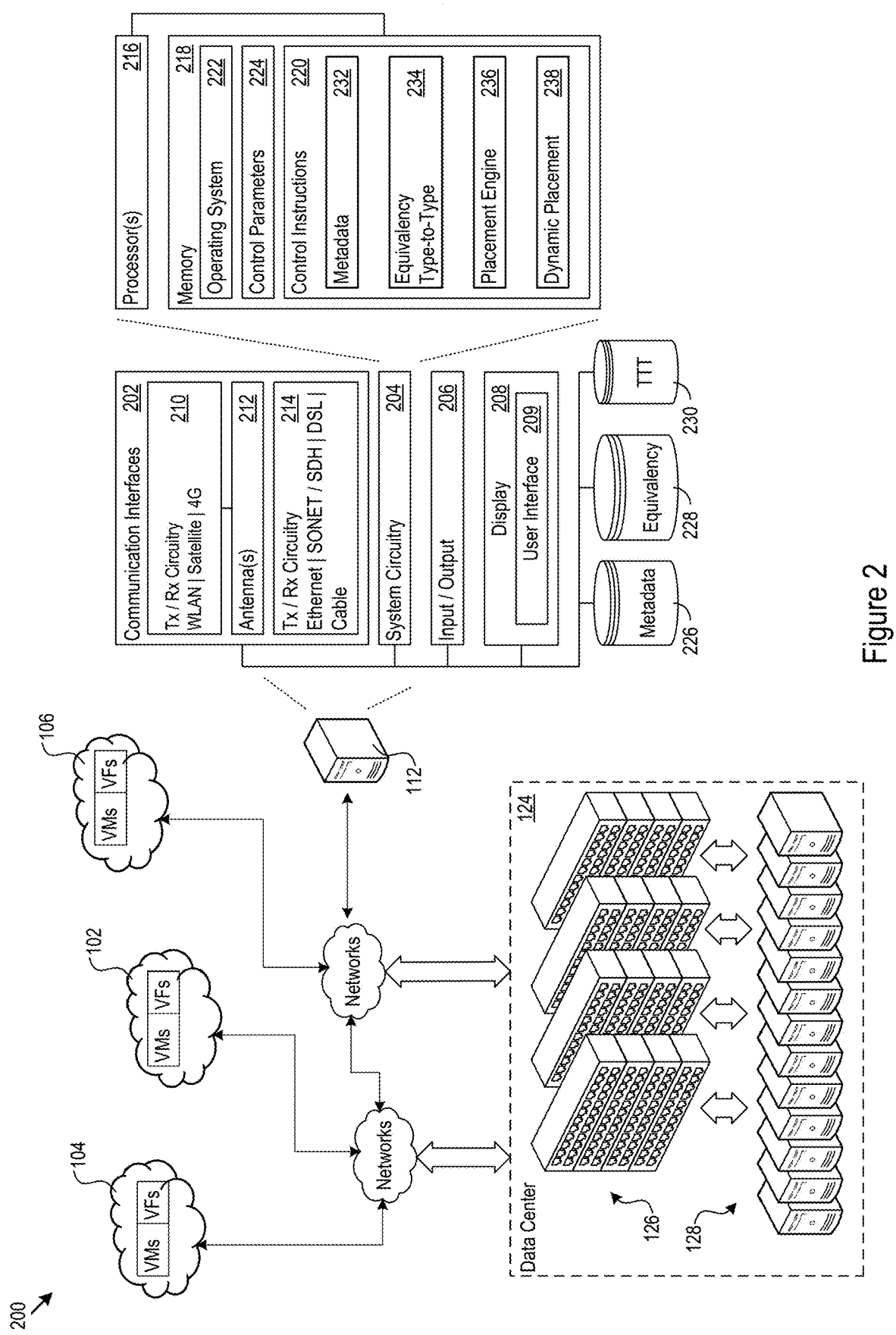
FIG. 2 illustrates an example implementation of a hybrid cloud architect.

FIGS. 1 and 2 provide an example context for the discussion of technical solutions for complex cloud architecture control and provisioning described in detail below. The examples in FIGS. 1 and 2 show one of many possible different implementation contexts. In that respect, the technical solutions are not limited in their application to the architectures and systems shown in FIGS. 1 and 2, but are applicable to many other cloud computing implementations, architectures, and connectivity.

FIG. 1 shows a global network architecture 100. Distributed through the global network architecture 100 are cloud computing service providers, e.g., the service providers 102, 103, 104, 106, and 108. The service providers may be located in any geographic region, e.g., United States (US) East, US West, or Central Europe. The geographic regions that characterize the service providers may be defined according to any desired distinctions to be made with respect to location. A service provider may provide cloud computing infrastructure in multiple geographic locations.

The service providers may provide computing resources via platforms that are generally publicly available. Service providers may additionally or alternatively provide computing resources "on-premises", which typically refers to a location with increased privacy and security compared to public cloud resources. An on-premises location may be within a secure facility owned by an entity which has moved computing functionality to a cloud based implementation, for instance. Examples of service providers include Amazon, Google, Microsoft, and Accenture, who offer, e.g., Amazon Web Services (AWS), Google Compute Engine (GCE), Microsoft Azure (Azure), and Windows Azure Pack (WAP) for on-premises cloud implementations, as just a few examples.

Throughout the global network architecture 100 are networks, e.g., the network 110, that provide connectivity within the service providers, and between the service providers and other entities. The networks 110 may include private and public networks defined over any pre-determined and possibly dynamic internet protocol (IP) address ranges. A hybrid cloud architect (HCA) 112 makes complex cloud architectural provisioning and execution decisions across multiple cloud services, taking into account the global network architecture 100, the various service provider locations and capabilities, and other factors. The provisioning and execution decisions are discussed in detail below, and include, as examples, determining what resources to instantiate, determining placement options for where (e.g., in which service provider regions) to instantiate the resources, and determining possible alternative implementation options for the resources. Specific aspects of the HCA 112 are described in more detail below.

As an overview, the HCA 112 may include metadata circuitry 114 configured to collect, store, and analyze cloud service metadata. The HCA 112 implements equivalency and type-to-type (TTT) circuitry 116 that is configured to determine equivalency between assets and networks within resources, and map cloud resource types between disparate service providers. A resource is a managed object, and types are prototypes of the managed objects. A 'region' may refer to a unit of hosting capacity in a particular geographic region, where types may be deployed.

The HCA 112 also includes placement circuitry 118 which is configured to determine where, how, and with which service provider the functionality requested by a particular resource requester 150 may be instantiated in the global network architecture 100. In other words, the HCA 112 determines placement options for requested resources. The dynamic placement circuitry 120 facilitates review and update of the placement circuitry decisions. The HCA 112 may also implement an end-to-end provisioning architecture 122 that is configured to, among other features, accept resource requester requests for cloud services, determine placement options, and execute provisioning actions once a placement option is selected. The provisioning actions are described in more detail below, and may include, as examples, determining which resources to deploy, and providing instructions to resource providers to instantiate the resources.

The actions taken by the HCA 112 are influenced by many technical factors, including metadata collected from various sources, including service provider metadata 152 that describes service provider offerings and capabilities, and requester metadata 154 that describes the cloud functionality requests 156 made to the HCA 112 by the resource requester 150, and the service requirements (e.g., PCI data compliance) for the functionality requests made by the resource requester 150.

In its role as the architect, the HCA 112 analyzes cloud service requests and makes decisions about implementation and provisioning of the requested services. This technical role is a complex one, due in part to the disparate cloud computing services offered by each service provider. That is, each service provider has a widely varying set of technical characteristics.

For instance, FIG. 1 shows a particular data center 124 for the service provider 108 running many different virtual machines (VMs), each running many different virtual functions (VFs). The data center 124 may include a high density array of network devices, including routers and switches 126, and host servers 128. The host servers 128 support a specific set of computing functionality that is offered by the service provider 108 from the data center 124. As just one of many examples, the service provider 108, through the data center 124 and its other infrastructure, may support many different types of virtual machines, differing by number of processors, amount of RAM, and size of disk, graphics processors, encryption hardware, or other properties; multiple different types of web front ends (e.g., different types and functionality for websites); several different types of database solutions (e.g., SQL database platforms); secure data storage solutions, e.g., payment card industry (PCI) data (or any other secure data standard) compliant storage; several different types of application servers; and many different types of data tiers. Further, the service provider 108 and the data center 124 may have further characteristics for the HCA to analyze, including whether the data center 124 is an on-premises or public location; which networks can provide connectivity to the data center 124; which assets the service provider 108 supports; and other characteristics.

FIG. 2 shows an example implementation of the HCA 112 configured to execute complex cloud architectural provisioning and execution decisions across multiple cloud services. The HCA 112 includes communication interfaces 202, system circuitry 204, input/output interfaces 206, and a display 208 on which the HCA 112 generates a user interface 209.

The user interface 209 and the input/output interfaces 206 may include a graphical user interface (GUI), touch sensitive display, voice or facial recognition inputs, buttons, switches, speakers and other user interface elements. Additional examples of the input/output interfaces 206 include microphones, video and still image cameras, headset and microphone input/output jacks, Universal Serial Bus (USB) connectors, memory card slots, and other types of inputs. The input/output interfaces 206 may further include magnetic or optical media interfaces (e.g., a CDROM or DVD drive), serial and parallel bus interfaces, and keyboard and mouse interfaces.

The communication interfaces 202 may include wireless transmitters and receivers ("transceivers") 210 and any antennas 212 used by the Tx/Rx circuitry of the transceivers 210. The transceivers 210 and antennas 212 may support WiFi network communications, for instance, under any version of IEEE 802.11, e.g., 802.11n or 802.11ac. The communication interfaces 202 may also include wireline transceivers 214. The transceivers 214 may provide physical layer interfaces for any of a wide range of communication protocols, such as any type of Ethernet, data over cable service interface specification (DOCSIS), digital subscriber line (DSL), Synchronous Optical Network (SONET), or other protocol.

The system circuitry 204 may include any combination of hardware, software, firmware, or other logic. The system circuitry 204 may be implemented, for example, with one or more systems on a chip (SoC), application specific integrated circuits (ASIC), microprocessors, discrete analog and digital circuits, and other circuitry. The system circuitry 204 is part of the implementation of any desired functionality in the HCA 112. As just one example, the system circuitry 204 may include one or more instruction processors 216 and memories 218. The memory 218 stores, for example, control instructions 220 and an operating system 222. The processor 216 executes the control instructions 220 and the operating system 222 to carry out any desired functionality for the HCA 112. The control parameters 224 provide and specify configuration and operating options for the control instructions 220, operating system 222, and other functionality of the HCA 112.

The HCA 112 also includes storage devices (e.g., hard disk drives (HDDs) and solid state disk drives (SDDs)). For instance, the storage devices may define and store databases that the control instructions 220 accesses, e.g., through a database control system, to perform the functionality implemented in the control instructions 220. In the example shown in FIG. 2, the databases include a metadata database 226, an equivalency database 228, and a TTT database 230. Each of the databases 226, 228, and 230 define tables storing records that the control instructions 220 read, write, delete, and modify to perform the processing noted below.

In that regard, the system circuitry 204, e.g., through the control instructions 220, may include metadata processing 232 configured to collect, store, and analyze cloud service metadata; equivalency and TTT processing 234 that is configured to determine equivalency between assets and networks, including TTT processing configured to map cloud resource types between disparate service providers; a placement engine 236 configured to determine where the functionality requested by a particular resource requester may be instantiated in the global network architecture 100; and dynamic placement instructions 238 configured to review and update the decisions previously made by the placement engine 236.

Equivalency and Type-to-Type (TTT)

The discussion below uses the example of a resource requester that has submitted a request for a bundle of services to be hosted in the cloud. The bundle of services may be defined by a service template that identifies the requested services, along with metadata that describes the requested services. In this example, the bundle of services is for a new SharePoint site, which the service template defines as including three web front ends on three VMs, two application servers on two VMs, and a data tier of two SQL database servers on two additional VMs. The requester metadata 154 indicates that the applications will work with PCI data, which calls for enhanced security and on-premises provisioning of the data tier, rather than provisioning into the public cloud. Further, the example assumes that the service template identifies public cloud Blue VMs (from the hypothetical Blue service provider) as the baseline template type for each of the VMs.

Figure 3:
FIG. 3 shows an example of type definition tables.
Figure 4:
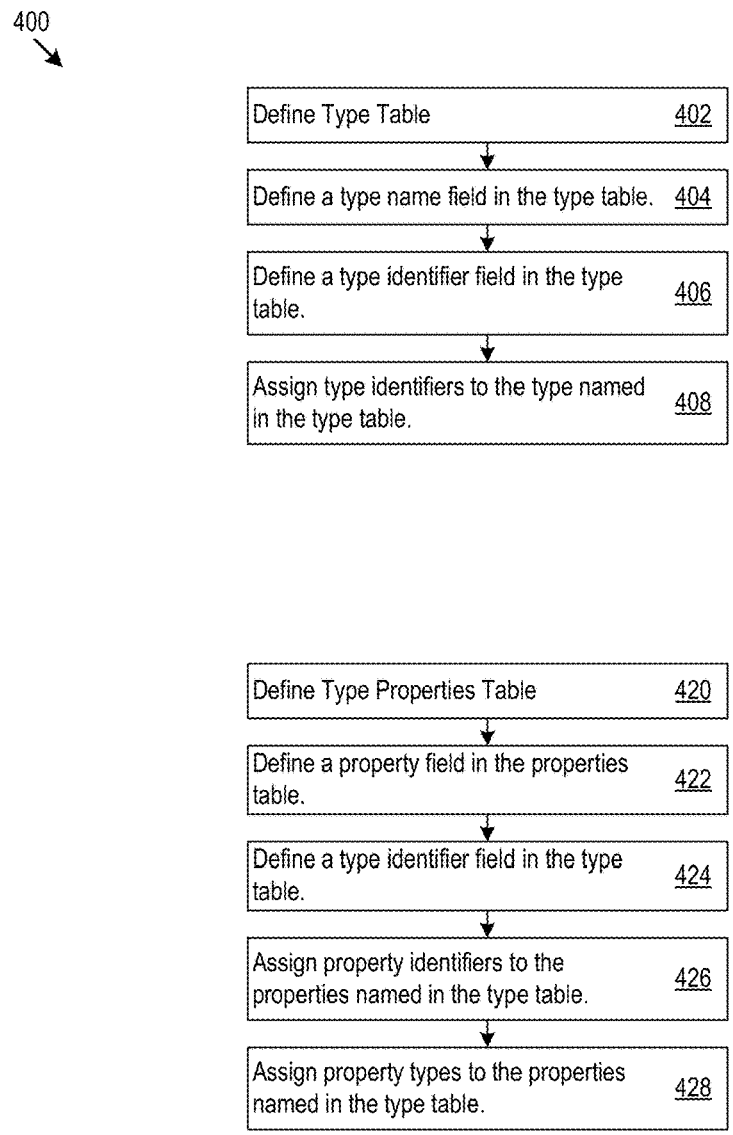
FIG. 4 shows logic for establishing type definition tables.

FIG. 3 shows an example of type definition tables 300, and FIG. 4 shows a corresponding logical flow 400 for establishing the type definition tables 300. The type definition tables 300 may be manually populated, e.g., with expert determinations of how to map the parameters of one resource to the parameters of another resource, and determinations of which resources offered by a given provider are considered equivalent to the resources offered by a different provider. In other implementations, automated analysis processes may add records to the tables 300, e.g., in response to real-world testing or pre-defined rules that determine when two resources offered by different service providers are equivalent, and how the parameters map between the resources. The same types of automated testing/rule based, and expert manual processes may also add records to the equivalency mapping tables shown in FIG. 5, and the translation tables shown in FIG. 7, which are discussed below.

The TTT processing 234 defines a type table 302 (402) and populates the type table 302. The type table 302 includes, e.g., a type name field 304 (404) and a type identifier field 306 (406). In this example, the type table 302 defines four VMs types from four different service providers: Blue, Green, Black, and Red. Each VM type has been assigned a type identifier (408), for instance the Blue VM is type 2, and the Red VM is type 5. The type table 302 may define and identify any number of VMs of different types. In addition, the type table 302 may define and identify any number and type of other technical components of a computing service to be provisioned in the cloud. For example, the type table may define and assign types to websites, storage accounts, networks, load balancing hardware, databases, monitoring systems, or any other type of technical component that serves the same function in different service provider systems.

FIG. 3 also shows a type properties table 320 that the TTT processing 234 defines (420) and populates. The type properties table 320 includes, e.g., a property field 322 (422) and a type identifier field 324 (424) for establishing the various properties that characterize any given type for any given service provider. That is, the type properties table 320 links types to properties (426). In this example, the type properties table 320 links the Red VM, type 5, to properties: VM Name, Processors, RAM, Disk Size, and OS Disk. The type properties table 320 links the Blue VM, type 2, to properties: Identifier, Size, and OS Disk.

The type properties table 320 may also include a property type field 326. The property type field 326 may include an identifier for each property that provides additional information of the type of that property (428). For instance, the property type for OS Disk is set to 2, which indicates in this example that OS Disk is an 'asset', and may be subject to equivalence mapping as described below. Similarly, the property type for Network Name is set to 1, which indicates that Network Name is a 'network', and may also be subject to equivalency mapping. The other property types may be set to NULL to indicate that no special processing (e.g., equivalency mapping) is applied to them prior to TTT translation.

In one implementation, the TTT processing 234 is implemented with an asset equivalency mapping followed by a TTT translation. Regarding asset equivalency mapping, for instance, the TTT processing 234 may determine an asset, e.g., OS Disk, of the first component type, and an asset value, e.g. "DiskA-27.vhd" for the asset. The TTT processing 234 may then determine an asset substitution, e.g., GUID3 for the asset, for provisioning the asset in the second service provider. The TTT processing 234 then replaces the asset value with the asset substitution, e.g., in the bundle of data defining the services to provision, such as in a Java Script Object Notation (JSON) file. In that regard, the equivalency mapping is configured to determine which service providers offer equivalent assets to the baseline assets specified, e.g., in a technical service template, and may provide identifiers of the service providers to other processing circuitry in the HCA 112, such as the placement engine 236. Once the equivalency mappings are executed, the TTT processing 234 performs TTT translation.

Figure 6:
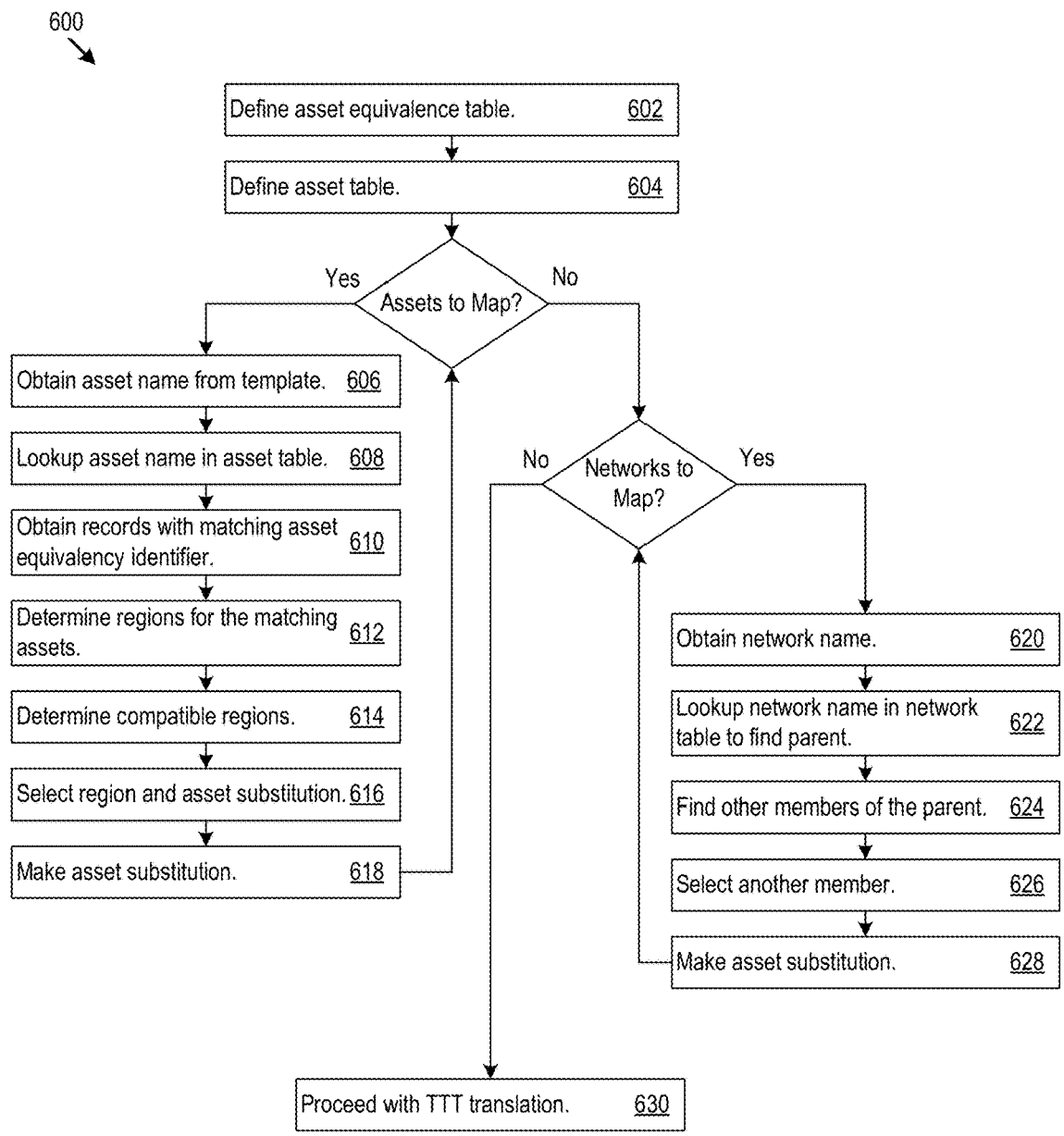
FIG. 6 shows logic for equivalency mapping.

FIG. 5 shows database tables for equivalency mapping 500, with FIG. 6 providing a corresponding logical flow. Continuing the example above regarding the SharePoint site, the TTT processing 234, reads the metadata to determine to place the data tier in a PCI compliant cloud service. The metadata architecture, including the sources of metadata and how it is stored, is described in detail below. As such, the TTT processing 234, staring with the template Blue VM and OS Disk (e.g., for SQL server for the data tier), searches for an equivalent OS Disk for a secure environment.

The equivalence mapping may execute for any asset included in the resource requester request for a bundle of services, such as disk images and also for networks. The equivalence mapping may be a single asset to single asset translation stage, pre-defined for specific assets.

FIG. 5 shows an asset equivalence table 502 (602) and an asset table 504 (604) for use in equivalence mapping for assets. The asset equivalence table 502 stores a unique identifier for the asset, and groups assets together as being functionally equivalent. The asset table 504 stores an asset equivalency identifier 506 and an asset name 508. The value for the asset equivalency identifier 506 in the asset table 504 is a foreign key to the value in the asset equivalence table 502. Thus, when specific asset share the same asset equivalency identifier 506, those specific assets are defined as equivalent assets by the tables 502 and 504. The asset name 508 may provide asset values that can be used for asset substitutions. For OS Disk assets, the asset name 508 may provide a location, e.g., a file path or globally unique identifier (GUID), at which to find a disk image.

The equivalence mapping process obtains the asset name specified, e.g., "Disk A-27.vhd", for the OS Disk asset in the template VM (606). The equivalence mapping performs a lookup on the asset table 504 with the asset name (608), and obtains the records from the asset table with the matching asset equivalency identifier 506 (610). In this case, the results are "abc.ami" and GUID3. The equivalence mapping determines a region for each result, e.g., by searching a region table (612), and determines which regions are compatible with provisioning the resource, e.g., based on the metadata (614). The result in this example is GUID3, which corresponds to a disk image in the Red VM on-premises region (616). In other words, the equivalence mapping process has determined the asset substitution GUID3 for the asset name "Disk A-27.vhd". Having determined GUID3 as the asset substitution, the equivalence mapping replaces "Disk A-27.vhd" with GUID3 (618).

For networks, the equivalence mapping takes the value of the Network Name (620), e.g., "Network 1" for the Blue VM template. The equivalence mapping performs a lookup of the network name value in a network table 520 to find the parent network (622), e.g., Parent Network A. The network table 520 defines Networks 1, 2, and 3 as roll-up members of the parent network A (624). The members were added due to their equivalence, and thus the equivalence mapping may select from Network 2 (Green region) or Network 3 (Red region) as a substitution for Network 1. In this example, the equivalence mapping selects Network 3 as belonging to a region compatible with PCI data (626), and makes the asset substitution by replacing Network 1 with Network 3, e.g., in the JSON description of the service request (628).

Each network might have, for instance, a different IP address range, but for the purposes of determining equivalence, any of Networks 1, 2, and 3 are equivalent to each other, because they all belong to Network A. In that respect, Network A is an abstraction in the architecture that the architecture may use to attach custom metadata to actual virtual networks that are the children of Network A, and that are defined to be equivalent by virtue of their inclusion under Network A. Roll-up networks may be nested inside one another as well. Each network within a set of networks within a specific network may be considered equivalent. Network equivalency may determine network options that place the network in a different region than that specified in the technical resource template. Expressed another way, network equivalency defines equivalence between multiple networks from multiple providers. The equivalency analysis makes the equivalency decisions automatically, rather than bombard a user with questions. When multiple network options are available, the equivalency processing may make a selection based on a precedence order defined and linked to the networks or assets, for instance.

After the assets, networks, and other special types are mapped, the TTT processing 234 proceeds with TTT translation (630). As one aspect, the TTT processing 234 translates baseline technical component types to substitute technical component types, e.g., when the baseline technical component type may be implemented by a different service provider that defines a different type that performs equivalent functionality. In that regard, the TTT processing 234 is configured to determine which service providers offer equivalent types to the baseline type, as described above with respect to FIGS. 1-6, and may provide identifiers of the service providers to other processing circuitry in the HCA 112, such as the placement engine 236.

Figure 8:
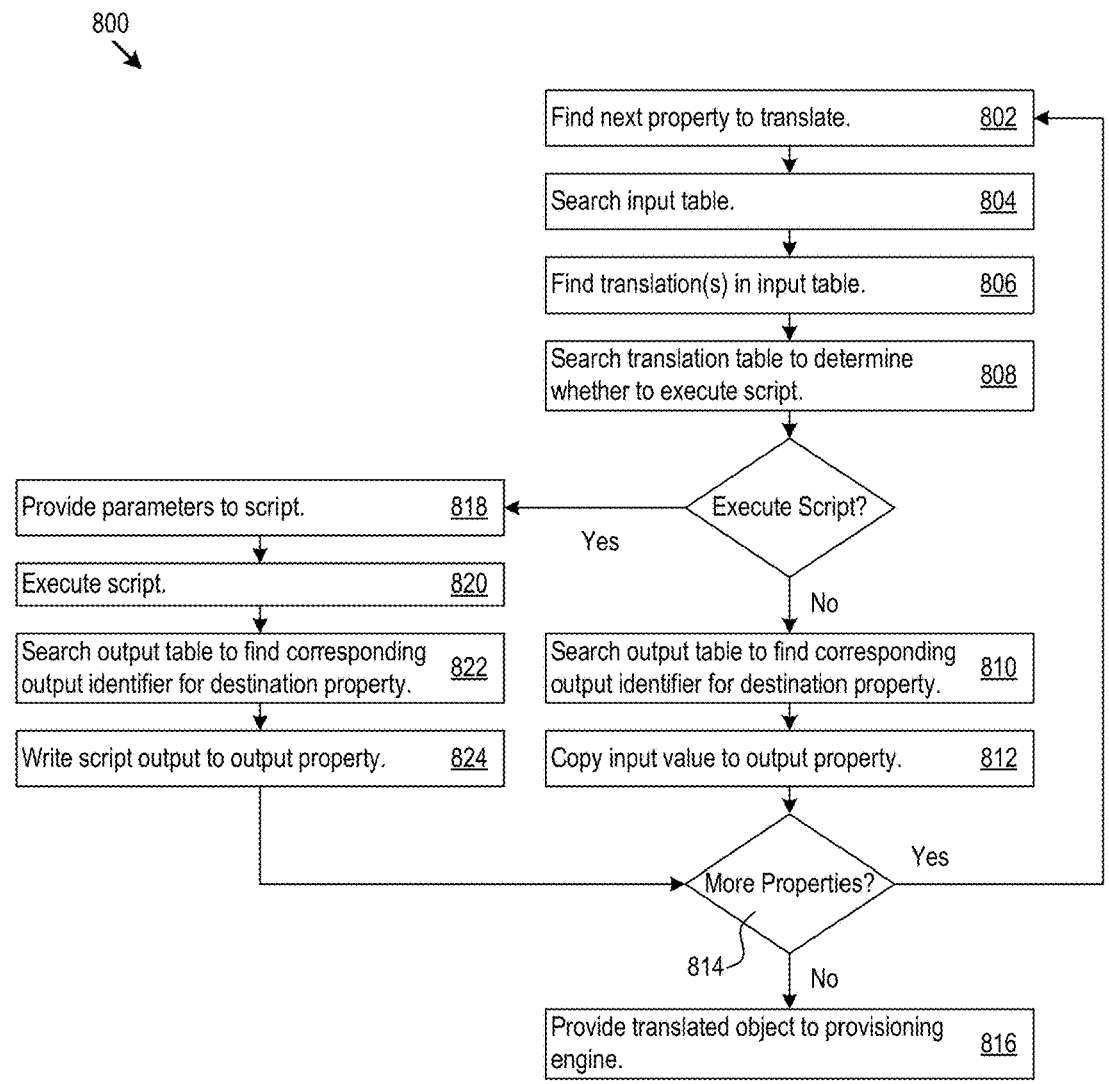
FIG. 8 shows logic for type-to-type translation.

FIG. 7 shows database tables for TTT translation 700, with FIG. 8 providing a corresponding logical flow. In one implementation, the TTT translation references an input table 702, a translation table 704, and an output table 706. The input table includes a translation identifier 708, an input property identifier 710, and an input parameter name 712. The input property identifier 710 corresponds to the properties identified in the type properties table 320, the translation identifier 708 provides a translation path to follow as will be explained more below. The input parameter name 712 specifies an input parameter to a script (if any) to execute to assist with TTT translation.

The translation table 704 includes a translation identifier 714 to match against the translation identifier 708, and a path field 716. The path field 716 specifies a script to execute, if any, to facilitate TTT translation, taking input from the input parameter identified in the input table 702. The path field 716 may specify the script by providing a path to the script and a name for the script in a given file system. The scripts may be implemented in a wide variety of scripting languages, including PowerShell, Ruby, or Python, e.g., by resource translation experts who determine how to map parameters back and forth between specific resource types. The output table 706 includes a translation identifier 718, and an output identifier 720. The output identifier 720 specifies an output property to which the input property maps. The translation table 704 links the input table 702 and the output table 706 through the translation identifier 714.

The particular example given in FIG. 7 is specific to several examples of translating between Blue VMs, Type 2, to Red VMs, Type 5. Similar tables may be prepared for translating properties between any other types defined in the type table 302. Furthermore, any of the tables used for type-to-type translation and equivalency determinations may be resource requester specific. In other words, any particular resource requester may control or specify to the HCA 112 how to translate types for that particular resource requester, and which assets are considered equivalent for that particular resource requester. Accordingly, the TTT circuitry 116, in its analysis, may access and retrieve data from tables in the equivalency database 228 and TTT database 230 responsive to the specific entity that is requesting the hosted services.

Figure 40:
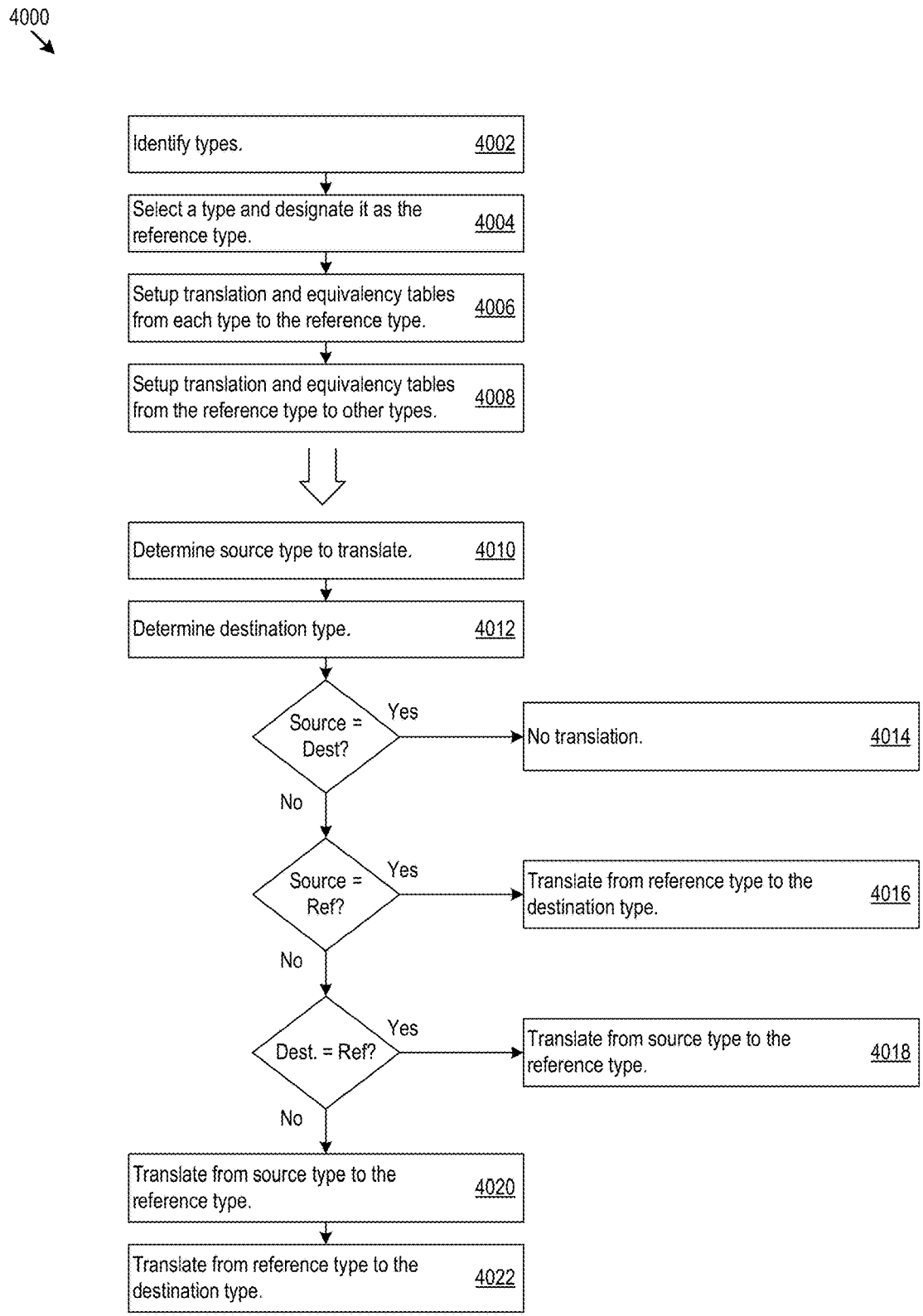
FIG. 40 shows logical flow for multiple stage type-to-type translation.

In some implementations, the TTT circuitry 116 performs translation to a final type through a reference type. The two step translation avoids the exponential increases in translation tables and the associated complexity and memory requirements that would be defined for all possible combinations of direct translation from 'n' types to any of 'n−1' other types. FIGS. 39 and 40 provide additional details of the two step translation.

FIG. 39 shows a multiple stage type-to-type translation architecture 3900. First, however, FIG. 39 shows one possible baseline approach 3902. FIG. 39 compares the baseline approach 3902 to the two step translation model 3918 preferably executed by the TTT circuitry 116 in the translation architecture 3900. In this example, there are five different VM types defined from different service providers and that have different characteristics: a Red VM 3906, a Blue VM 3908, a Green VM 3910, a White VM 3912, and a Black VM 3914. The VM types differ according to how they parameterize their hardware feature set. In some instances, such as for the White VM 3912, the type includes specific parameters for number of processors and amount of RAM. In other examples, such as for the Black VM 3914, the feature set is represented in a text string, e.g., "High Performance". The baseline approach defines a set of translation and equivalency tables in the equivalency database 228 and TTT database 230 for directly converting from any of the five types to any other of the five types. That is, each of the five VMs has four sets of translation tables 3916, leading to a significant investment in underlying preparation time, resource consumption, and infrastructure for translation.

FIG. 39 also shows how the multiple stage architecture 3900 defines a two-step translation reference model 3918, and FIG. 40 shows a corresponding logical flow 4000 for multiple stage type-to-type translation. The types to include in the reference model 3918 are identified (4002). The reference model 3918 designates a specific type as the reference type (4004). In the example shown in FIG. 39, the Green VM 3910 is chosen as the reference type 3920. The reference type 3920 may be any selected type. In some implementations, the reference type 3920 is chosen to be the type most commonly represented type in the technical service templates 908.

The HCA 112 sets up translation and equivalency tables for each type to the reference type 3920 (4006). Similarly, the HCA 112 sets up translation and equivalency tables from the reference type 3920 to each other type (4008). As indicated by the two-step translation reference model 3918, a conversion from a Red VM type to a Black VM type passes through the reference type 3920. The translation is from source type, the Red VM 3906, to the reference type 3920 (the Green VM 3910), and then from the reference type 3920 to the destination type, the Black VM 3914.

The TTT circuitry 116 determines a source type to translate (4010) and a destination type to which to translate (4012). If they are the same, then no translation is needed (4014). Otherwise, when the source type is the reference type 3920, then the TTT circuitry 116 preforms a single step translation from the reference type to the destination type (4016). When the destination type is the reference type, the TTT circuitry 116 also performs a single step translation from the source type to the reference type (4018). When the reference type is neither the source type nor the destination type, then the TTT circuitry 116 performs a two-step translation: first from the source type to the reference type (4020), then from the reference type to the destination type (4022).

That is, the two-step translation model 3918 sets up a mechanism by which, at most, the TTT circuitry 116 performs two translations to move from a source type, e.g., specified in a baseline technical service template, to a destination type to be deployed in a selected location. The two-step translation reference model 3918 achieves a significant decrease in the underlying preparation time, resource consumption, and infrastructure for translation between types. The reference model 3918 avoids the exponential increases in translation tables and associated complexity and memory requirements that would be defined for all possible combinations of direct translation from 'n' types to any of 'n−1' other types.

Several examples follow with reference to FIGS. 7 and 8 concerning converting from Type 5 to Type 2. The TTT translation finds in the type properties table 320 the next property to translate for the type being analyzed. The next property in this example is the VM Name property, property identifier 1 (802). The TTT translation searches the input table 702 with the property identifier 1 as the input property ID (804) and thereby locates the translation(s) identified by translation identifier 1 (806). In this instance, the translation is the single instance of translation identifier 1.

Next, the TTT translation searches the translation table 704 with the translation identifier of 1 to determine whether to execute a script (808). In this instance, the path field 716 is NULL, signifying that there is no script to run. The TTT translation also searches the output table 706 with the translation identifier of 1 to find the corresponding output identifier (810). In this case the output identifier is 6, corresponding to the Identifier field as noted in the type properties table 320. Because there is no script to execute, the TTT translation directly copies the value form input property 1, VM Name, into output property 6, Identifier. That is, in the Type 2 VM, the Identifier field stores the value that the Type 5 VM stores in its VM Name field.

Similarly, in converting from Type 2 to Type 5, the input property will at some point be Identifier, property 6. The input table 702 identifies translation identifier 3 for this input property. Translation identifier 3 has no script identified in the translation table 704, and has an output property of 1, VM Name, as identified in the output table 706. According, the TTT translation copies the value of the Identifier property directly into the VM Name property when converting from Type 5 to Type 2.

The process repeats for each property (814). After each property is translated, the TTT translation has produced a translated object that may be provided to subsequent processing, e.g., a provisioning engine (816).

Taking another example, the next property is Processors, property identifier 2. The TTT translation finds two instances of a matching translation identifier of 2 in the input table 702. The two instances of translation identifier 2 reference the Processors property, ID 2, and the RAM property, ID 3. In addition, the translation table 704 indicates to run 'script1' for translation identifier 2, and the output table indicates to place the output into output identifier 7, the Size property for the Type 2 VM. Accordingly, the TTT translation extracts the Processors and RAM property values from the template and provides the Processors and RAM property values as parameters to the script (818), determines the destination property (820), and executes the script which writes the script output to the destination property (822). In this example, the script accepts the Processors and RAM values from the input properties, and outputs a value for the Size property corresponding to the Processors and RAM values. For instance, if Processors is the value 4 and RAM is "8 GB", then the script may determine that the Size is 'Standard A1' and output, e.g., {"Size": "Standard A1"} as a JSON conversion for obtaining a Type 2 equivalent VM property for the Type 5 number of processors and amount of RAM. The script may implement any such pre-defined mapping of input variables to output variables.

Similarly, in converting from Type 2 to Type 5, the input property will at some point be property 7, Size. The input table 702 specifies a translation identifier of 4 for the Size property, and that an input parameter called SizeInput is used by a script to run for the translation. The translation table 704 indicates that the name of the script to run is 'script2', and the TTT translation executes the script with the SizeInput set to the value of the Size property, e.g., 'Standard A1'. The script implements a predetermined mapping of the Size property to the output parameters 2 (Processors) and 3 (RAM) as identified in the output table 706. In this instance, the script translates 'Standard A1' to the value '4' for the processors property and the value '8 GB' for the RAM property. That is, the TTT translation converts the single property {"Size": "Standard A1"} to two properties: {"Processors": 4}, and {"RAM": "8 GB"}.

Expressed another way, the TTT circuitry 116 includes type definition circuitry configured to assign (e.g., via the type table 302) a first type specifier (e.g., Type 5) to a first component type (e.g., Blue VMs) available from a first service provider, and assign a second type specifier (e.g., Type 2) to a second component type (e.g., Red VMs) available from a second service provider.

The TTT circuitry 116 also includes property linking circuitry configured to link (e.g., via the type properties table 320) a first set of technical properties (e.g., Processors and RAM) to the first component type and link a second set of second technical properties (e.g., Size) to the second component type. Property translation circuitry establishes a translation correspondence (e.g., via the input table 702, translation table 704, and the output table 706) between the first set of technical properties for the first component type and the second set of technical properties for the second component type.

Type mapping circuitry is configured to make equivalency substitutions, by determining a first asset (e.g. OS Disk) of the first component type, and an asset value for the first asset (e.g., "Disk A-27.vhd"). The mapping circuitry also determines an asset substitution (e.g., GUID3) for the first asset, for provisioning the first asset to the second service provider. The mapping circuitry also replaces the asset value with the asset substitution. After the equivalency substitutions, the type mapping circuitry translates the first component type into the second component type according to the translation correspondence. As a result, the type mapping circuitry prepares a technical description (e.g., a JSON document) for provisioning the first component type at the second service provider as the second component type.

Execution of the TTT circuitry 116 may follow, e.g., a placement engine that determines in which regions cloud resources that implement a functionality request may be instantiated. When the resource requester 150 makes a decision on region, the TTT circuitry 116 may then translate the resource template descriptions for the cloud resources for compatibility with the service provider hosting the services in that region. If the cloud resources will be deployed to the region and service provider already specified in the resource template, then no translation needs to be performed.

Returning to the SharePoint example, the service template defined three web front ends on three Blue VMs, two application servers on two Blue VMs, and a data tier of two SQL database servers on two additional Blue VMs. The requester metadata 154 indicated that the applications will work with PCI data, which calls for enhanced security and on-premises provisioning of the data tier, rather than provisioning into the public cloud. As such, the TTT translation converted the data tier from Blue VMs to Red VMs which, through the metadata, are known to be PCI compliant.

At deployment time, the service template will specify three web front ends in Blue VMs, and two application servers in Blue VMs, all connected to the same network, Network 1. However, the two VMs for the data tier are in Red VMs with a different servicer provider under Network 3. But Network 1, Network 2, and Network 3 were defined under the same Parent Network A, indicating that all three networks can communicate with one another, allowing the complete set of VMs to interoperate as needed.

Metadata

The HCA 112 implements a metadata architecture that helps address the technical challenge of finding viable placement options for implementing technical service requests. The metadata architecture links various types of metadata to technical components, e.g., types and assets, to technical service templates, and to a container hierarchy. The HCA 112 injects specific metadata subsets into a placement analysis pipeline that determines where the technical components that make up the service request may be placed in the extensive and complex service provider space.

Figure 9:
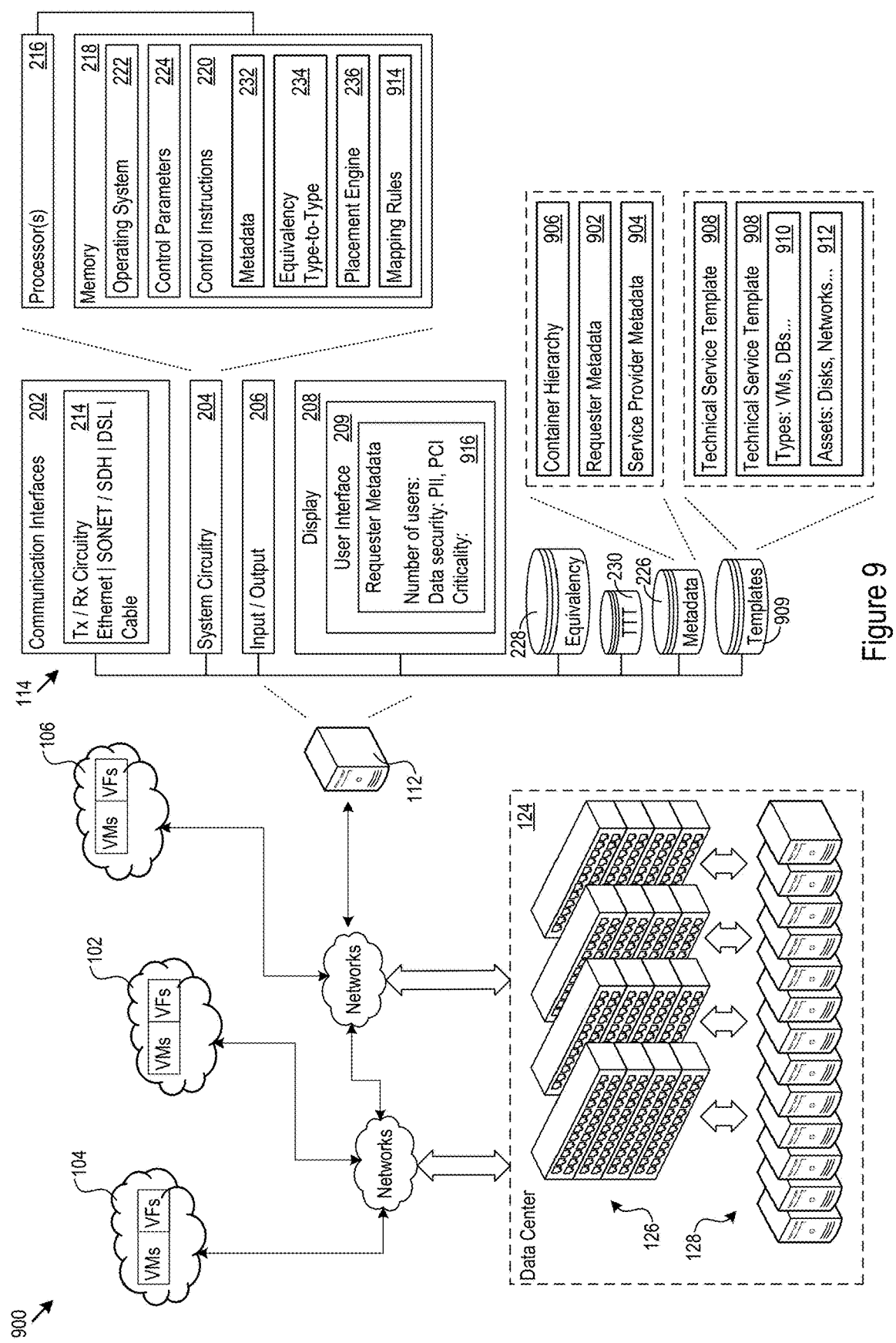
FIG. 9 shows a metadata architecture within the hybrid cloud architect.

FIG. 9 shows a metadata architecture 900, including an example implementation of metadata circuitry 114 within the hybrid cloud architect 112. The metadata database 226, in this implementation, stores requester metadata 902 characterizing the resource requester service request, e.g., what, if any, data security features does the requested service need; service provider metadata 904 characterizing the service provider capabilities with respect to technical component types, assets, region characteristics, and other service provider aspects; and metadata for the container metadata 906, that characterizes the sections, technical component types 910 (e.g., VMs, websites, and DBs), assets 912 (e.g., OS disks) networks, and other features of the technical service templates 908 that define a baseline implementation for the available service sets that a resource requester may order. The technical service templates 908 may also be referred to as catalog items. A templates database 909 may store the technical service templates 908. In that regard, the templates database 909 may provide a pre-defined library of technical service templates 908, each of which provides an initial or baseline specification of one or more resources (e.g., a VMs, DBs, and networks) that implement a technical service request (e.g., a SharePoint site), including the parameters for the resources (e.g., the size of the VM), and placement options (e.g., to be placed as a default in the Blue provider E.U. north region). The HCA 112 may use additional, different, or fewer types of metadata in other implementations.

Figure 10:
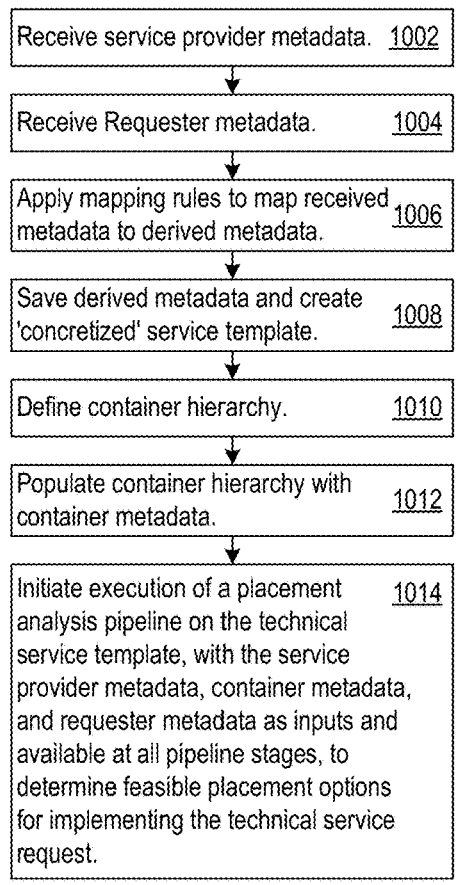
FIG. 10 shows logic for metadata collection, creation, and derivation.

FIG. 10 shows a corresponding logical flow 1000 for metadata collection, creation, and derivation. The communication interface 202 receives, e.g., from a service provider or another metadata source, service provider metadata 904 that characterizes a virtualized hosting region controlled by the service provider (1002). The service provider metadata 904 may describe, as just a few examples, the technical component types supported by the service provider in the service provider regions, the assets supported by the service provider; the types of data security available from the service provider; which resource requesters have subscriptions to the service provider; for which service provider regions, networks, or other features the subscriptions apply, and whether the service provider regions are public or private (e.g., on-prem regions).

The communication interface 202 also receives, e.g., from a resource requester 150, requester metadata 902 (1004). The requester metadata 902 may be provided by a particular employee at the resource requester 150 who is submitting the resource request, may be automatically provided by the resource requester processing systems (e.g., by providing pre-established metadata for particular resources commonly requested by the resource requester), or in other ways. The requester metadata 902 characterizes a technical service request made by the resource requester 150 for virtualized hosting, e.g., a request for a new toy development environment. As a few examples, the requester metadata 902 may indicate which, if any, aspects of the resource requester service request have specific data security requirements, e.g., requirements for PCI compliance; how many users are expected to use the servers, programs, and databases in the development environment; where the users reside and from where they are expected to access the services (this may drive placement decisions for locating technical component types in regions close to the employees, for instance, or as another example, ensuring that technical components that handle data on a European Union (EU) citizen are placed within EU boundaries and meet all EU data handling requirements); the level of criticality of the development environment; applicable service level objectives (SLOs) and service level agreements (SLAs); and other resource requester specific aspects of the technical service request. The requester metadata 902 may also characterize the resource requester itself, including, as one example, identifiers of the service providers, service provider regions, and service provider networks to which the resource requester 150 has active subscriptions. Given the potentially immense array of possible placement options, the metadata architecture 900, in conjunction with the processing described above and below, significantly increases the efficiency with which placement options are identified.

To obtain the requester metadata 902, the HCA 112 may present the resource requester 150 with a series of metadata questions for the resource requester 150 to answer, e.g., through a metadata completion template 916 generated in the GUI 209 and displayed locally at the resource requester 150. The metadata architecture 900 may store the enterprise metadata 902 in many different manners in the metadata database 226. As one example, the enterprise metadata 902 may take the form of tag and value pairs, e.g., {"Number of Users", "500"}, or {"Data Type", "PCI"}, in XML, JSON, or another format, or as data records stored in a database with columns pre-defined to hold the metadata answers for each metadata question. That is, the technical service templates 908 may broadly apply across a wide range of implementations, with customization performed in response to the specific requester metadata 902. In that respect, the HCA 112 may include mapping rules 914. The mapping rules 914 obtain derived metadata from, e.g., the requester metadata (1006). The mapping rules 914 may also specify storing the derived metadata into specific parameter fields of the technical service template for the service request made by the resource requester 150. As one example, a mapping rule may convert a resource requester metadata answer of "300 expected users" into derived technical metadata of a VM Size of "Standard A0" or "4 Processors, 8 GB RAM", and save the derived metadata into the technical service template that the placement circuitry 118 will process for the particular technical service request. A technical service template with its variable parameter fields completed may be referred to below as a 'concretized' template (1008).

The mapping rules 914 generate additional technical metadata, e.g., from the resource requester metadata 902. The additional technical metadata becomes part of the concretized technical service template for consideration by other processes in the HCA 112, including the placement engine 236. For instance, a mapping rule may specify that the enterprise metadata 902 of {"Number of Users"}>200 maps to additional technical metadata such as "{Size, A1}" or {"Processors": 4}, and {"RAM: 8 GB"}. This rule avoids asking the resource requester a highly technical question that they are unlikely to understand or have an answer for—namely how to specify a particular size of VM for a given service provider. The rule translates the more understandable answer concerning number of users into the technical size specification of a VM as understood by the service provider. As such, the placement engine 236 has additional information on which to make placement decisions, while maintaining the specific requester metadata 902 separately from the additional technical metadata that may be inserted into the template.

Figure 11:
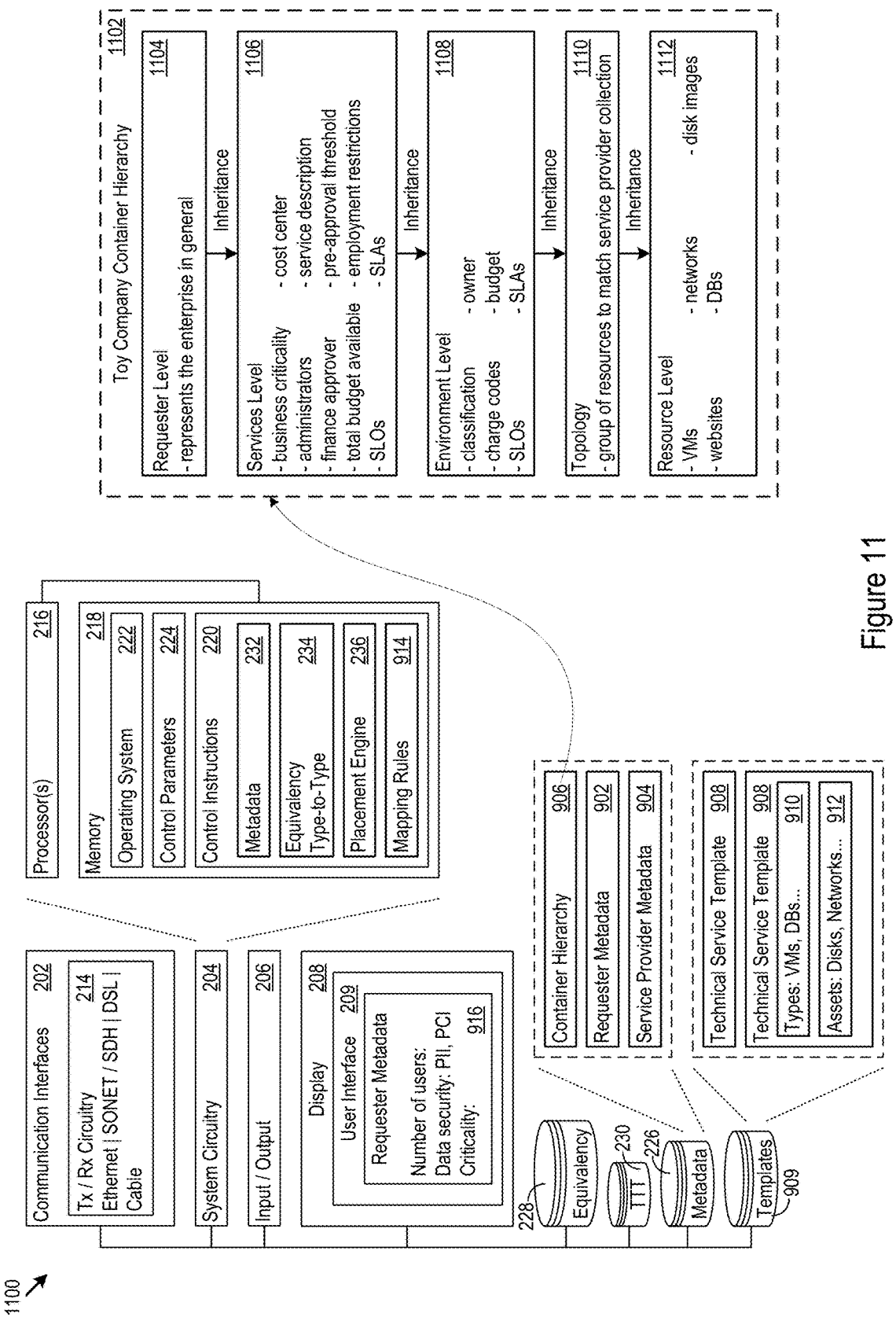
FIG. 11 shows another view of the metadata architecture within the hybrid cloud architect.

The metadata database 226 may also define a container metadata 906 (1010). FIG. 11 shows another view of the metadata architecture 1100 within the hybrid cloud architect 112, with additional detail of the container metadata 906. The container metadata 906 defines a view of the resource requester and the types of structures applicable to the resource requester and its activities. That is, the container metadata 906 is a pre-defined real-world mapping of the operational structure of a particular resource requester to a metadata hierarchy. An example is given below of a toy company that uses particular services and environments (e.g., test and development environments). However, the container metadata 906 may of course change to align with any particular internal structure of a given resource requester, for instance, by adding or removing new environments specifically used by that resource requester. As such, the implementation of the container metadata 906 may vary widely between resource requesters. The container metadata 906 serves the technical purpose of defining relationships between resources and the containers or owners of those resources, prior to provisioning. The metadata architecture thereby facilitates a metadata driven policy placement that solves the difficult technical challenge of finding placement options for complex technical service requests in an automated way, and without subjecting the resource requester to repetitive trial and error approaches to tweaking service requests to find a successful placement.

FIG. 11 shows an example of a toy company container hierarchy 1102. The container hierarchy 1102 defines a multiple level technical container structure (1010). The structure includes container levels that optionally inherit properties from prior container levels. Each container level may be populated with specific container metadata (1012), e.g., as a pre-execution step performed by individuals having knowledge of the internal structure of the resource requester; as an automated step using pre-defined metadata values assigned to the multiple level technical container structure, and established, e.g., when the multiple level technical container structure was designed and implemented for the resource requester; or as a combination of automated and manual metadata entry. An example of a multiple level technical container structure is provided below.

The container hierarchy 1102 includes a resource requester level 1104. At the resource requester level 1104, the container metadata may describe aspects of the resource requester in general, or as a whole. For instance, the container metadata may describe the type of resource requester, its products, locations, number of employees, employee locations, and other resource requester characteristics.

In the example of FIG. 11, the container hierarchy 1102 includes a service level 1106 as the next container level. The service level 1106 may represent particular functions or processes in place within the resource requester, e.g., new toy design, research and development, toy marketing, and toy inventory and freight logistics. In other implementations, the container hierarchy 1102 may define a resource requester unit or division level as the next container level instead. In the service level 1106, the attached container metadata may include, as just a few examples, a level of criticality for the service (from which the mapping rules 914 or placement engine 236 may derive or imply SLAs and SLOs and affect placement decisions, for instance); cost centers that pay for the service; administrator IDs; service descriptions; cost approval personnel; dollar thresholds for automatic approval without contacting the cost approval personnel; available budget for the service; employment restrictions; and more specific SLOs and SLAs (e.g., that roll-up into the SLOs and SLOs from the level above).

The container hierarchy 1102 also includes an environment level 1108. The environment level 1108 may define specific operational types that help provide the services defined at the service level 1106 for the toy company. As examples, the operational types may include production environments, test environments, and development environments. The container metadata attached at the environment level 1108 may include, as examples, a description or identification of the environment (from which the mapping rules 914 or placement engine 236 may derive or imply additional metadata affecting placement decisions, e.g., data security restrictions on production environments); identification of regulatory issues and data security requirements (e.g., compliance with PCI, PII, or ITAR); the owner of environment; charge codes, budget allocation, or other financial characteristics; and more specific SLOs and SLAs (e.g., a more specific level of availability or reliability for the production environment).

The topology level 1110 may include topology metadata that identifies a related group of resources at the resource level 1112. For instance, a topology group of resources may be defined to include members that correspond to a collection of resources implemented by a particular service provider. That is, the topology level 1110 may establish a collection of resources having a predefined meaning to the service provider. As one example, the topology metadata may define a Sharepoint site as a collection of several VMs, DBs, and a connecting network.

The resource level 1112 represents specific technical components that implement a topology and an environment. For instance, the resource level 1112 may include container metadata that specifies properties for technical component types, such as VM properties, e.g., properties for size, processors, RAM, or other hardware components, database properties, or web front end properties; properties for networks; properties for assets, such as names or other identifiers for websites and disk images.

Any of the metadata components of the container hierarchy and any fields of the technical service templates may be pre-defined and fixed or may be variable parameter fields. The HCA 112, e.g., via the mapping rules 914, may derive a technical component value from any portion of the requester metadata 902, existing container metadata 906, or service provider metadata 904, and store the technical component value in any of the parameter fields, whether in the technical service templates 908 or in the container hierarchy.

Accordingly, when the resource requester 150 requests implementation of a technical service, the HCA 112 may retrieve the baseline technical service template pre-defined for that particular technical service, populate parameter fields specific to the resource requester 150 according to the metadata, and pass the specific template (and the metadata) to the placement engine 236 for determining placement options. That is, while pre-defined technical service templates are available and specify one possible baseline implementation for one or more resources, that baseline template service template changes to a specific template according to the particular resource requester and the metadata. For example, the baseline technical service template may include an empty parameter field for number of users, or size. The HCA 112 creates the specific template by inserting, e.g., matching instances of provider metadata 904, into the baseline template to obtain the specific template, also referred to as a concretized technical service template.

As a specific example, the technical service template for a development environment for the toy company may define a webserver, application server, and a database as the technical component types that makeup the development environment. The technical service template may further specify assets. Examples of the assets include a deployment package that deploys content onto webservers and into SQL databases, and OS disk images specified by image names for the images that provide the webserver, application server, and database functionality.

Expressed another way, in some implementations, the technical service templates 908 are hierarchical files, e.g., JSON files. The files specify and identify each resource, the relationship between resources, and the technical metadata for the resources. The technical service templates 908 may include parameterized values.

The requester metadata 902 and service provider metadata 904 provide sources of metadata for deriving additional metadata. The derived metadata may be stored in the fields for the parameterized values.

In addition, the HCA 112 may derive implementation aspects from the relationships between resources. For instance, a technical service template may indicate that a database is used by a website, and that both are part of an application. The HCA 112 may automatically derive a monitoring relationship and monitoring implementation for the database and website in response. That is, knowing the relationships allows the HCA 112 to determine, e.g., which resources to monitor together, given, e.g., likely operational and failure interrelationships. As one example, a technical service template may specify that a web server relies on a particular database and a particular network. The defined relationship of the database to the web server and the network to the web server allows the HCA 112 to prioritize a troubleshooting analysis for the web server to the database and network resources.

That is, the HCA 112, using metadata obtained prior to provisioning, initiates execution of a placement engine 236 (e.g., implemented as a placement analysis pipeline) on the concretized technical service template. The service provider metadata, container metadata, and requester metadata are inputs to the placement engine 236 and available at all pipeline stages, to determine feasible placement options for implementing the technical service request (1014). One technical advantage is that the placement engine 236 has the technical data available to it for deciding placement options in a very complex field of service providers, and for automatically determining options for placement that are not literally specified in the baseline technical service template.

The placement pipeline circuitry may implement a sequence of pipeline stages. Each pipeline stage is a localized unit of processing that accepts data inputs and produces data outputs based on the specific set of processing tasks allocated to and implemented in that particular pipeline stage.

Placement Engine and Re-Placement

Figure 12:
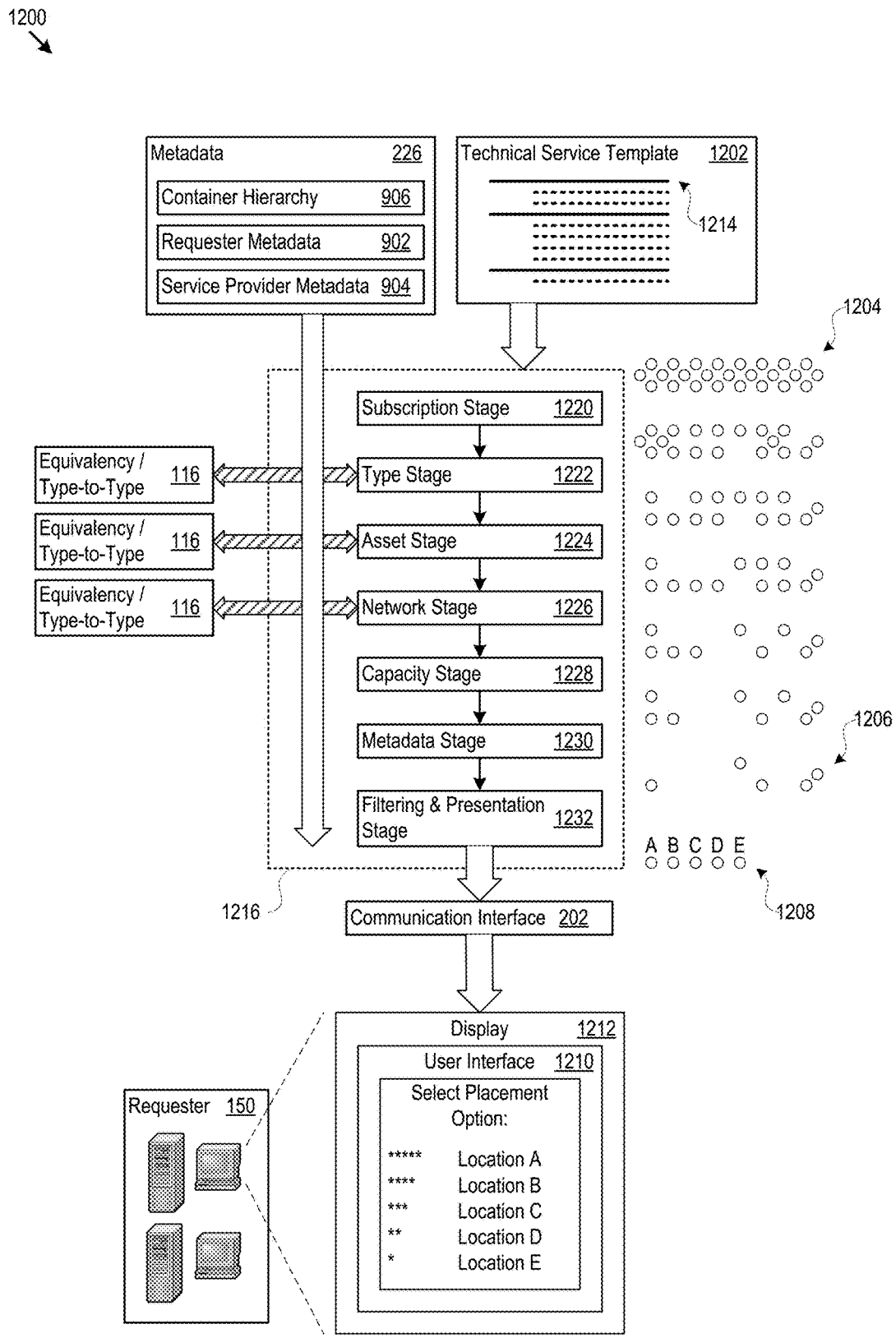
FIG. 12 shows placement pipeline circuitry.
Figure 13:
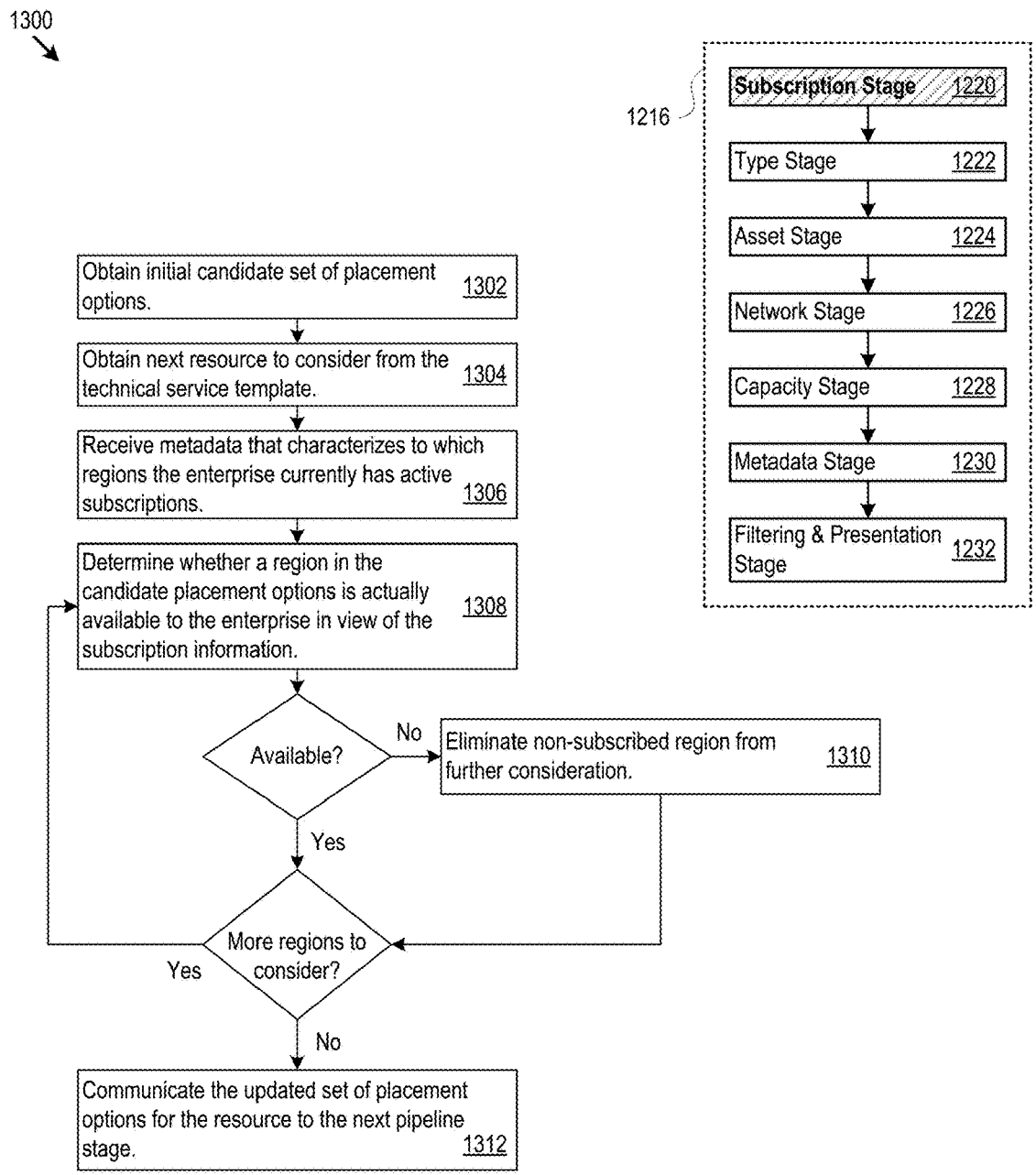
FIGS. 13-19 show logic for determining feasible placement options from candidate placement options.
Figure 14:
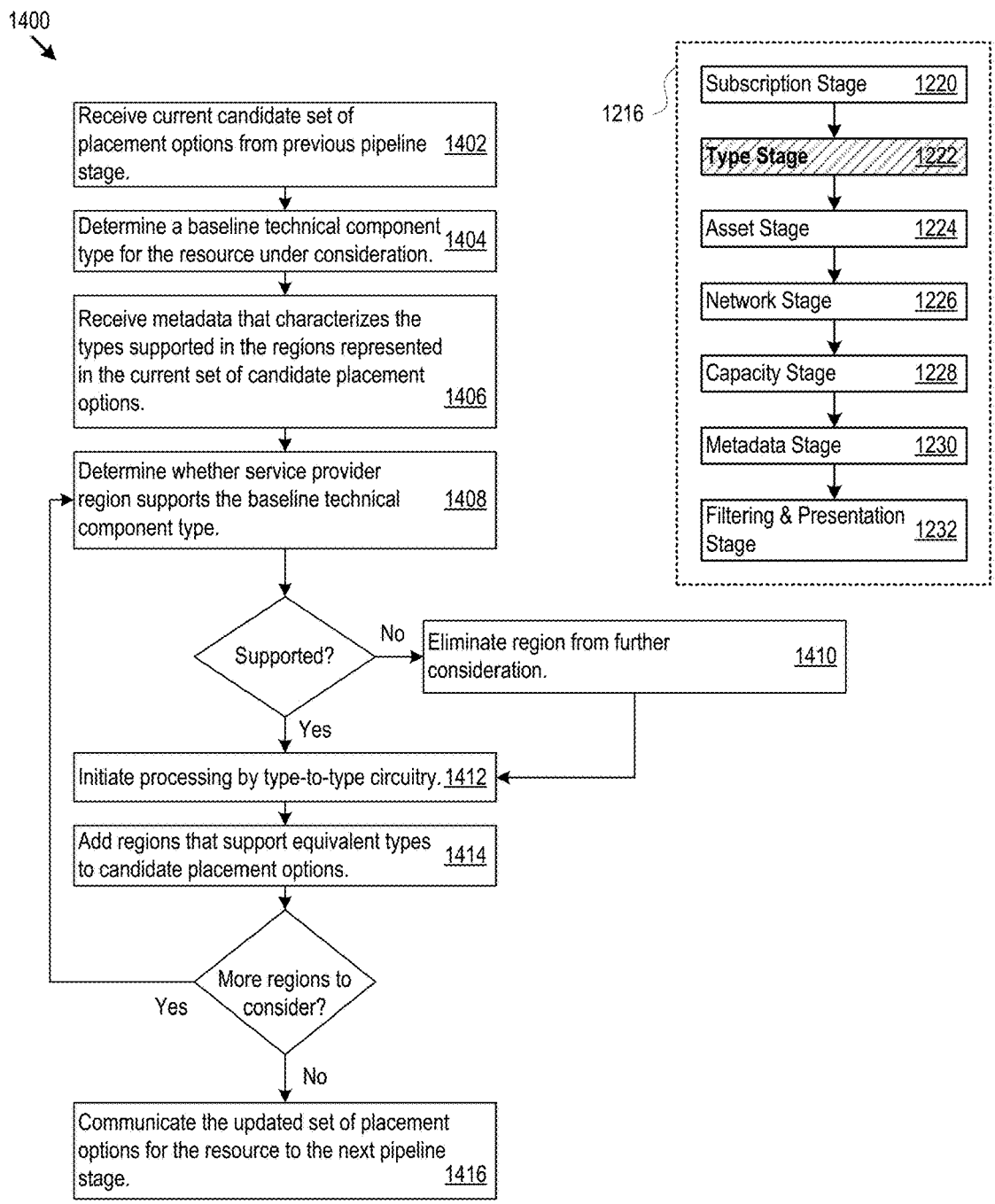
Figure 15:
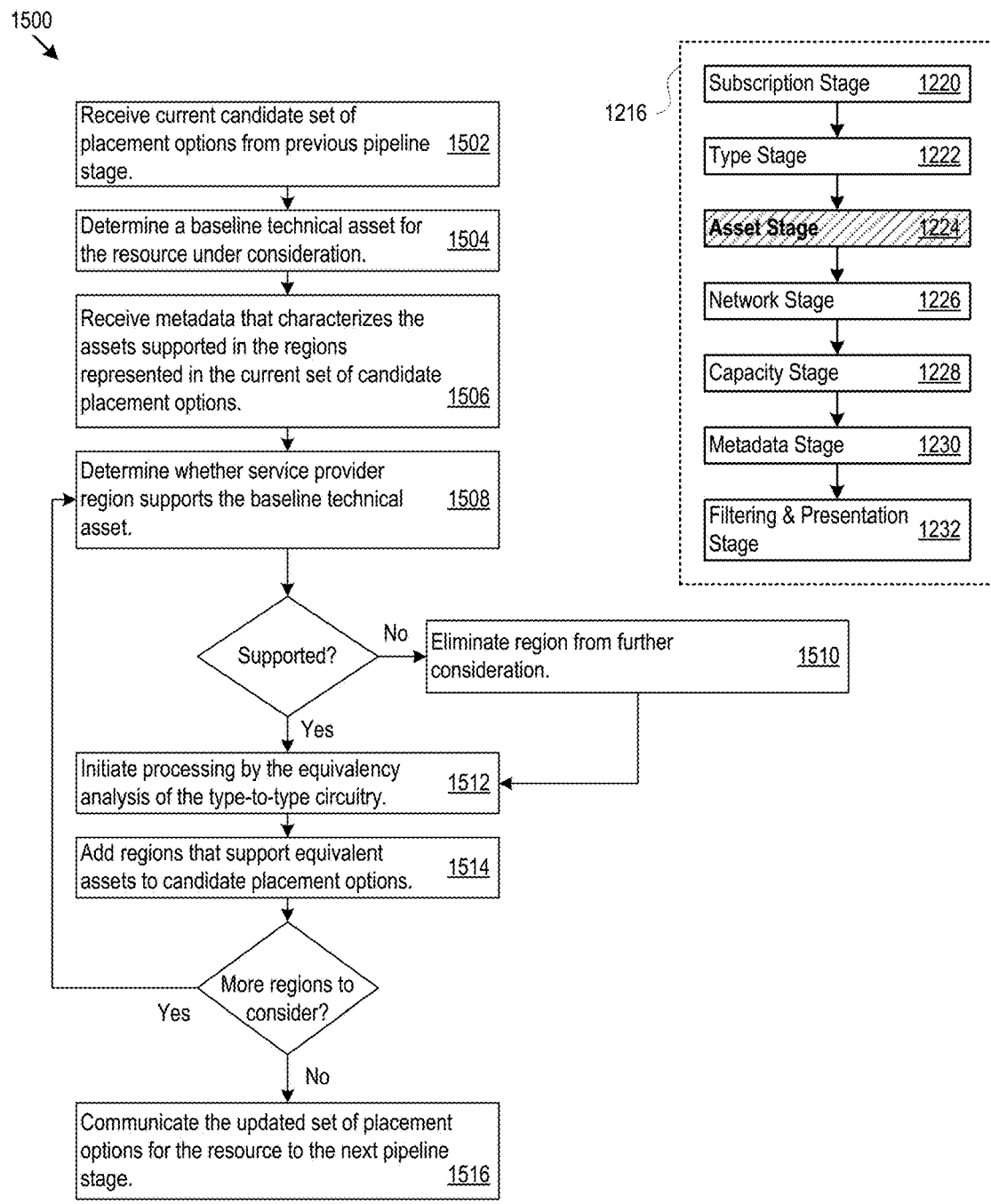
Figure 16:
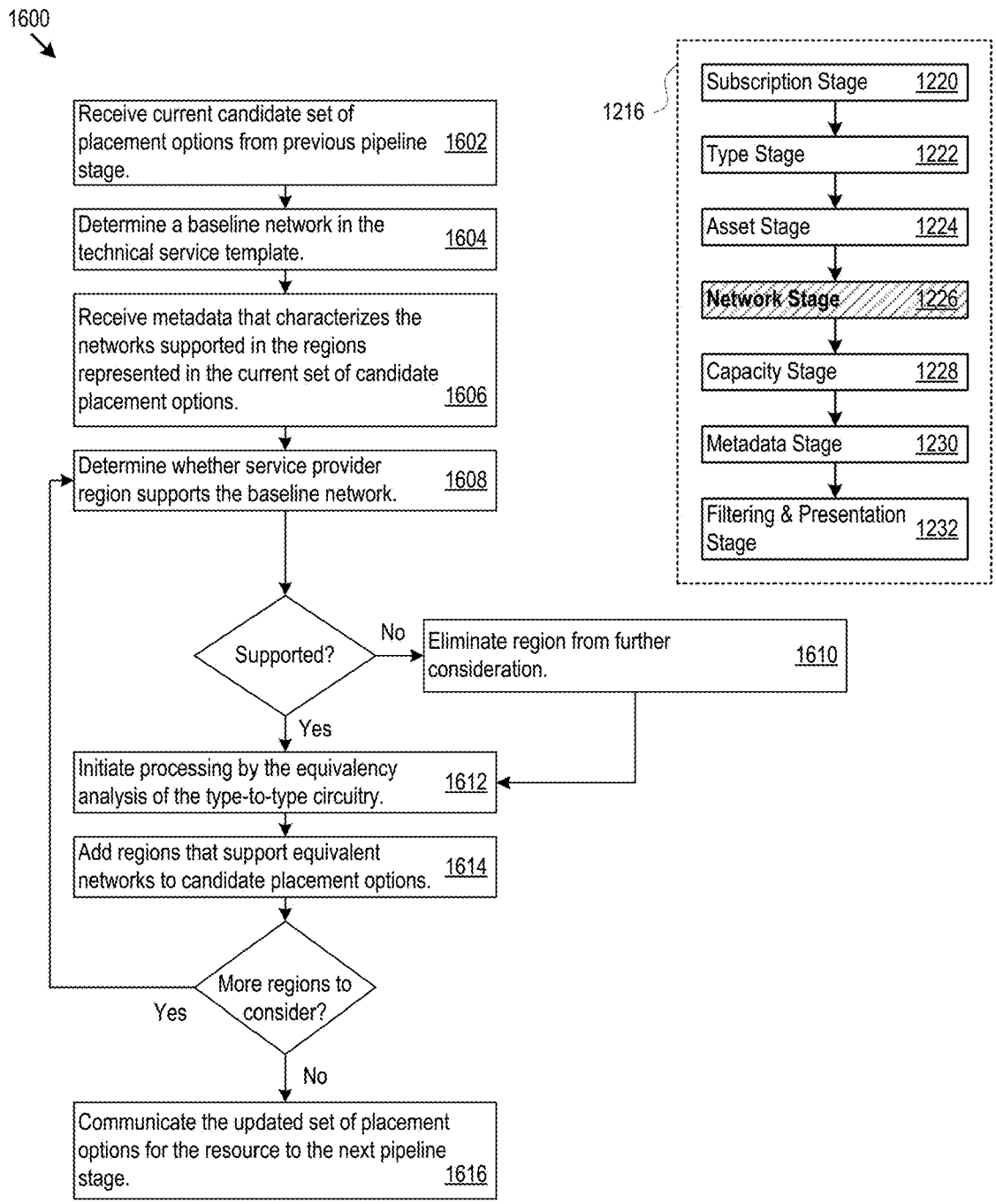
Figure 17:
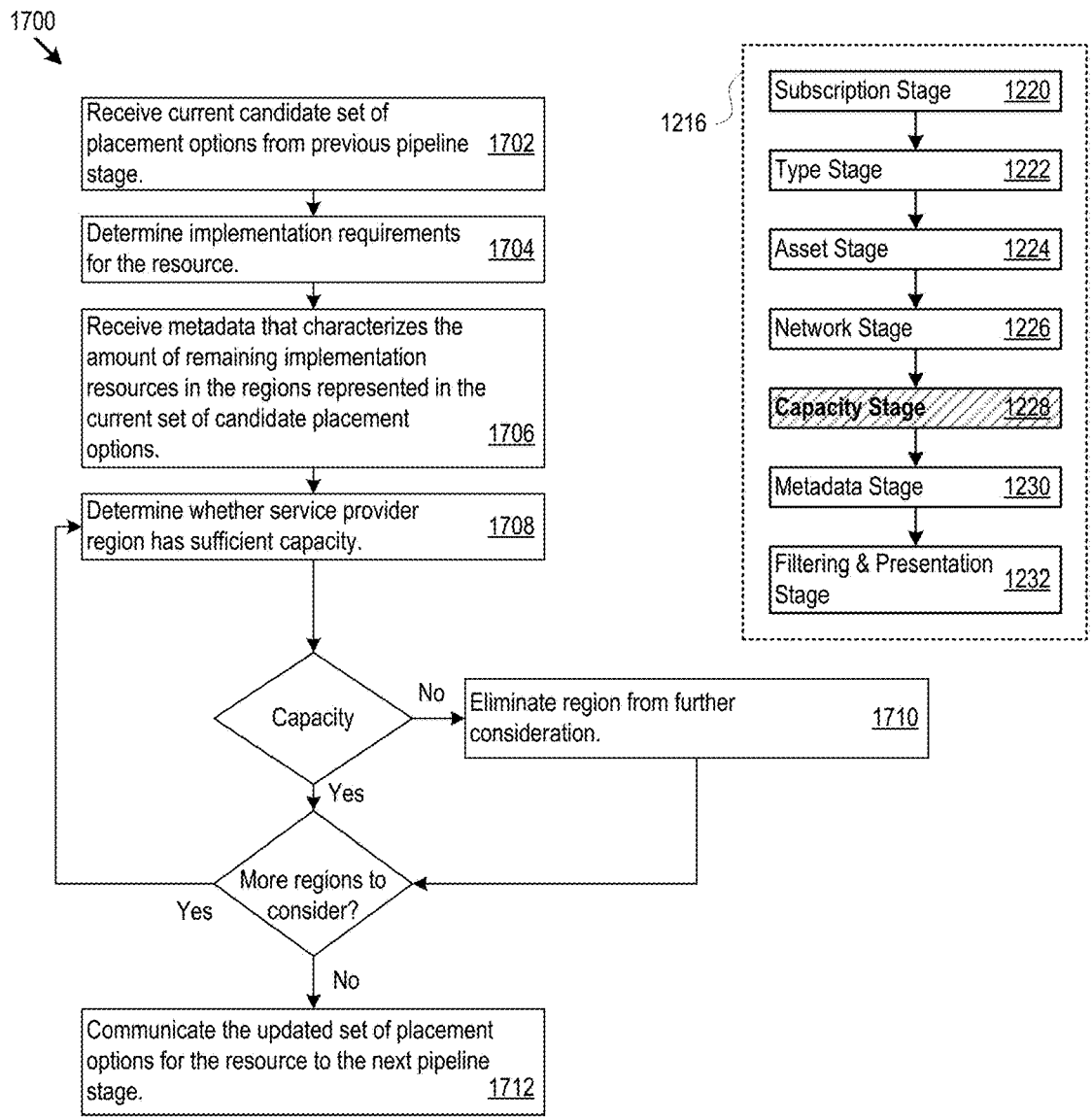
Figure 18:
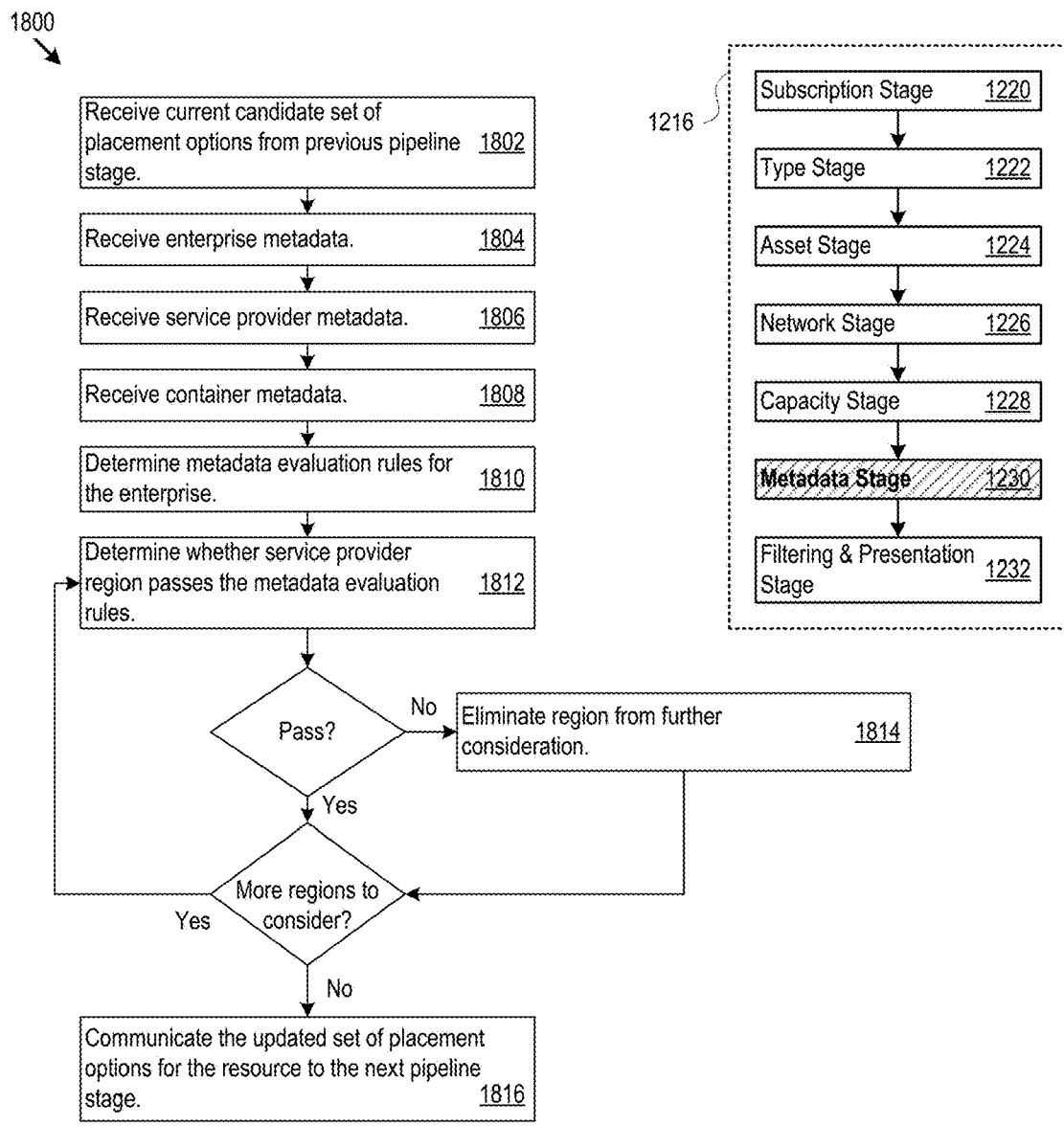
Figure 19:
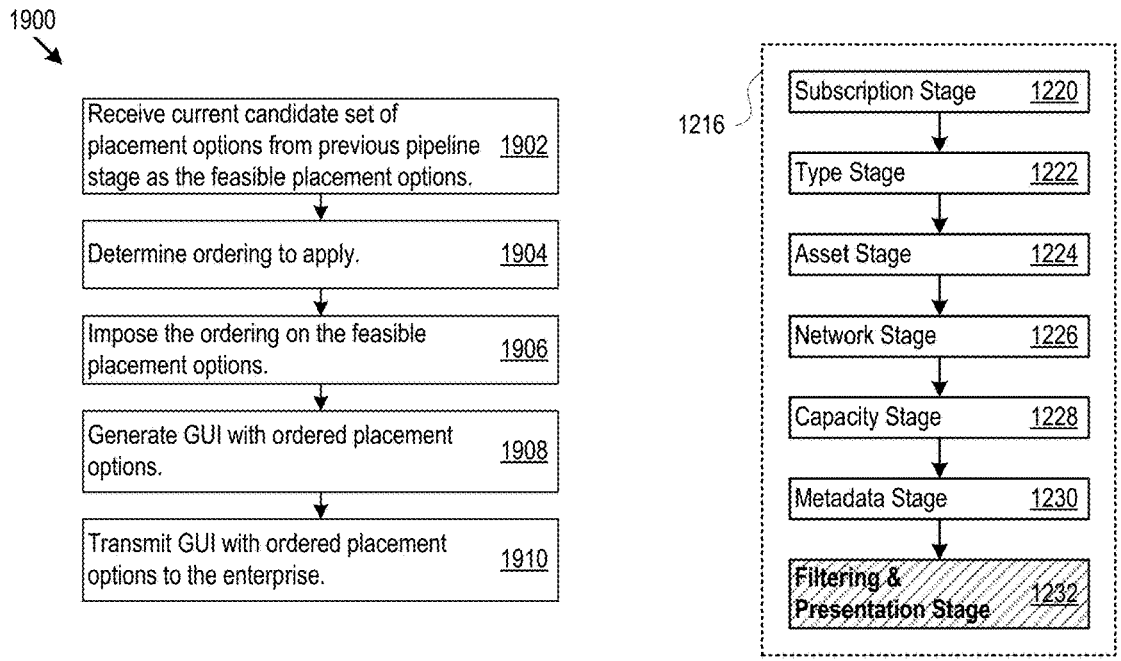

FIG. 12 shows an example implementation of a placement engine 1200 by the placement circuitry 118. FIGS. 13-19 show corresponding logical flows for the placement engine 1200. The placement engine 1200 takes as input a technical service template 1202 which is typically fully concretized with respect to the particular resource requester 150 and all or part of the metadata in the metadata database 226. The placement engine 1200 starts with a set of candidate placement options 1204 for each resource defined in the technical service template 1202 and determines the feasible placement options 1206 for each resource. In one implementation, the placement engine 1200 eliminates, stage-by-stage, placement options from the candidate placement options 1204 that do not pass the filter defined in any particular stage.

The placement engine 1200 also performs filtering to impose an ordering (e.g., by cost, usage popularity, reliability, or other metric) that results in an ordered set of feasible placement options 1208. The placement engine 1200 generates a GUI 1210 which the resource requester 150 renders on a display 1212. The GUI 1210 presents the ordered set of feasible placement options for selection by the resource requester 150. The selection of placement options may drive TTT processing to convert the baseline technical service template into a specific service template for the resource requester 150 and for the technical services the resource requester 150 requested.

The placement engine 1200 performs a placement analysis for each resource 1214 defined in the technical service template 1202. One aspect of the placement engine 1200 is hard technical decision processing stages that make specific determinations on whether specific service provider regions are feasible placement options. In that regard, the HCA 112 may define roll-up regions (some examples are described below in FIGS. 32-37) including two or more regions that the HCA 112 considers equivalent, e.g., with respect to geographic location or connectivity speed and reliability. That is, regions may be members of region collections, and each region in the collection may be considered equivalent such that if one region is a feasible placement option, the other regions in the collection are also feasible placement options.

Another aspect of the placement engine 1200 is a metadata processing stage. The metadata processing stage may make resource requester specific placement determinations. These determinations may turn on the requester metadata 902. For instance, regions that cannot meet the data security requirements specified by the resource requester 150 may be eliminated from consideration. That is, the metadata processing stage may include resource requester specific rulesets that encode resource requester policies, e.g., data governance policies and employee location policies that affect placement decisions.

In the example shown in FIG. 11, the processing aspects of the placement engine 1200 are implemented by the placement pipeline circuitry 1216. The placement circuitry 118 includes multiple sequential pipeline processing stages. There may be additional, different, or fewer pipeline processing stages, and the pipeline processing stages may be arranged in a different sequence than shown in FIG. 12 and with different logical flows shown in FIGS. 13-19.

The placement pipeline circuitry 1216 includes a subscription stage 1220 configured to determine to which service provider regions and networks the resource requester 150 has active subscriptions. The subscription stage 1220 receives the initial set of candidate placement options 1204, e.g., the set of service provider regions known to the HCA 112 (1302), and receives the next resource to analyze in the technical service template 1202 (1304). The subscription stage 1220 also receives metadata that characterizes to which regions the resource requester currently has active subscriptions (1306). This may include the requester metadata 902 and the service provider metadata 904, as examples. The subscription stage 1220 determines which of the candidate placement options are actually available to the resource requester in view of the subscription information (1308), and eliminates from further consideration those regions that are not subscribed (1310). The elimination may happen because, e.g., the resource requester 150 does not subscribe to the service provider at all, because the resource requester 150 does not subscribe to any service provider networks currently offered, or for other subscription reasons. The subscription stage 1220 communicates the updated set of placement options to the next processing pipeline stage, the type stage 1222 (1312).

Expressed another way, associated with the resource requester 150 are subscriptions or accounts, e.g., to cloud service providers such as Amazon or Microsoft. If the resource requester 150 does not have a subscription with, e.g., Amazon Web Services, then the resource requester 150 cannot provision services there. The subscription stage 1220 accordingly eliminates all Amazon regions from consideration. The subscription analysis applies to private clouds as well. In the private cloud scenario, the subscription information may be the credentials used to connect to the private cloud system manager (as one example). If the credentials are not in place in the available metadata, then the subscription stage 1220 may consider that private cloud region unavailable.

The placement pipeline circuitry 1216 also includes a type stage 1222 that receives the current candidate set of placement options from the previous pipeline stage (1402). The type stage 1222 determines a baseline technical component type for the resource under consideration in the technical service template 1202 (1404). For example, the type stage 1222 may identify within the technical service template 1202 the parameter fields that define a virtual machine resource type, e.g., the parameter fields for type, name, location, properties such as size, OS profile, storage profile, and a network profile.

The type stage 1222 also receives service provider metadata 904 (1406). Given the baseline technical component type, and the service provider metadata 904, the type stage 1222 determines which service provider regions support the baseline technical component type (1408). This determination may be made in view of metadata in addition to the service provider metadata 904, as well, such as the requester metadata 902 and container metadata 906 that may specify particular limitations or characteristics of acceptable types.

In addition, the type stage 1222 is configured to initiate processing by the TTT circuitry 116 (1410). The TTT circuitry 116 analyzes the baseline technical component type, e.g., as described above with respect to FIGS. 2-8. The TTT circuitry 116 determines whether equivalent types exist to the baseline technical component type, and if so, in which regions. As such, the type stage 1222 may receive, in response to the TTT processing, additional service provider regions that support an equivalent for the baseline technical component type (1412). The type stage 1222 retains those service provider regions in the candidate set of placement options (1414) (that is, those regions are not eliminated from consideration) and communicates the updated set of placement options to the next processing pipeline stage (1416).

Expressed another way, for every region, there is a relation defined, e.g., in database tables, between type (e.g., VM, website, or SQL database) and region for that type. Not every type is available in every region. The type stage 1222 looks at, for the current resource the placement pipeline circuitry 1216 is trying to place, the relation between the specified type that implements that resource, and the regions remaining after the subscription filter. The type stage 1222 determines whether the service provider has available the specified type in that region. The type filter retains subscribed regions that support the specified type. In addition, the TTT processing also runs to check whether the specified type in the technical service template 1202 is available elsewhere, and whether it is available as an equivalent type in other regions.

In the example of FIG. 12, the placement pipeline circuitry 1216 includes an asset stage 1224 after the type stage 1222. The asset stage 1224 receives the current candidate set of placement options from the previous pipeline stage (1502). The asset stage 1224 determines a baseline technical asset for the resource under consideration in the technical service template 1202 (1504). For example, the type stage 1222 may identify within the technical service template 1202 the parameter fields that define an OS disk or other asset.

The asset stage 1224 also receives the service provider metadata 904 (1506). Given the identified baseline technical asset, and the service provider metadata 904, the asset stage 1224 determines which service provider regions support the baseline technical asset (1508). This determination may be made in view of other metadata in addition to the service provider metadata 904, such as the requester metadata 902 and container metadata 906. Any of the metadata may specify particular limitations or characteristics for acceptable assets.

In addition, the asset stage 1224 is configured to initiate processing by the TTT circuitry 116 (1510). In particular, the equivalency analysis performed by the TTT circuitry 116 analyzes the baseline technical asset, e.g., as described above with respect to FIGS. 2-6. The equivalency analysis determines whether equivalent assets exist to the baseline technical asset, and if so, in which regions. As such, the asset stage 1224 may receive, in response to the equivalency analysis, additional service provider regions that support an equivalent for the baseline technical asset (1512). The asset stage 1224 retains those service provider regions in the candidate set of placement options (1514) (rather than eliminating them) and communicates the updated set of placement options to the next processing pipeline stage (1516).

In other words, assets are associated with regions and subscriptions. Assets are referenced in the technical service template 1202 as supporting a particular resource e.g., a disk image asset. The asset stage 1224 analyzes the asset to make sure there is a relation between that asset and the regions under consideration. The asset stage 1224 eliminates regions that do not have a relationship with the asset. If the asset (or type or network) in the technical service template is a Blue provider asset, but the resource requester does not have a Blue subscription, then unless the asset stage 1224 finds an equivalent in, e.g., a Red provider asset, then the asset cannot be placed and there are no placement options.

Asset metadata, e.g., reflected in the container metadata 906, may include precedence information. That is, if a newer or updated version of a particular asset (e.g., a Windows™ server disk image) is available then it may be used (or considered an equivalent), even if the template specifically calls out an older version.

The placement pipeline circuitry 1216 may also consider networks in its search for feasible placement options. Accordingly, the placement pipeline circuitry 1216 includes a network stage 1226 after the asset stage 1224. The network stage 1226 receives the current candidate set of placement options from the previous pipeline stage (1602). The network stage 1226 determines a baseline network in the technical service template 1202 (1604). For example, the network stage 1226 may identify within the technical service template 1202 the parameter fields that specifically define a network.

The network stage 1226 may receive the service provider metadata 904 (1606). Given the identified baseline network, and the service provider metadata 904, the network stage 1226 determines which service provider regions support the baseline network (1608). This determination may be made in view of metadata in addition to the service provider metadata 904, as well, such as the requester metadata 902 and container metadata 906 that may specify particular limitations or characteristics for acceptable networks.

In addition, the network stage 1226 may initiate processing by the TTT circuitry 116 (1610). In particular, the equivalency analysis performed by the TTT circuitry 116 analyzes the baseline network, e.g., as described above with respect to FIGS. 2-6. The equivalency analysis determines whether an equivalent network exists to the baseline network, and if so, in which regions. The equivalency analysis provides the additional regions to the network stage 1226 (1612). The network stage 1226 retains those service provider regions in the candidate set of placement options (1614) and communicates the updated set of placement options to the next processing pipeline stage (1616).

Even though certain regions are otherwise feasible options for placement of a resource, those regions may not have the capacity to accept the placement. Accordingly, in some implementations, the placement pipeline circuitry 1216 may include a capacity stage 1228 to also consider capacity when searching for feasible placement options.

Like the prior pipeline stages, the capacity stage 1228 receives the current candidate set of placement options from the previous pipeline stage (1702). The capacity stage 1228 determines the implementation requirements for the resource under consideration (1704). For example, the capacity stage 1228 may identify within the technical service template 1202 the parameter fields that identify the number of processors, amount of RAM, VM size, amount of disk space, number of VMs, number of DBs, number of application servers, amount of network bandwidth, number of graphics processing units (GPUs), number of encryption modules, number of network ports or interfaces, and the number or amount of any other components underlying the implementation of a resource.

The capacity stage 1228 receives, e.g., the service provider metadata 904 (1706). Given the identified implementation requirements, and the service provider metadata 904, the network stage 1226 determines which service provider regions have sufficient capacity (1708) to meet the demands of the implementation requirements. In that regard, the capacity stage 1228 may request or receive updated service provider metadata 904 to obtain an updated snapshot of current capacity. The capacity stage 1228 eliminates regions from further consideration which no not have the capacity to implement the resource (1710) and communicates the updated set of placement options to the next processing pipeline stage (1712).

In the example of FIG. 12, the next pipeline stage is the metadata stage 1230. The metadata stage 1230 receives the current candidate set of placement options from the previous pipeline stage (1802). The metadata stage 1230 is configured to determine which service provider regions qualify, with regard to the particular input obtained from the resource requester 150, to provision the implementation of the resource under consideration. The metadata stage 1230 thereby eliminates placement options responsive to the disqualified service provider regions.

In that regard, the metadata stage 1230 may receive, e.g., the requester metadata 902 specifying particular requirements of the resource requester (1804), the service provider metadata 904 specifying capabilities of service providers (1806), and the container metadata 906 specifying the properties of the technical service template (1808). The metadata stage 1230 implements a set of metadata evaluation rules, including evaluation rules that may be resource requester specific (1810). That is, each resource requester 150 may have a customized metadata stage 1230 that handles issues and concerns specific to that resource requester (as represented, e.g., within the requester metadata 902) as well as issues and concerns that may be applicable across multiple resource requesters.

The metadata stage 1230 executes the metadata evaluation rules to determine whether a given service provider region passes the metadata evaluation rules (1812). Some examples are provided below. If not, the metadata stage 1230 eliminates the region from further consideration (1814). After its analysis, the metadata stage 1230 communicates the updated set of placement options to the next processing pipeline stage (1816).

The metadata stage 1230, via the evaluation rules, analyzes resource requester constraints on placement. For instance, the resource requester 150 may specify that certain data is subject to data security rules, e.g. for PII, PCI or ITAR data. If so, the metadata stage 1230 may eliminate from consideration, as examples, those regions that cannot provide the requisite level of data security, and regions that are not in an allowed geographic space (e.g., in the United States or in the EU). Note also that some of the parameters in the concretized technical service template derive from requester metadata 902. Accordingly, the metadata stage 1230 may also analyze the parameters in the concretized technical service template and responsively make further decisions on placement. For instance, information on required geographic placement locations may be derived metadata in the concretized template and obtained from data originally provided as requester metadata 902.

FIG. 12 also shows a filtering and presentation pipeline stage 1232. The filtering and presentation pipeline stage 1232 receives the current candidate set of placement options from the previous pipeline stage (1902). At this final stage (for this example implementation), the current candidate set of placement options have been reduced to the feasible placement options.

The filtering and presentation pipeline stage 1232 is configured to determining an ordering to apply (1904) and impose the ordering upon the feasible placement options (1906). The filtering and presentation pipeline stage 1232 may also generate a GUI composing the ordered placement options (1908) and transmit the GUI to the resource requester 150 through the communication interface 202 (1910).

Note that the ordering may vary widely. In some implementations, the ordering is determined by other metadata, such as the requester metadata 902. For instance, the requester metadata 902 may specify a preferred ordering of alphabetical order, ordering by cost, ordering by preferred service providers, ordering by location, ordering by experience or length of subscription, or any other mechanism for ranking the feasible placement options. Additionally or alternatively, the filtering and presentation pipeline stage 1232 may impose an ordering based on service provider metadata 904, including an ordering by perceived reliability, percentage of prior placement decision made to select a particular service provider, service provider reviews or rankings, or other criteria. The ordering may be visualized with a "star" rating, numeric rating, or some other ranking indicia.

The resource requester 150 selects a placement option for each resource. Selections may be provided manually, though a GUI, or automatically, e.g., according to a pre-defined set of ordered placement preferences for the resource requester 150. The placement options return to the HCA 112. In response, the HCA 112 may execute the TTT processing to actually transform the technical service template into a form suitable for execution by service providers for the selected placement options to instantiate the services requested by the resource requester 150. Note that this may include splitting a baseline technical service template into multiple technical service templates, with the HCA 112 sending each to the corresponding service provider hosting the selected regions. That is, the HCA 112 may determine which service providers host the specific resources identified in the baseline technical service template. When different service providers are involved, the HCA 112 may split the baseline technical service template into an individual technical service template for each service provider. The HCA 112 places, in the individual technical service templates, the resource definitions from the baseline technical service template for those resources that each particular service provider will instantiate.

Figure 20:
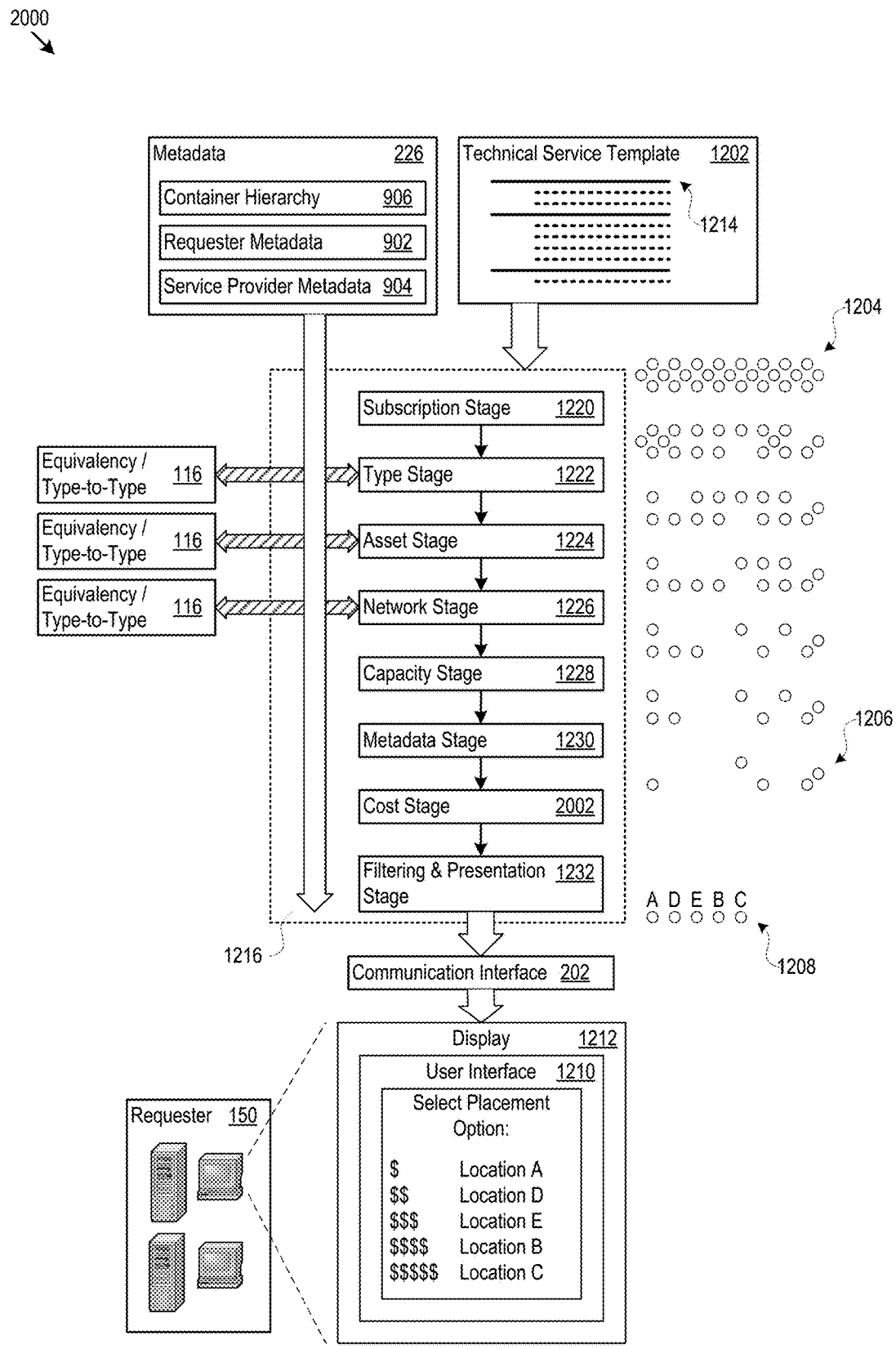
FIG. 20 shows another example of placement pipeline circuitry.

The placement pipeline circuitry 1216 is a flexible, modifiable, customizable mechanism for making placement decisions. FIG. 20 shows another example of a placement engine 2000. In this example, the placement engine 2000 includes a cost stage 2002 added just before the filtering and presentation pipeline stage 1232. The cost stage 2002 may determine the expenditure expected for placing the resources in any given placement location. This analysis may be done based on the figures provided by the service providers and represented in the service provider metadata 904, for instance, for each resource, type, asset, network, or other technical component.

Figure 21:
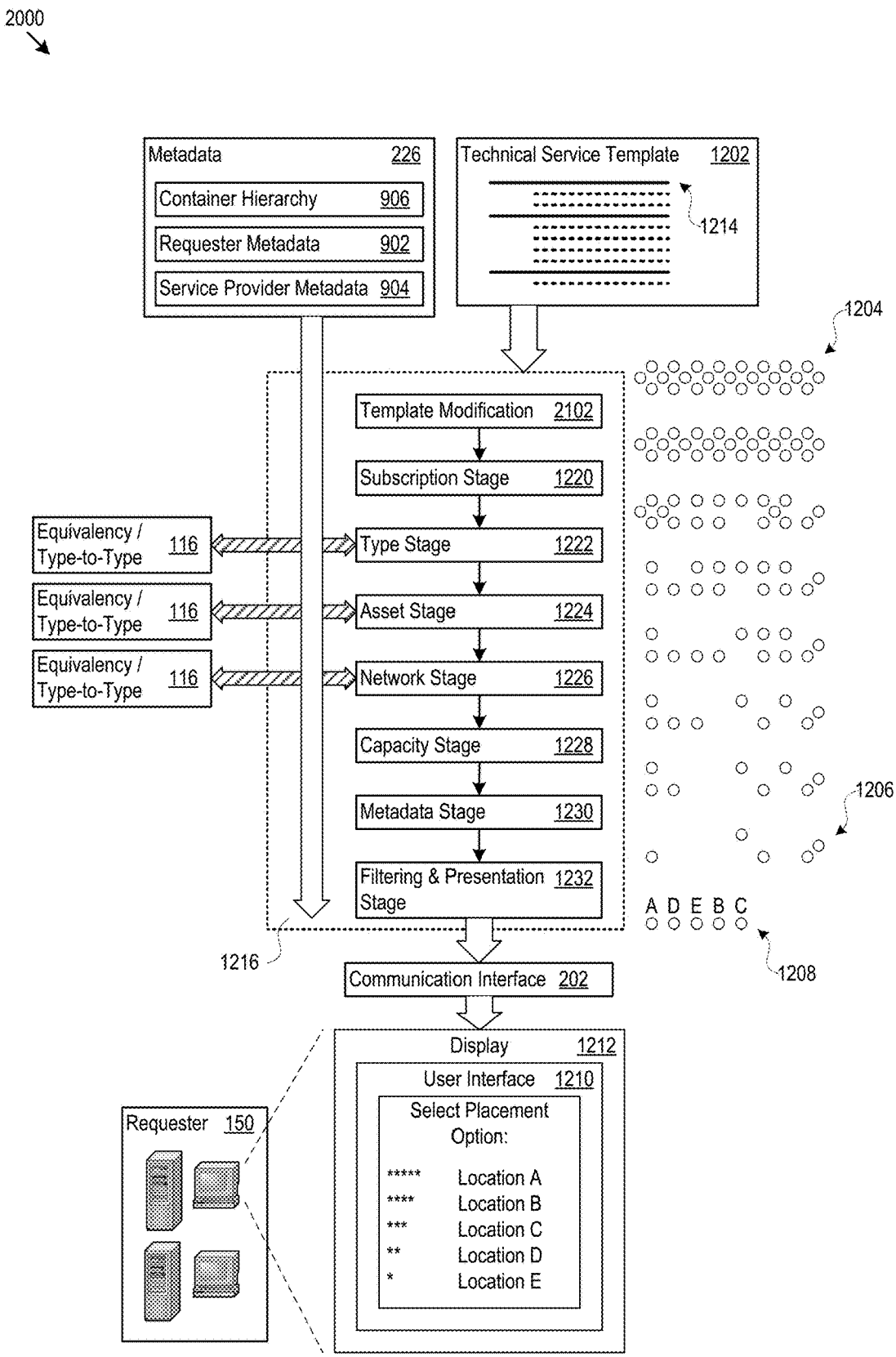
FIG. 21 shows another example of a placement pipeline circuitry.

FIG. 21 shows another example of pipeline placement circuitry 2100. In this example, the placement engine 2000 includes a template modification stage 2102 added as the first stage. The template modification stage 2102 may insert, delete, or change portions of the concretized technical service template in response to any of the metadata in the metadata database 226 according to pre-defined transformation rules. For instance, a transformation rule may specify that if the container metadata 906 specifies a 'Production' environment, then adds a disaster recovery section to the concretized technical service template. The disaster recovery section may define, for example, a set of resources to provide automated backup for the databases defined elsewhere in the concertized technical service template for the production environment.

Figure 22:
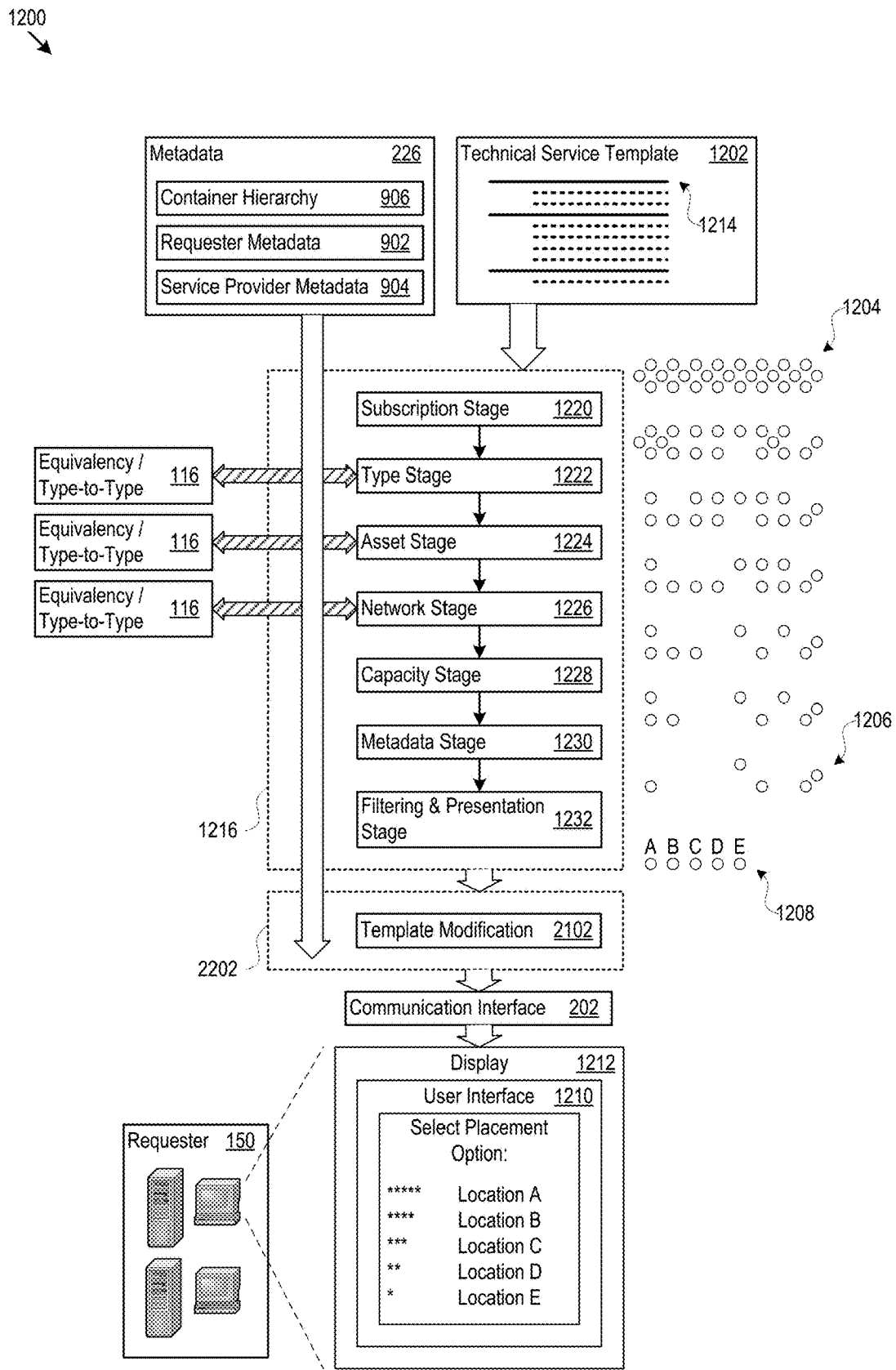
FIG. 22 shows two placement pipelines working in sequence.

FIG. 22 shows another implementation of pipeline placement circuitry 2200. In this example, a second pipeline 2202 follows the first pipeline 1216. The second pipeline implements the template modification stage 2102, with modification done after the filtering and presentation pipeline stage 1232. The modification may implement, for instance, a resource distribution pattern by specifying implementation of resources to specific service providers in specific orders, e.g., round-robin, or fill-to-completion orders. There may be any number and type of additional pipeline stages in any number of additional pipelines following each other in sequence. In any of the placement pipelines, individual pipeline stages may be turned on or off and bypassed according to configuration changes made by the HCA 112.

Returning to the toy company example, the technical service template for a development environment for the toy company may define three VMs for webservers, two VMs for application servers, and two VMs for databases as the technical component types that makeup the development environment. The technical service template may further specify assets. Examples of the assets include a deployment package that deploys content onto webservers and SQL databases, and OS disk images specified by image names for the images that provide the webserver, application server, and database functionality.

As another example of how metadata influences placement, assume that the metadata database 226 establishes that the SharePoint application servers will be memory intensive, and need more RAM rather than disk space or processor speed. The placement circuitry 118 may implement a metadata policy, e.g., in the type stage 1222, that memory intensive servers preferably map to Green VMs, because the Green service provider allows much more flexibility in specifying instance types for memory. The placement circuitry 118 may responsively map the two application servers away from the Blue VMs to the Green VMs, as long as TTT circuitry 116 has established a type mapping from Blue to Green. As a result of such a mapping defined by the TTT databases, the SharePoint provisioning may result in three Blue VMs for web front ends, two Green VMs for application servers, and two Red VMs for the data tier.

Re-Placement

The HCA 112 described above supports dynamic re-determination of placement options and initiating re-placement of resources specified in the technical service templates 908. As one example, the HCA 112 may receive specific re-placement requests from the resource requester 150, and in response, re-evaluate the feasible placement options for individual resources or sets of resources, e.g., those defined in a technical service template. To do so, the HCA 112 may re-execute the placement pipeline circuitry to determine whether there are any updated placement options that specify a new possible placement location for any of the resources. In connection with the re-evaluation, the HCA 112 may obtain updated container metadata 906, requester metadata 902, service provider metadata 904, or any other input data prior to re-executing the placement pipeline circuitry.

Figure 23:
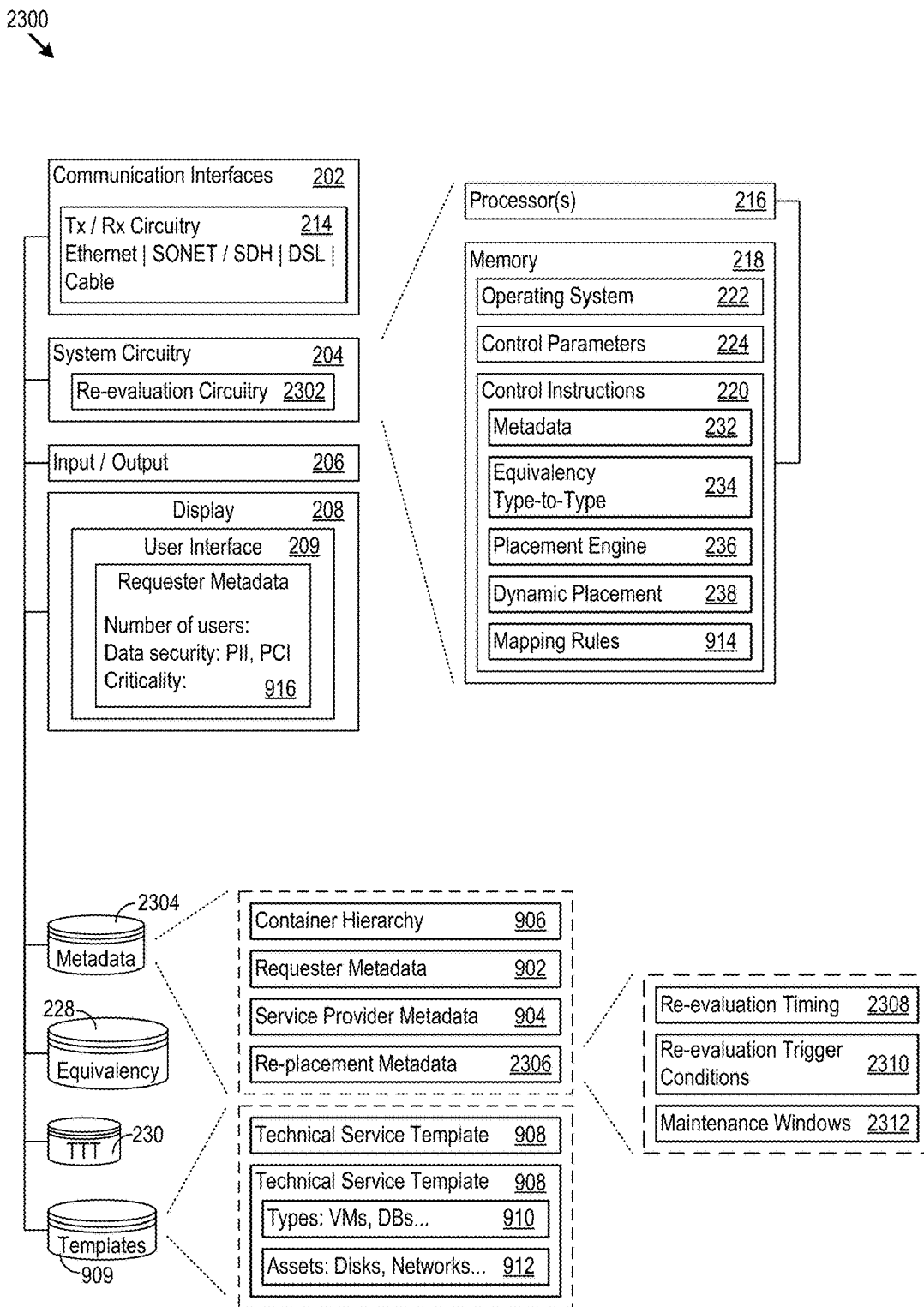
FIG. 23 shows an example of a hybrid cloud architect that supports dynamic re-placement.

FIG. 23 shows an example of a HCA 2300 that supports dynamic re-placement. In the HCA 2300, the system circuitry 204 is extended to include re-evaluation circuitry 2303 for dynamic re-determination of placement options and initiating re-placement of resources. For instance, the processor 216 may execute dynamic placement instructions 238, described in more detail below, for dynamic re-determination and re-placement.

The HCA 2300 also includes extended metadata 2304. In particular, the extended metadata 2304 includes re-placement metadata 2306. The re-placement metadata 2306 may specify re-evaluation timing 2308, re-evaluation trigger conditions 2310, maintenance or update windows 2312, or other re-placement variables. These variables may be set by an individual responsible for setting up the re-evaluation properties for any given resource request, or, for example, a pre-defined set of baseline re-evaluation properties may be inserted as the re-placement metadata 2306. The HCA 2300 may attach the re-placement metadata 2306 to technical service templates, resources, assets, types, service requests, resource requesters, service providers, or at other granularities.

Expressed another way, the re-placement metadata 2306 may be attached to the technical service templates 908 as a whole, or to individual components within the technical service templates 908. That is, the HCA 2300 may define a link between the re-placement metadata 2306 and the technical service template, between the re-placement metadata 2306 and individual resources in the technical service template, or at another level of granularity. The link may be, e.g., a database record that ties all or part of the re-placement metadata 2306 to another object, such as the technical service template. As examples, the re-placement metadata 2306 may be linked to resources, assets, types, or other individual components defined within the technical service templates 908. The re-placement metadata 2306 may also extend or link to any other metadata in the HCA 2300, such as the requester metadata 902, container metadata 906, and service provider metadata 904.

Figure 24:
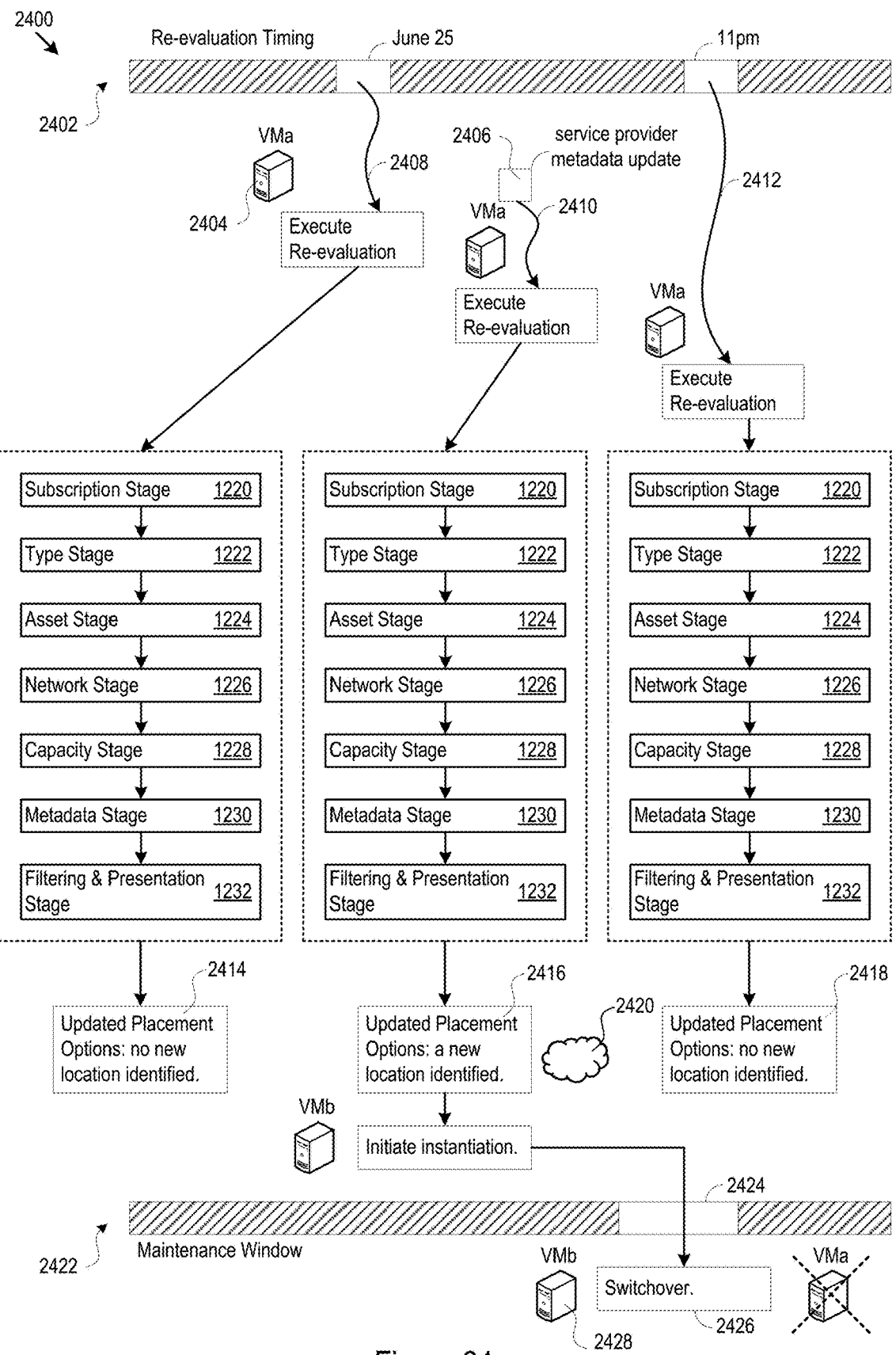
FIG. 24 shows an example of dynamic re-placement.
Figure 25:
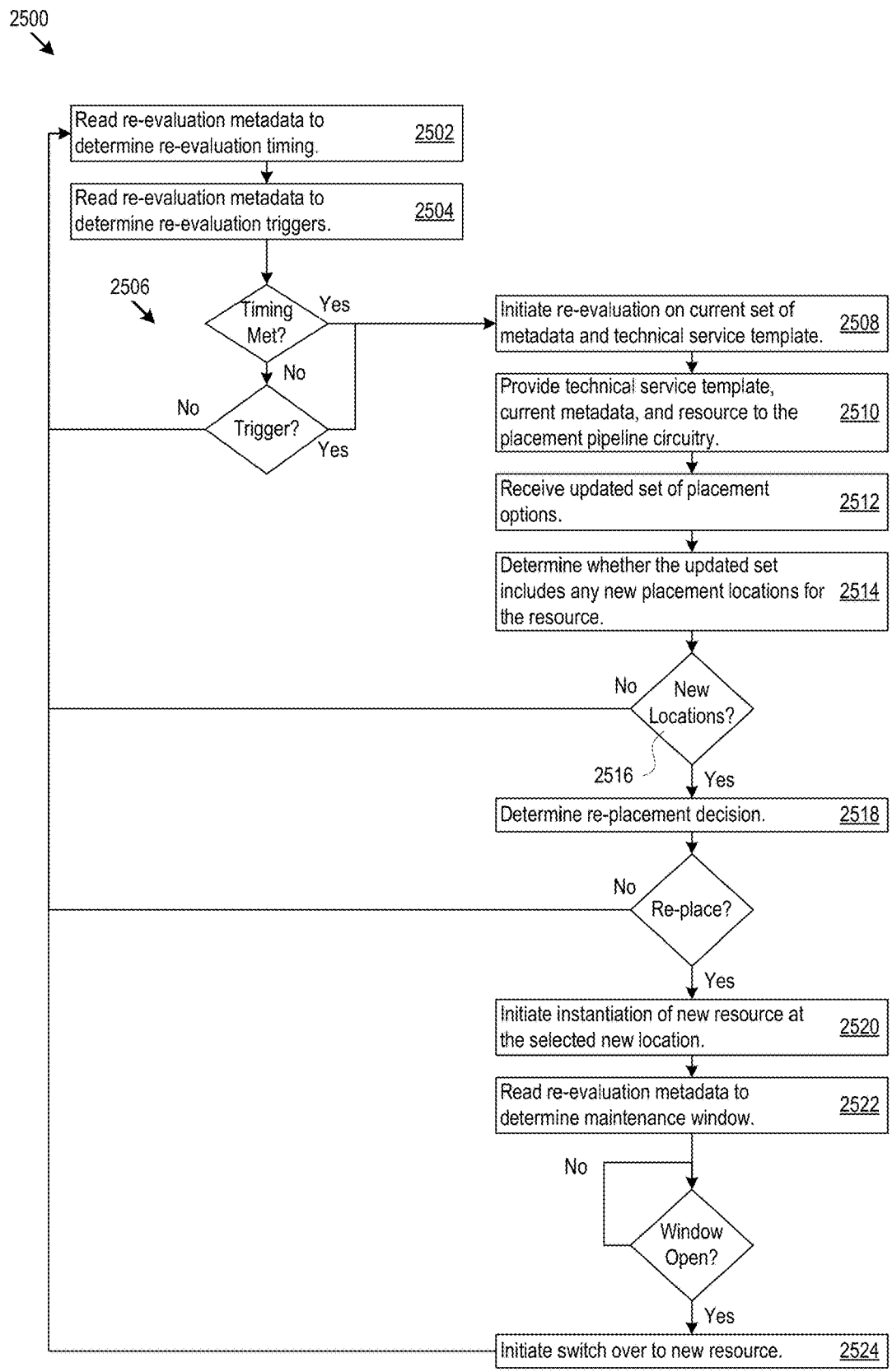
FIG. 25 shows a logical flow for dynamic re-placement.

FIG. 24 shows an example of dynamic re-placement 2400, and FIG. 25 shows a corresponding logical flow 2500. In this example, the re-evaluation circuitry 2302 determines re-evaluation timing 2402 attached to a VM resource, VMa 2404 (2502) and determines a re-evaluation trigger 2406 attached to the VMa 2404 (2504). The re-evaluation circuitry 2302 may determine these parameters by reading the re-placement metadata 2306 linked to the VM resource. The re-evaluation timing 2402 specifies when to perform re-evaluation. As just a few examples, the re-evaluation timing 2402 may specify a regular interval, e.g., nightly, or weekly; a specific date, e.g., on June 25th; a specific time, e.g., at 11 pm each night; or some other time or date specifier or combination of time and date. The re-evaluation trigger specifies a particular condition that will cause re-evaluation regardless of the re-evaluation timing. As one example, the re-evaluation trigger may be a metadata update, for instance, a service provider update of service provider metadata 904. Another example of a re-evaluation trigger is a request for re-evaluation received from the resource requester 150. Another example is an update made to a technical service template used to define or provision resources for the resource requester 150.

The re-evaluation circuitry 2302 determines when to initiate re-evaluation in response to the re-evaluation timing and the re-evaluation triggers (2506). That is, when the re-evaluation timing is met, or the re-evaluation trigger fires, the re-evaluation circuitry 2302 initiates re-evaluation of the resource, preferably using the current updated metadata and technical service template (2508). FIG. 24 shows three example instances of re-evaluation: timing instance 2408, trigger instance 2410, and timing instance 2412.

Initiating re-evaluation may include providing the technical service template 908, current metadata in the metadata database 226, and identification of the resource (VMa 2404) to the placement circuitry 118 (2510). The re-evaluation circuitry 2302 receives in response an updated set of placement options (2512), e.g., the updated placement options 2414, 2416, and 2418 in the example of FIG. 24. The re-evaluation circuitry 2302 also determines whether the updated set includes any new placement locations for the resource, e.g., the new placement option 2420 for the VMa 2404 (2514).

If new locations are available for placing the resource (2516), then the re-evaluation circuitry 2302 may determine whether to actually initiate the re-placement (2518), and if multiple new locations are possible, the selected new location. For instance, the re-evaluation circuitry 2302 may send a re-placement authorization request to the resource requester 150 and receive an acceptance response or denial response. As another example, the re-evaluation circuitry 2302 may automatically determine whether to re-place the resource by evaluating a pre-defined re-placement rule. Examples of a re-placement rule include: always perform re-placement; perform re-placement if the resource belongs to specific resource requesters; perform re-placement if the new location is with a preferred service provider; perform re-placement if the new location is a preferred location; and perform re-placement if the expected cost saving for hosting the resource at the new location exceeds a cost threshold. As an example, assume that VMa, which implements a data server, is initially placed in the Blue service provider region U.S. West. After the initial placement, the Red service provider implements a higher-speed VM resource connected to higher-speed networks. The re-placement process may move VMa from the Blue service provider region to the Red service provider region to take advantage of the faster VM and network connectivity.

Re-placement may be accomplished in different ways. For instance, when a decision is made to re-place the resource, the re-evaluation circuitry 2302 may initiate instantiation and provisioning of a replacement resource first, at the selected new location (2520). The re-evaluation circuitry 2302 read the re-evaluation metadata to determine a maintenance window for the resource requester (2522). FIG. 24 shows example maintenance window metadata 2422 defining a maintenance window 2424. The maintenance window defines, for the particular resource requester, when service may occur on its resources. When the window is open, the re-evaluation circuitry 2302 initiates switch-over to the new resource (2524), and shut down of the existing resource. Switch-over may include pausing the existing resource, and copying the current state of the resource to the newly instantiated replacement. FIG. 24 shows switchover 2426 to the new resource, VMb 2428. The switch-over may be accomplished by initiating an update of routing tables to point to the new resource, after the existing machine state is replicated at the new resource, for instance.

Expressed another way, the re-evaluation circuitry 2302 determines and takes action on maintenance windows attached to resources. Each resource in the HCA 112 may have re-placement metadata attached to it (e.g., through a database table link) that defines the maintenance window when the resource requester will accept some amount of outage or downtime to, e.g., move resources. The re-evaluation circuitry 2302 wait until the window opens for switch-over to avoid major interruptions. The maintenance window may be part of the requester metadata 902 collected from the resource requester 150. Re-evaluation may be performed on any basis, including timing and triggers defined in the re-placement metadata 2306. As one example, the re-evaluation circuitry 2302 may evaluate, for example, every resource in every workload every week and return recommendations to each resource requester.

If moving the resource is authorized, then re-placement is performed, with actual switch-over occurring, e.g., in the migration window. That is, the re-evaluation circuitry 2302 may setup the switch beforehand by provisioning new resources in a new region ahead of time, because in some cases significant time is needed to setup the replacement resource. Once the new resources are provisioned, the actual switch to the new resource may wait until the migration window is open. Alternatively, the re-evaluation circuitry 2302 may perform an offline migration during the maintenance window by shutting down the resource, copying over to the new location, and restarting the resource.

Figure 26:
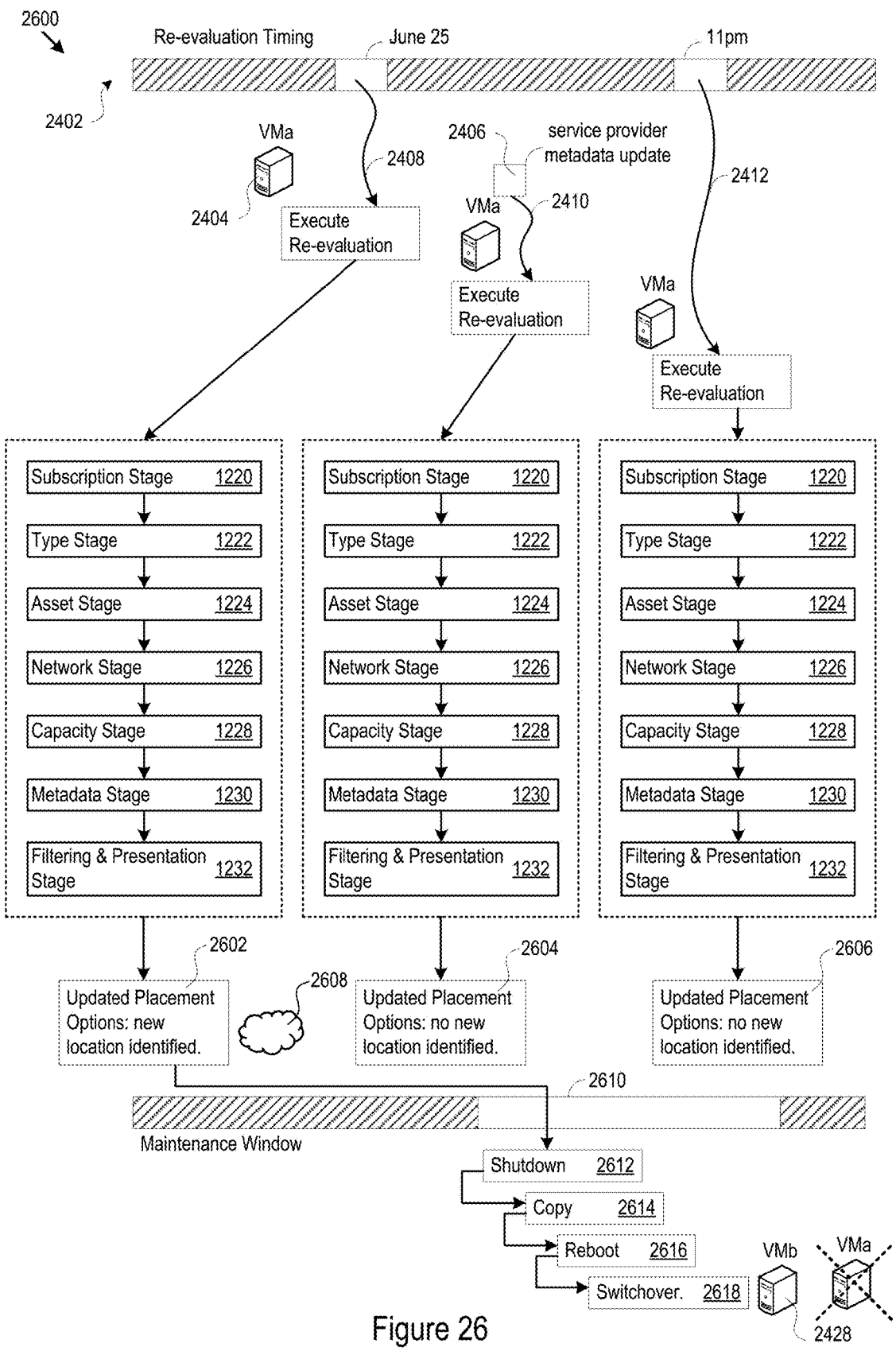
FIG. 26 shows an example of offline dynamic re-placement.

FIG. 26 shows an example of offline dynamic re-placement 2600, continuing the example shown in FIG. 24. In FIG. 26, the updated placement decisions 2602, 2604, and 2606 result from re-evaluating placement options. The updated placement decisions 2602 include a new placement location 2608. When the maintenance window 2610 opens, the re-evaluation circuitry 2302 initiates shut-down 2612 of the resource (the VMa 2404 in this example). The re-evaluation circuitry 2302 then copies 2614 the resource to the new placement location 2608. The copied resource reboots 2616, and the re-evaluation circuitry 2302 initiates switch-over 2618, e.g., by updating routing tables. The re-placement need not complete within the maintenance window 2610.

The HCA 2300 includes placement pipeline circuitry comprising multiple processing stages configured to determine initial placement options for a technical component (e.g., a type like a VM, or assets like OS disks) of a specified service request. The HCA 2300 stores (e.g., as re-placement metadata 2306), timing metadata linked to the technical component. The timing metadata defines a dynamic re-evaluation timing specifier for re-evaluating placement of the technical component. The re-evaluation circuitry 2302 is responsive to the dynamic re-evaluation timing specifier to re-execute the placement pipeline circuitry on the technical component and determine updated placement options including a new placement location for the technical component.

Note that the specified service request is linked to a specific resource requester. Placement execution metadata for the specific resource requester defines an update time window (e.g., a maintenance window) for making adjustments to the specified service request. The re-evaluation circuitry 2302 initiates instantiation of a replacement component for the technical component at the new placement location responsive to determining the updated placement options. Further, the re-evaluation circuitry initiates switchover to the replacement component within the update time window.

Several examples follow of changes that may cause new placement locations to become available. The placement pipeline circuitry 1216 includes a subscription stage 1220 that may determine to a change to which service provider regions the resource requester has active subscriptions, and thereby determine new placement locations. The placement pipeline circuitry 1216 also includes a type stage 1222 and an asset stage 1224 configured to determine a change to which service provider regions support the technical components, and thereby determine the new placement locations. Similarly, the capacity stage 1228 may determine a change in which service provider regions have capacity to provision the technical component, and thereby determine the new placement locations. In addition, the metadata stage 1230 may determine a change to which service provider regions qualify to provision the technical component and thereby determine the new placement locations.

The HCA 2300 receives a technical service template for implementing a service request for a resource requester. The HCA 2300 identifies a resource (e.g., a VM) within the technical service template, and executes, for the resource, placement pipeline circuitry comprising multiple processing stages configured to determine initial placement options for the resource. The HCA 2300 also executes re-evaluation circuitry 2302 configured to determine when to re-execute the placement pipeline circuitry for the resource and determine updated placement options including a new placement location for the resource.

Timing metadata linked to the resource provides a timing specifier for re-evaluating placement of the resource. The HCA 2300 also obtains placement execution metadata linked to the resource requester. The placement execution metadata defining an update time window for implementing the new placement location. Accordingly, the HCA 2300 may initiate provisioning of a replacement for the resource at the new placement location responsive to determining the updated placement options and initiate switchover to the replacement within the update time window.

Placement and Provisioning Architecture

Figure 27:
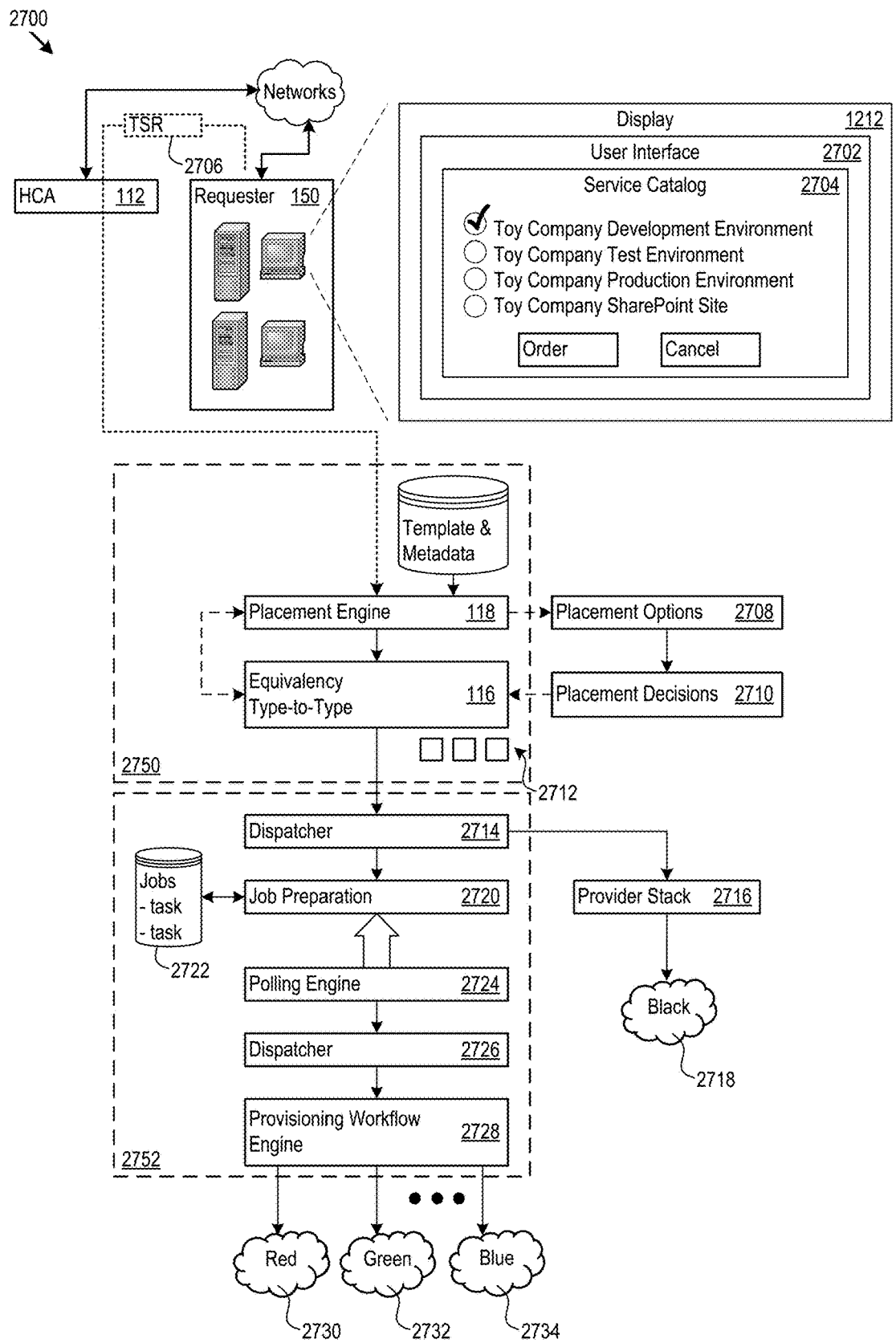
FIG. 27 shows a cloud computing placement and provisioning architecture.
Figure 28:
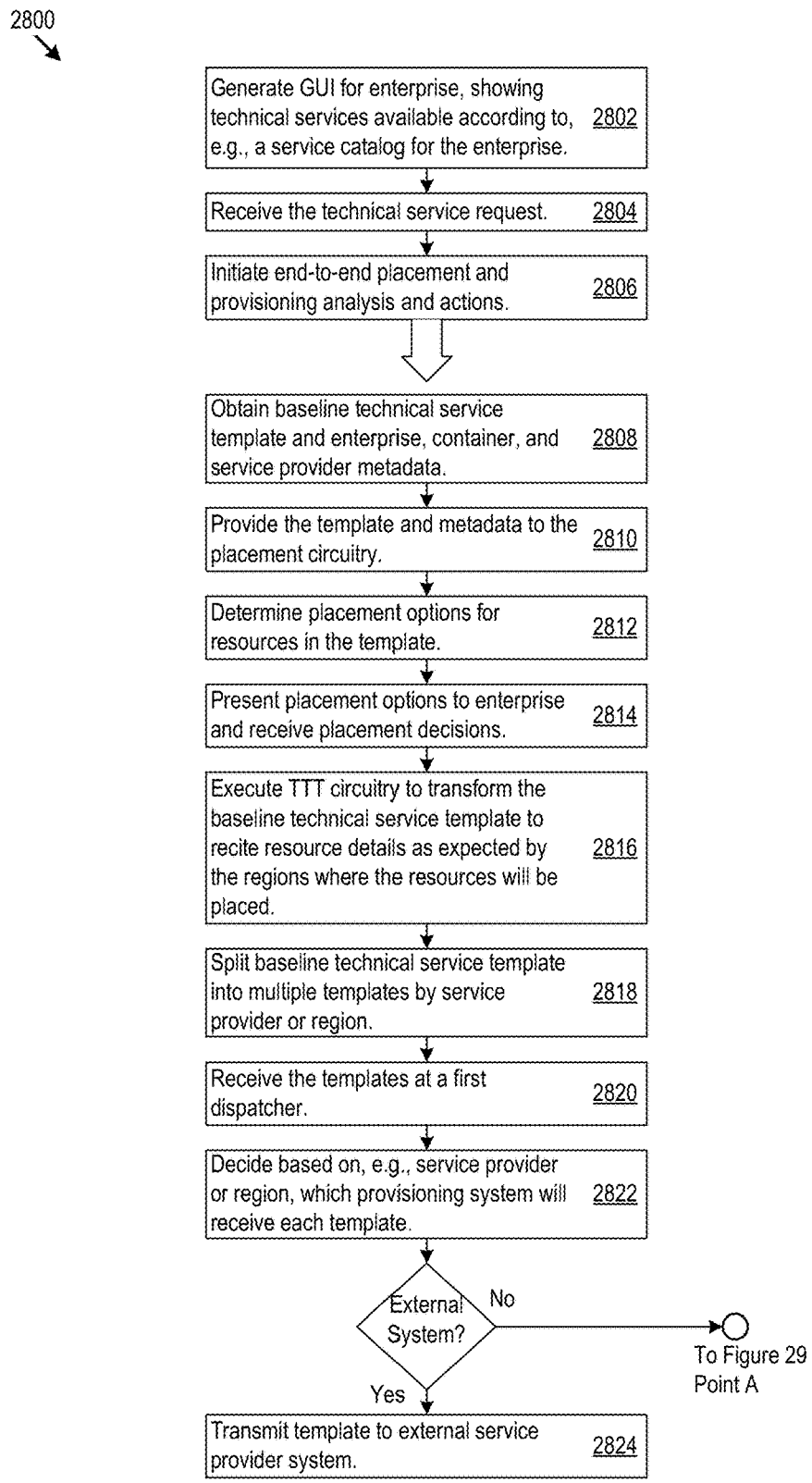
FIGS. 28 and 29 show logical flow for a cloud computing placement and provisioning architecture.
Figure 29:
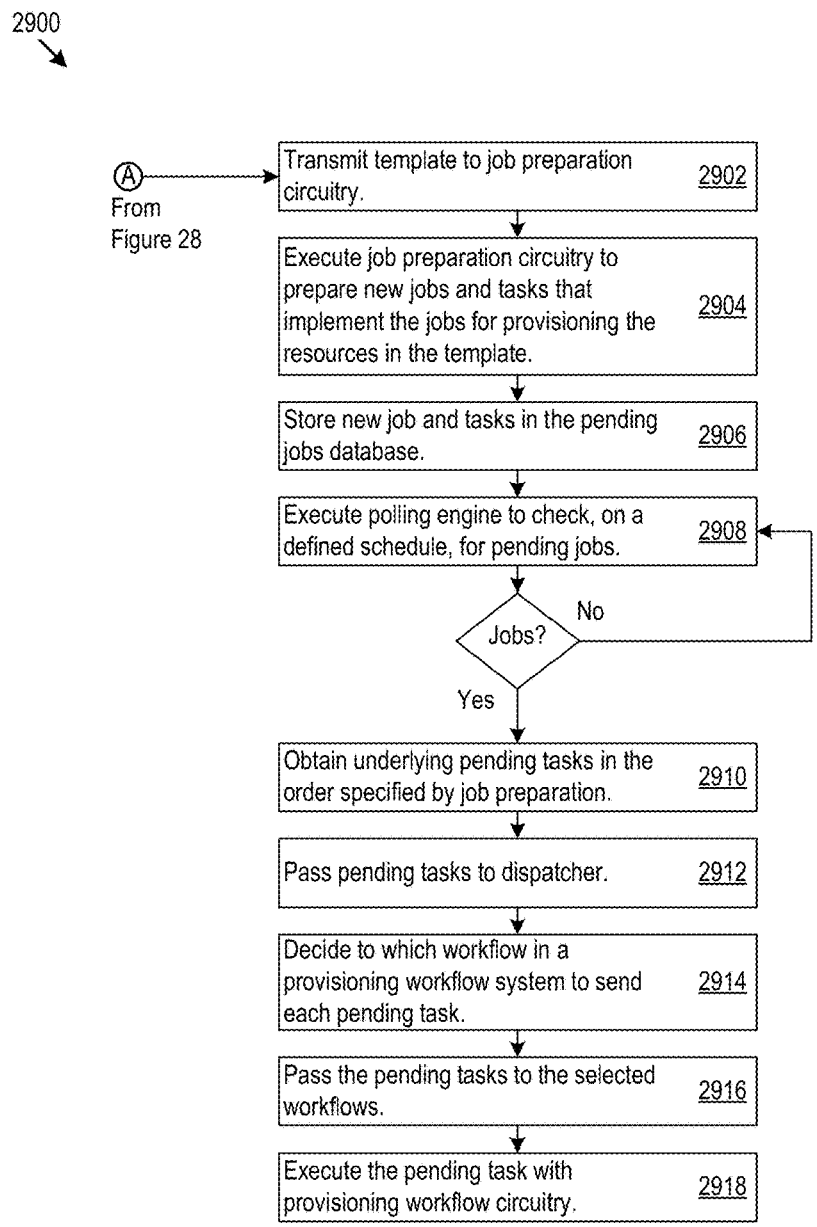

FIG. 27 shows a cloud computing placement and provisioning architecture 2700. This particular example of the cloud computing placement and provisioning architecture 2700 is grouped for purposes of illustration into placement circuitry 2750 and provisioning circuitry 2752. Other implementations may vary widely. FIGS. 28 and 29 show corresponding logical flows 2800 and 2900, respectively. The HCA 112 generates a GUI 2702, e.g., rendered locally at the resource requester 150. The GUI 2702 displays, in this example, the services available to the resource requester 150 as reflected in a service catalog 2704 maintained for the resource requester 150 (2802). The resource requester 150 issues a technical service request (TSR) 2706 for virtualized hosting, e.g., for the toy company development environment. The HCA 112 receives the technical service request (TSR) (2804) 2706 and initiates end-to-end placement and provisioning analysis and actions (2806), examples of which are shown in FIG. 27.

For instance, the HCA 112 may retrieve the baseline technical service template for the development environment, and the requester metadata 902, container metadata 906, and service provider metadata 904 (2808). The HCA 112 provides these inputs to the placement circuitry 118 (2810), which determines the placement options 2708 for each resource in the baseline technical service template (2812). If there are no placement options for a particular resource, then it may not be possible to provision the development environment. However, if each resource has a placement option, then the HCA 112 may request the resource requester 150 to make placement decisions 2710 (2814).

The TTT circuitry 116 transforms the baseline technical service template to meet the technical component specification details expected by the regions where the resources will be placed (2816). As discussed above, the TTT circuitry 116 may perform equivalency analysis to find equivalent assets and may also perform type translation to identify and specify equivalent types (e.g., VMs). When the service request will provision resources to multiple different regions or service providers, then the TTT circuitry 116 may also split the baseline technical service template into multiple individual templates 2712, each specifying resources for a particular servicer provider or region (2818).

A first dispatcher 2714 receives the templates (2820) and decides, responsive to, e.g., the service provider or region, which provisioning system should receive the template (2822). That is, the HCA 112 may handoff a template to an external service provider system (2824), e.g., a Microsoft™ Azure™ stack. FIG. 27 shows an external service provider 2716 that receives a particular template. In response to receiving the particular template, the external service provider 2716 performs the provisioning actions that lead to instantiation of the resources specified in the template in the Black region 2718.

The HCA 112 may process templates by passing them to the job preparation circuitry 2720, which may be referred to as a job manager or shredder (FIG. 29, 2902). The HCA 112 executes the job preparation circuitry 2720 to prepare new jobs and tasks that implement the jobs for provisioning the resources in the template (2904). The job preparation circuitry 2720 stores the new provisioning job and the tasks in a pending job database 2722 (2906). These represent pending provisioning jobs implemented with pending tasks. In this regard, the job preparation circuitry 2720 reads the dependencies in the template, and specifies tasks in the reverse order to satisfy the dependencies. For instance, when the template specifies that a development environment relies on a web tier and a data tier for operation, the job preparation circuitry 2720 may create a development environment job, including a task to provision the web tier first, then a task to provision the data tier, then a task to instantiate the development environment itself.

The polling circuitry 2724, on a pre-determined schedule, queries the job preparation circuitry 2720 for pending tasks (2908). The polling circuitry 2724 may continue to query for new provisioning jobs as long as the polling circuitry 2724 remains running. When a new provisioning job is found, the polling circuitry 2724 obtains the underlying pending tasks in the order specified for implementation by the job preparation circuitry 2720 (2910).

The polling circuitry passes the pending tasks to the dispatcher circuitry 2726 (2912). The dispatcher circuitry 2726 decides to which workflow to send the pending tasks (2914), and sends the pending tasks for execution (2916). The workflows are defined, e.g., by runbooks, in the provisioning workflow circuitry 2728. The runbooks may be implemented as a pre-defined set of procedures and operations carried out by a system to accomplish a task. The provisioning workflow circuitry 2728 may execute service management automation (SMA) or other tools for executing any pending task, e.g., via by calling a selected runbook for that task (2918). The provisioning workflow circuitry 2728 communicates with the service providers, responsive to the provisioning actions carried out under direction of the runbooks. As a result, the resources specified in the templates, and the resources that constitute the requested development environment, become provisioned in any number of service provider regions, e.g., the Red region 2730, the Green region 2732, and the Blue region 2734.

Figure 30:
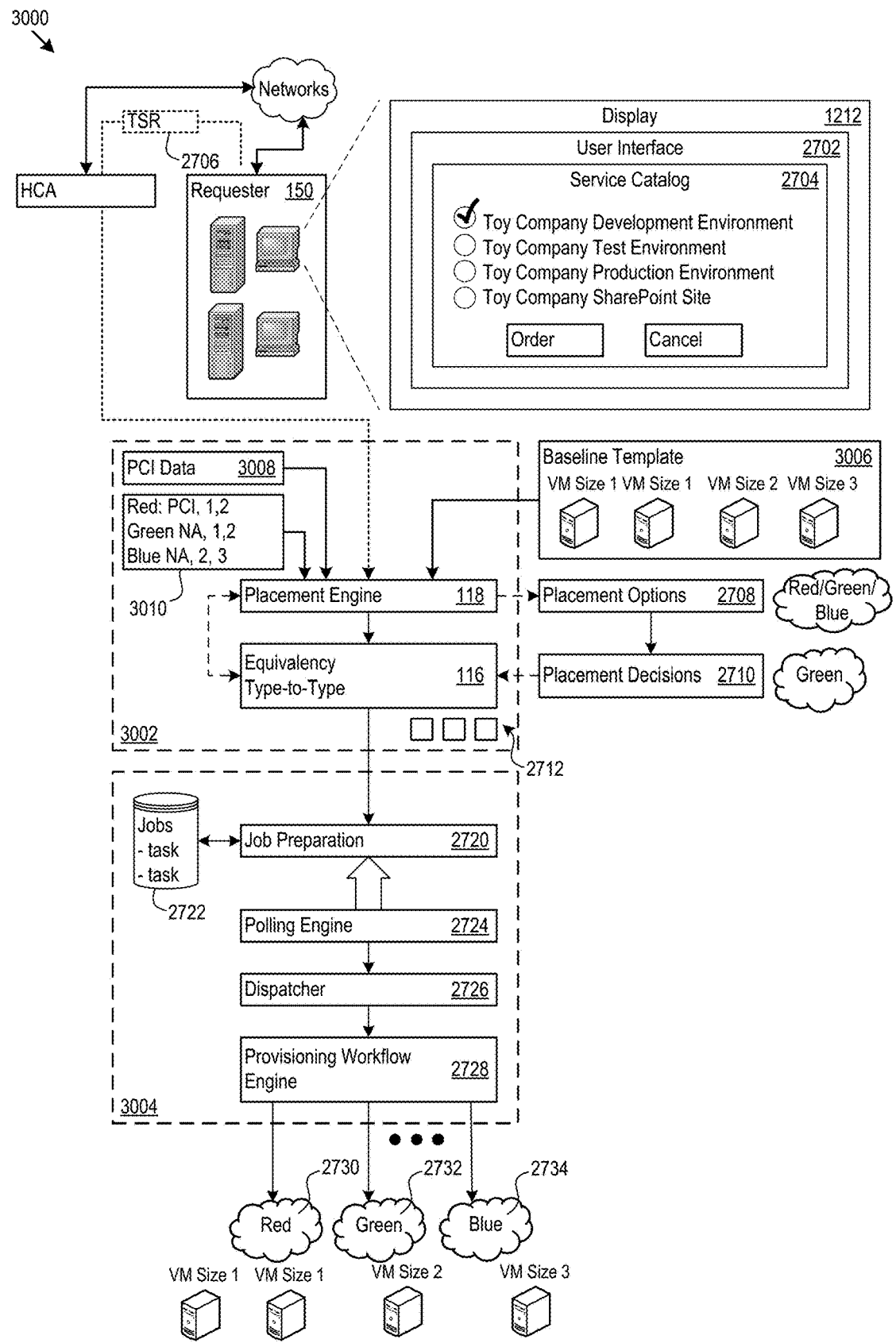
FIG. 30 shows an example execution of the cloud computing placement and provisioning architecture.

FIG. 30 shows another example of the cloud computing placement and provisioning architecture 3000, including placement circuitry 3002 and provisioning circuitry 3004. In this example, the resource requester 150 has requested a development environment. The baseline template 3006 defines that the development environment includes resources corresponding to four VMs, two of size 1 for the data tier, one of size 2 for the application tier, and one of size 3 for the web front end.

The requester metadata 3008 specifies PCI data security, applicable to the data tier. The service provider metadata 3010 specifies that: the Red region supports PCI data, and size 1 and 2; the Green region does not support PCI data, and supports size 1 and 2 VMs; and the Blue region does not support PCI data, and supports size 2 and 3 VMs.

Responsive to the baseline template 3006, service provider metadata 3010, and requester metadata 3008, the placement circuitry 118 determines placement options for each resource in the baseline template 3006. In this scenario, the placement circuitry 118 determines that both VMs in the data tier must be provisioned in the Red region, because only the Red region supports PCI data for the size 1 VMs that constitute the data tier. The placement circuitry 118 also determines that the size 2 VM for the application tier may be placed in any of the Red, Green, or Blue regions. In this example, the resource requester chooses the Green region. Finally, the placement circuitry determines that only the Blue region can host the size 3 VM for the web front end.

In other words, the placement circuitry 3002 has found a way to locate the set of resources needed for the development environment within the large search space of multiple different providers and regions. The provisioning circuitry 3004 may then coordinate instantiation of the size 1 VMs for the data tier into the Red region 2730, the size 2 VM for the application tier into the Green region 2732, and the size 3 VM for the web front end into the Blue region 2734. To that end, the placement circuitry 3002 may split the baseline template into multiple, e.g., 3, concretized technical service templates, one for each region. The placement circuitry 3002 passes each concretized technical service template to the job preparation circuitry 2720 for processing.

The example above addressed VMs and data security requirements. However, as noted above, the placement circuitry 3002 may address other technical component types as well, in addition to different types of assets, such disk images.

Expressed another way, the HCA 112 includes a communication interface configured to receive a selection of a computing environment (e.g., a development environment) for provisioning from a resource requester. The HCA 112 also includes placement circuitry in communication with the communication interface that determines placement options (e.g., the Red region, Blue region, or Green region) for a resource type (e.g., a Green VM) for implementing part of the computing environment. The placement circuitry 118 also obtains from the resource requester 150 a selected placement chosen from among the placement options. TTT circuitry 116 in the HCA 112 determines a service provider region corresponding to the selected placement and translates the resource type to a destination type (e.g., a Blue VM) for provisioning in the service provider region. Provisioning circuitry 2752 initiates provisioning of the destination type within the service provider region. The provisioning circuitry 2752 may vary widely in implementation, for instance including the job preparation circuitry 2720, polling circuitry 2724, dispatcher circuitry 2726, and provisioning workflow circuitry 2728. Other implementations of the provisioning circuitry 2752 may include the additional dispatcher 2714, or have additional or different circuitry.

As noted above, for determining the placement options, the placement circuitry 118 may receive a technical service template for the computing environment, with the technical service template specifying the resource type. The placement circuitry 118 may also receive container metadata characterizing a structural organization of the resource requester, requester metadata specifying implementation options of the resource requester for the computing environment, and service provider metadata specifying available technical components available from different service providers.

The job preparation circuitry 2720 prepares a new job and tasks that implement the new job for provisioning the destination type. The job preparation circuitry 2720 stores the new job and the tasks in a pending job database as pending jobs with pending tasks. The polling circuitry 2724 is configured to query the job preparation circuitry 2720 for the pending jobs with the pending tasks. As explained above, the dispatcher circuitry 2726 obtains the pending tasks and provides the pending tasks to the provisioning workflow circuitry 2728. The provisioning workflow circuitry 2728 initiates provisioning of the destination type within the service provider region by sending the pending tasks to a service provider system responsible for instantiating resources in the service provider region.

Figure 31:
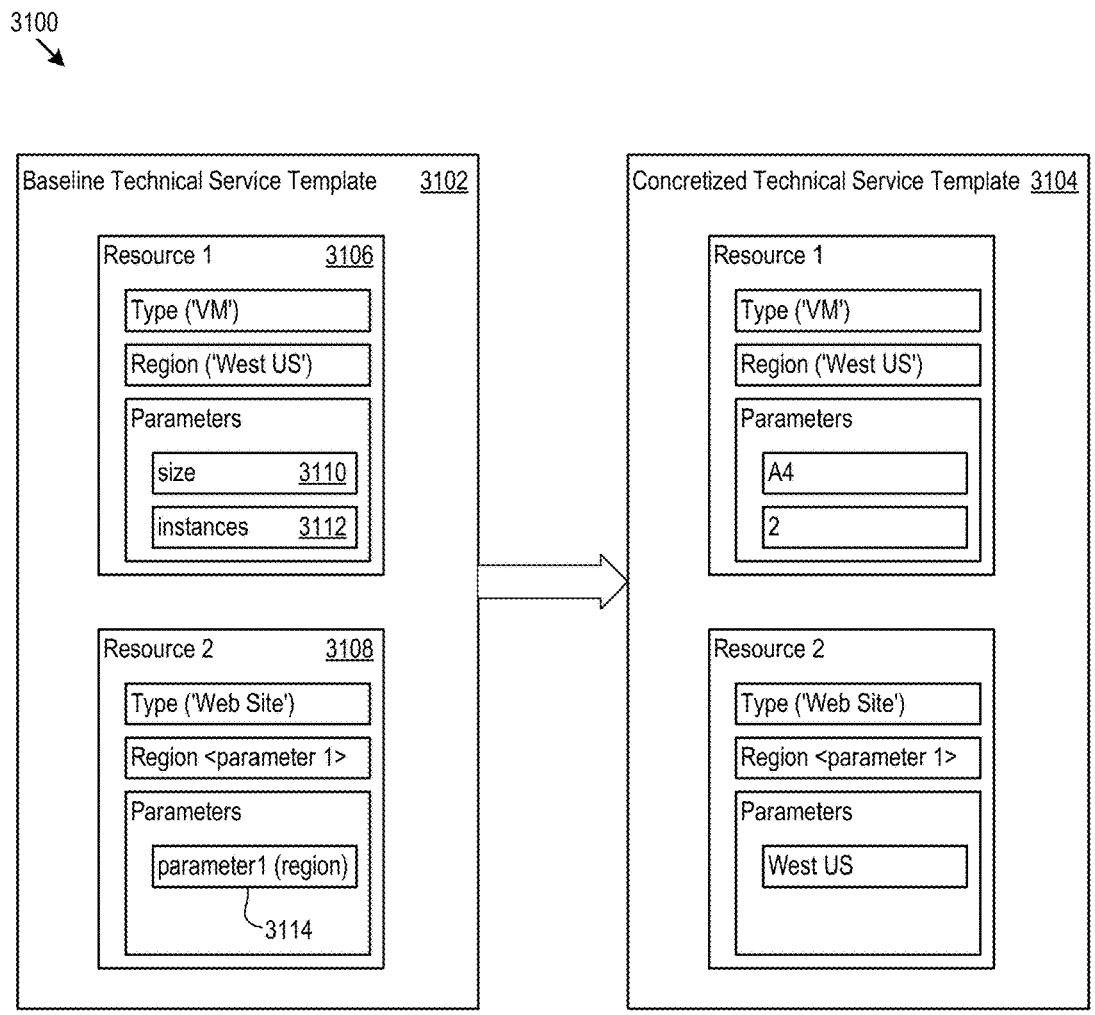
FIG. 31 shows an example baseline technical service template and a concretized technical service template.

FIG. 31 shows an example 3100 of a baseline technical service template 3102 and a concretized technical service template 3104. The baseline technical service template 3102 identifies resource types, parameters applicable to the resource types, placement specifications for the resource types, and optionally other parameters that describe and characterize a resource or set of resources supported by a service provider. In this example, the baseline service template 3102 defines two resources: a VM resource 3106 and a website resource 3108. Note that the baseline technical service template 3102 specifies that a VM resource 3106 is located in the West US region (the placement specification for the resource), and has a size parameter 3110 and instance parameter 3112 (the parameters that describe the VM resource). The website resource 3108 parameterizes its location via the region parameter 3114. Turning ahead briefly, FIG. 38 shows one of many examples of coding 3800 to define a VM resource in a baseline technical service template.

Returning to FIG. 31, the concretized technical service template 3104 specifies values for the parameters in the baseline technical service template 3102. In this example, the size of the VM resource is 'A4', which implies specific technical features to the service provider, e.g., number of processors and RAM, while the number of instances has been set to '2'. In the concretized technical service template 3104, the region parameter for the web site resource 3108 has been set to 'West US'.

Figure 32:
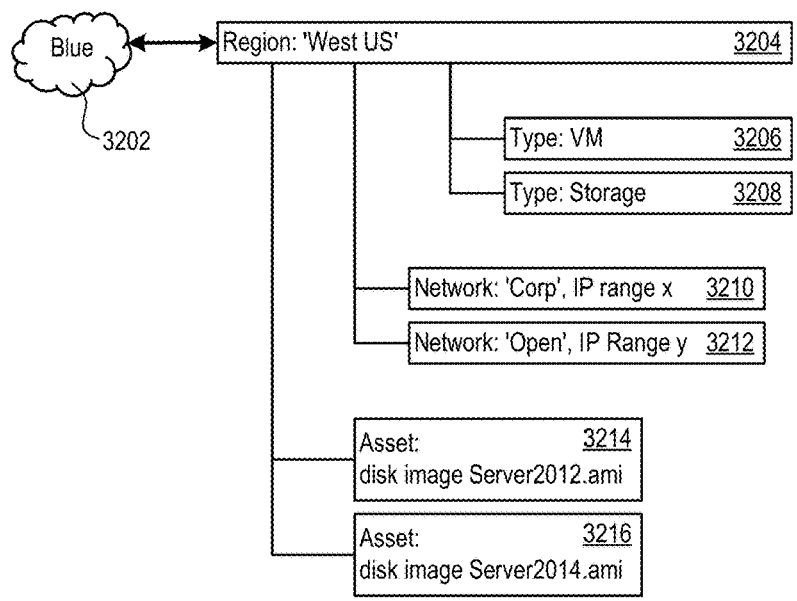
FIG. 32 provides an illustration of service provider metadata defining types, networks, and assets for a specific service provider.

FIG. 32 provides an illustration of service provider metadata 3200 defining types, networks, and assets for the Blue service provider 3202. In this example, the service provider metadata 3200 describes the West US region 3204. The service provider metadata 3200 establishes that the West US region 3204 supports: VM resources 3206 and storage resources 3208; a corporate network 3210 and an open network 3212; and assets including a 2012 server disk image 3214 and a 2014 server disk image 3216.

Figure 33:
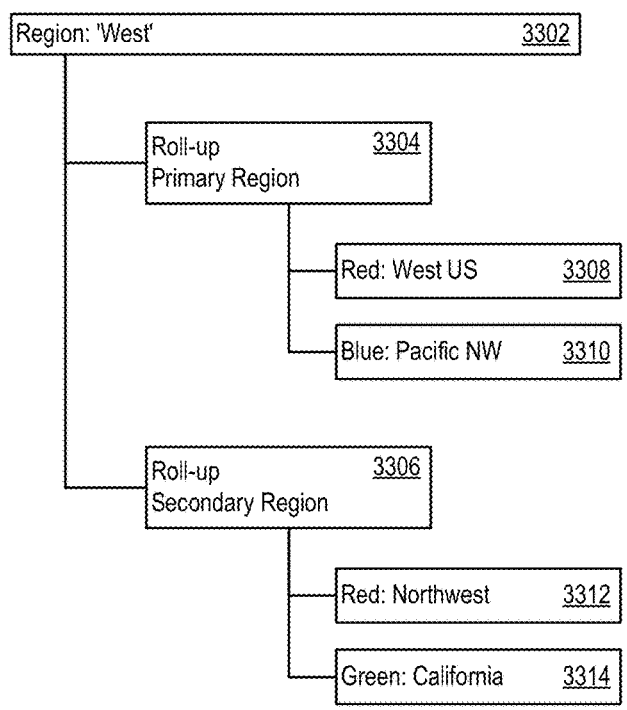
FIG. 33 shows an example region roll-up.

FIG. 33 shows an example of a region roll-up 3300. In this example, the top level West region 3302 defines two sub-region roll-ups, the primary region roll-up 3304 and the secondary region roll-up 3306. The primary region roll-up 3304 includes the Red provider 'West US' region 3308 and the Blue provider 'Pacific NW' region 3310. The secondary region roll-up 3306 includes the Red provider 'Northwest' region 3312 and the Green provider 'California' region 3314. With regard to the placement circuitry 118 and the TTT circuitry 116, regions under a common roll-up (e.g., the Northwest region 3312 and the California region 3314) are treated as equivalent regions, and the placement circuitry 118 and the TTT circuitry 116 may substitute one for another in terms of finding feasible placement locations.

Figure 34:
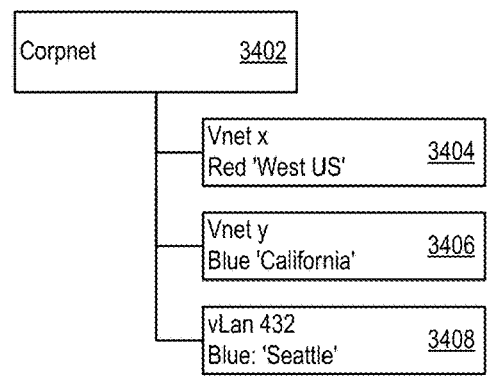
FIG. 34 shows an example network roll-up.

FIG. 34 shows an example network roll-up 3400. In this example, the network roll-up 3400 has defined three networks under the top level network 'Corpnet' 3402. The network equivalence processing discussed above with regard to the network pipeline stage 1226 may consider any of the Red West US network 3404, the Blue California network 3406, or the Blue Seattle network 3408 equivalent by virtue of their membership under the Corpnet network 3402. Accordingly, even if the specifically designated network, e.g., the Red West US network 3404, is not available, then placement options include those regions where any of the other networks are available, i.e., the Blue California network 3406 or the Blue Seattle network 3408.

Figure 35:
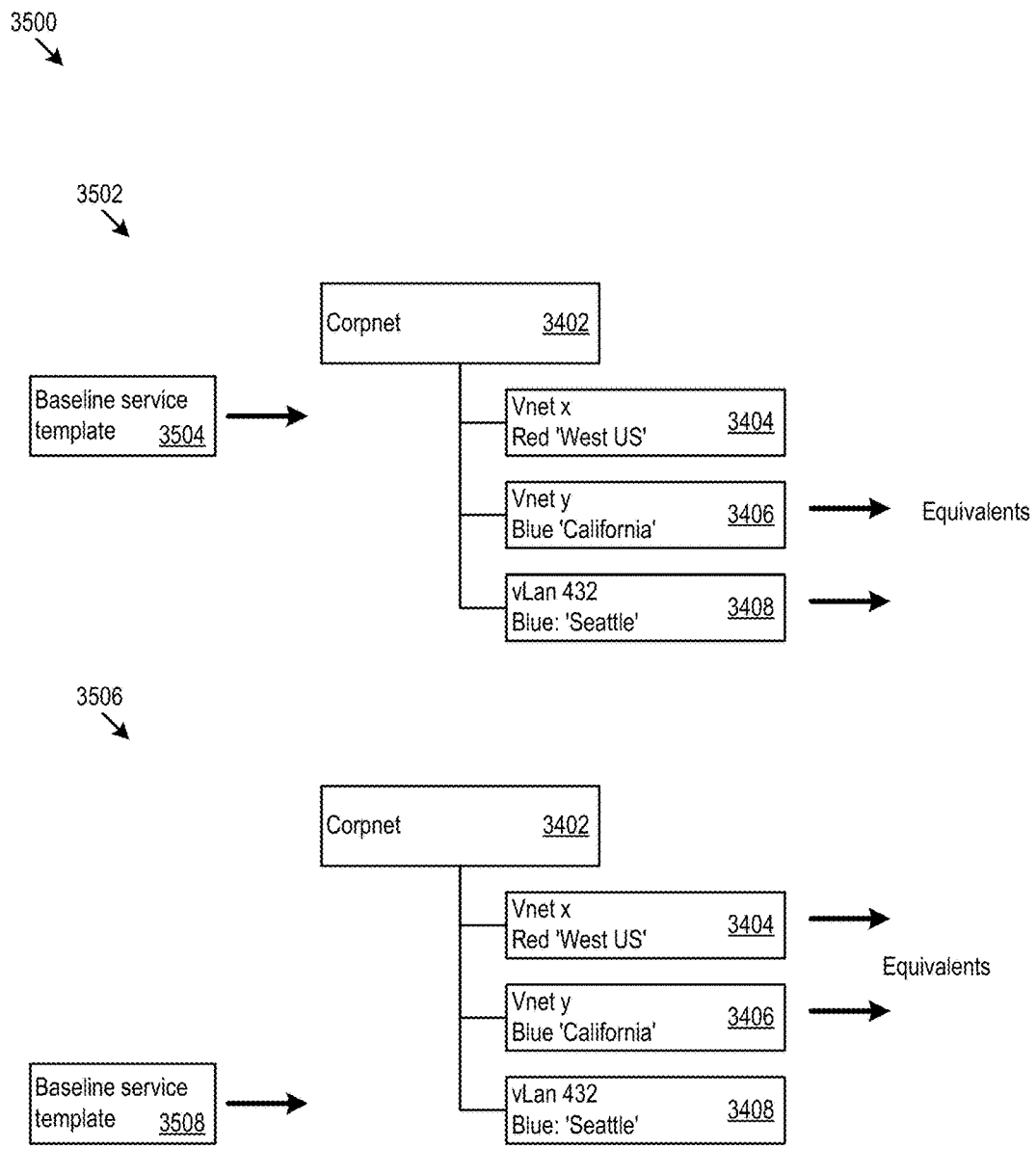
FIG. 35 shows an example of network equivalence.

FIG. 35 further illustrates network equivalence 3500. In the example 3502, the baseline service template 3504 specifies 'Vnet x as the network. The TTT circuitry 116 parses the network roll-up 3400 to find that any of the the Blue California network 3406, or the Blue Seattle network 3408 are equivalent and may be substituted, due to their inclusion under the Corpnet 3402 abstraction with 'Vnet x' 3404. In the example 3506, the baseline service template 3508 specifies 'vlan 432' as the network. Similarly, the TTT circuitry 116 parses the network roll-up 3400 to find that both the Red West US network 3404 and the Blue California network 3406 are equivalent and may be substituted.

Figure 36:
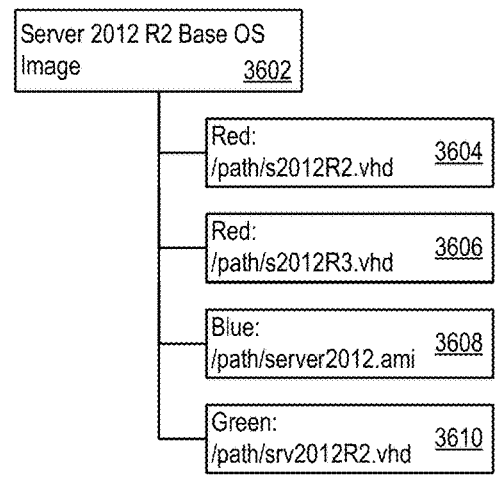
FIG. 36 shows an example asset roll-up.

FIG. 36 shows an example asset roll-up 3600. In this example, the asset roll-up 3600 has defined, as the top level asset, the disk image for the Server 2012 operating system 3602. The asset roll-up 3600 includes four alternative disk images: Red region, /path/s2012R2.vhd 3604; Red region, /path/s2012R3.vhd 3606; Blue region /path/server2012.ami 3608; and Green region /path/srv2012R2.vhd 3610. The asset equivalence processing discussed above considers a designation of the Server 2012 R2 Base OS Image 3602 satisfied by (e.g., equivalent to) the images 3604-3610.

Figure 37:
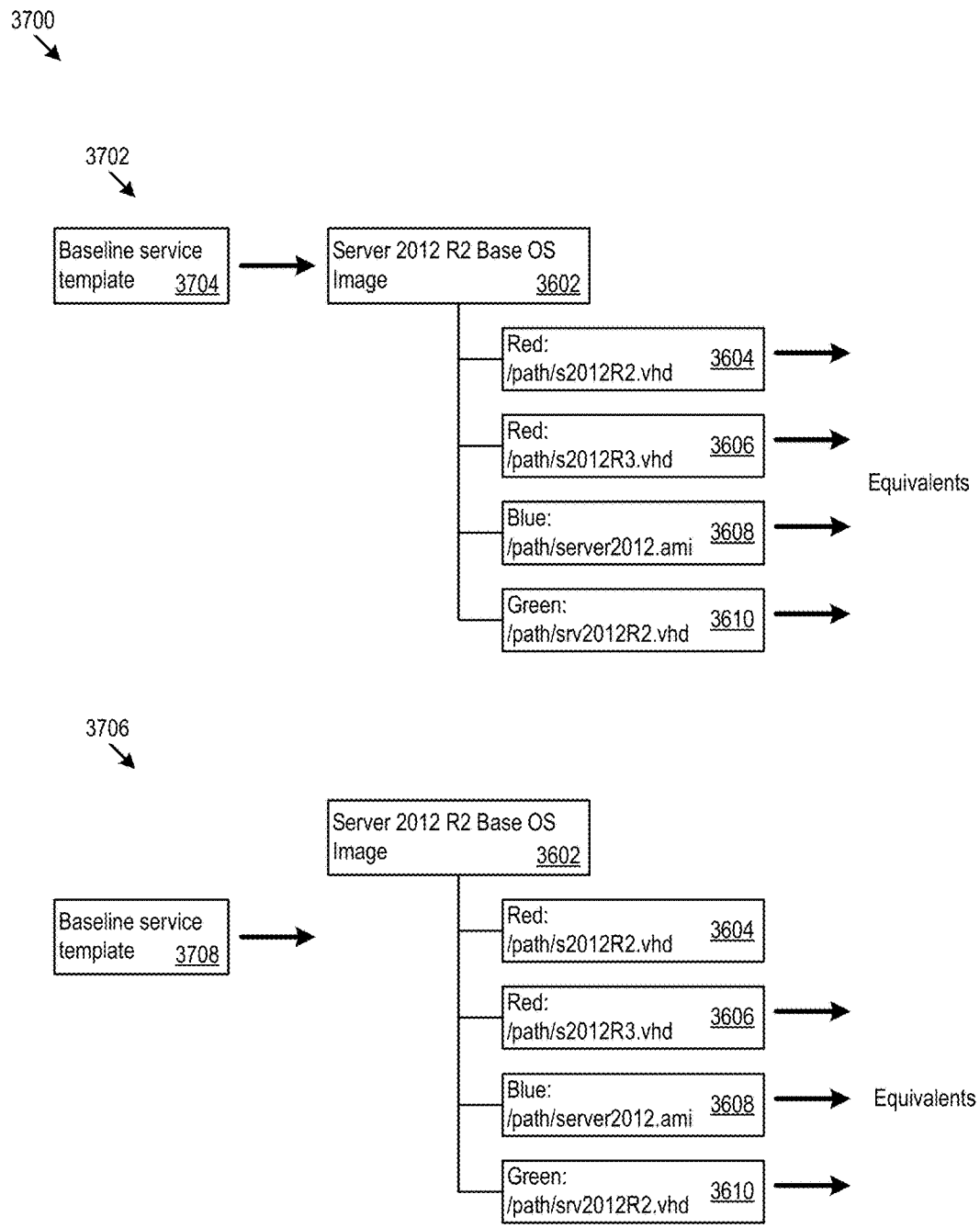
FIG. 37 shows an example of asset equivalence.

FIG. 37 further illustrates asset equivalence 3700. In the example 3702, the baseline service template 3704 specifies Server 2012 R2 Base OS Image 3602 as the baseline disk image. The TTT circuitry 116 parses the asset roll-up 3600 to find that any of the alternative disk images: Red region, /path/s2012R2.vhd 3604; Red region, /path/s2012R3.vhd 3606; Blue region /path/server2012.ami 3608; and Green region /path/srv2012R2.vhd 3610 are equivalent and may be substituted. In the example 3706, the baseline service template 3708 specifies the disk image Red region, /path/s2012R2.vhd 3604. Similarly, the TTT circuitry 116 parses the asset roll-up 3600 to find that Red region, /path/s2012R3.vhd 3606; Blue region /path/server2012.ami 3608; and Green region /path/srv2012R2.vhd 3610 are equivalent and may be substituted.

Provisioning Architecture with Template Aggregation

Figure 41:
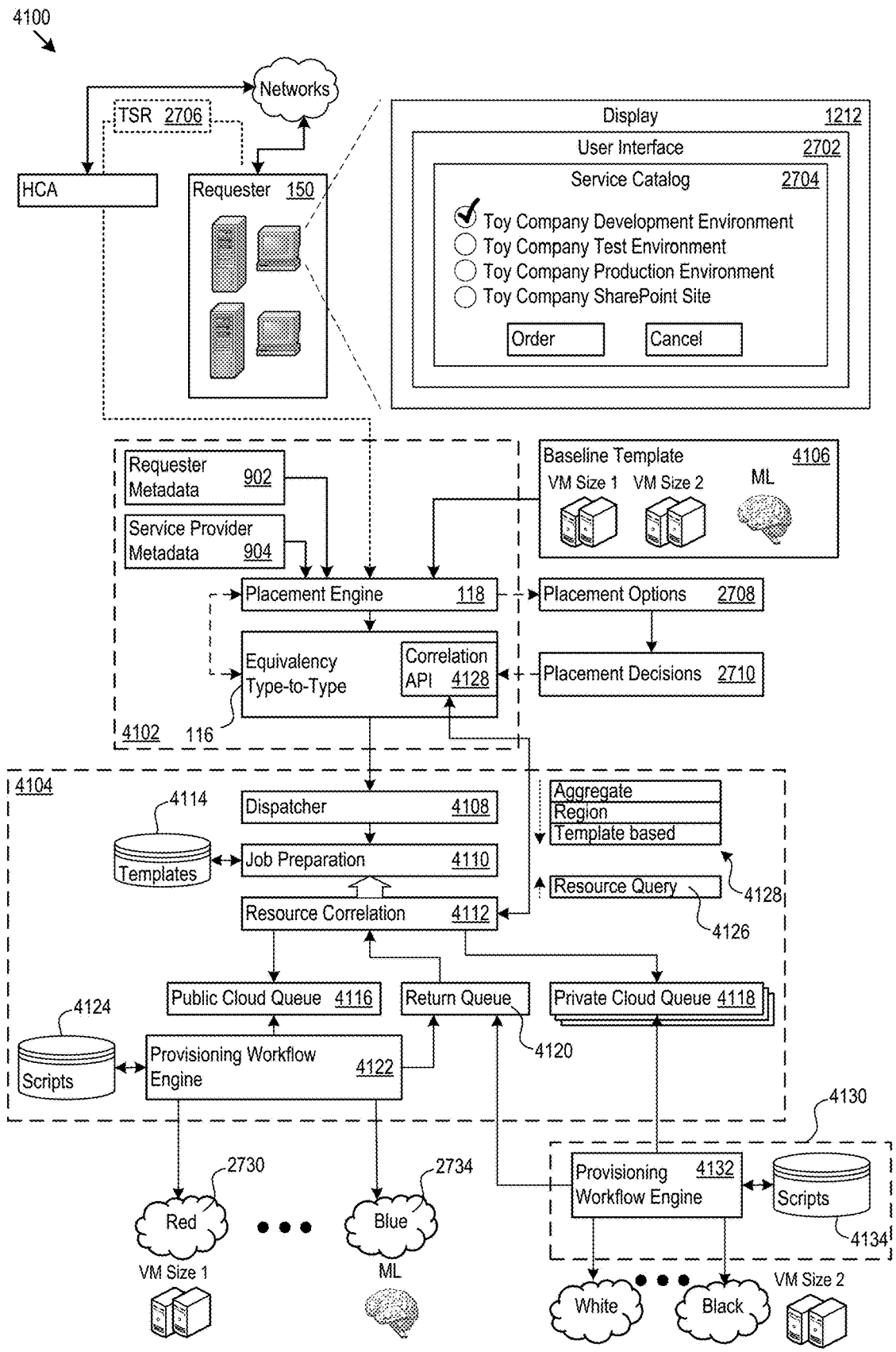
FIG. 41 shows a cloud resource provisioning architecture with template aggregation.
Figure 42:
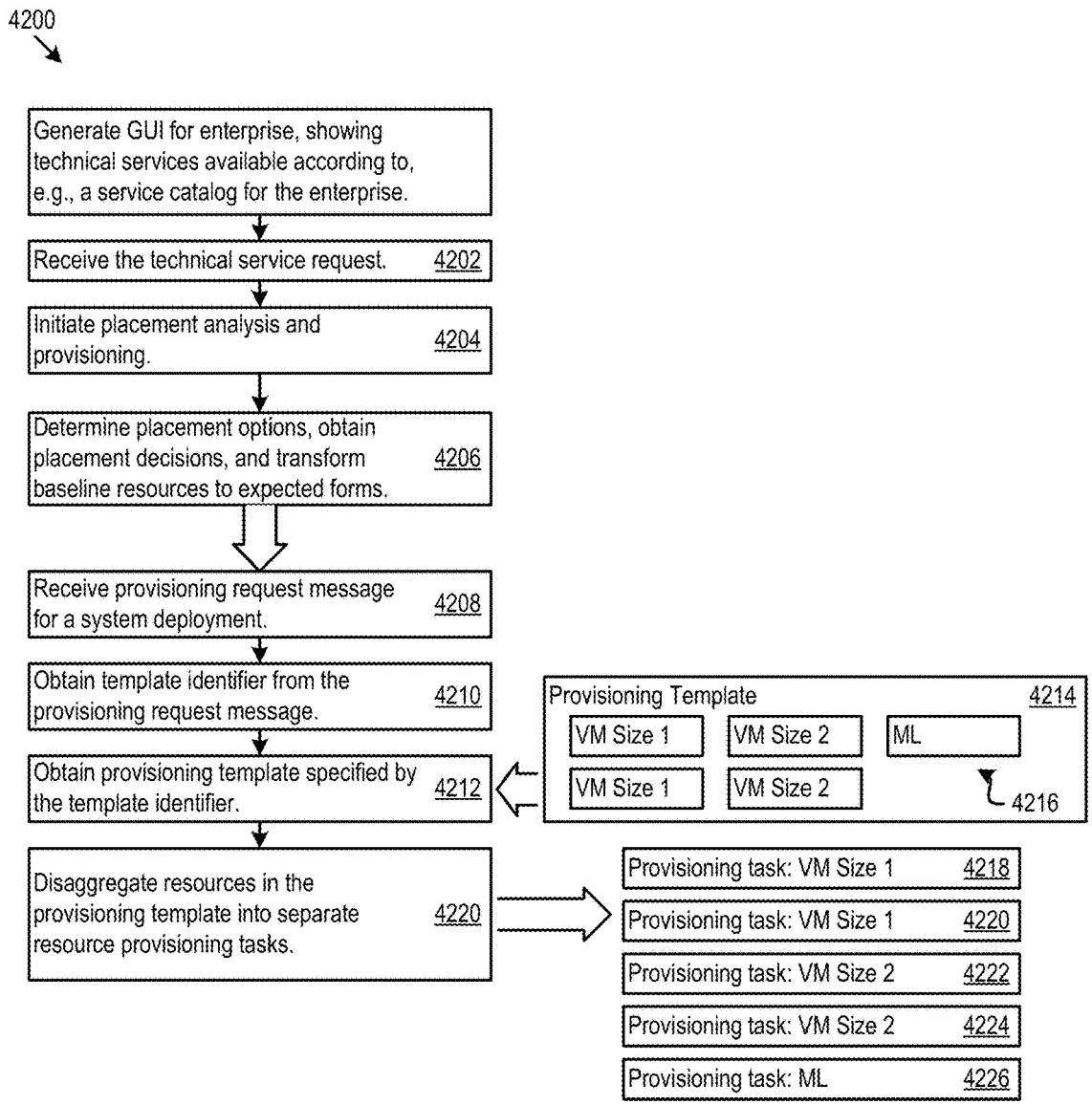
FIG. 42 shows a logical flow for a cloud resource provisioning architecture with template aggregation.
Figure 43:
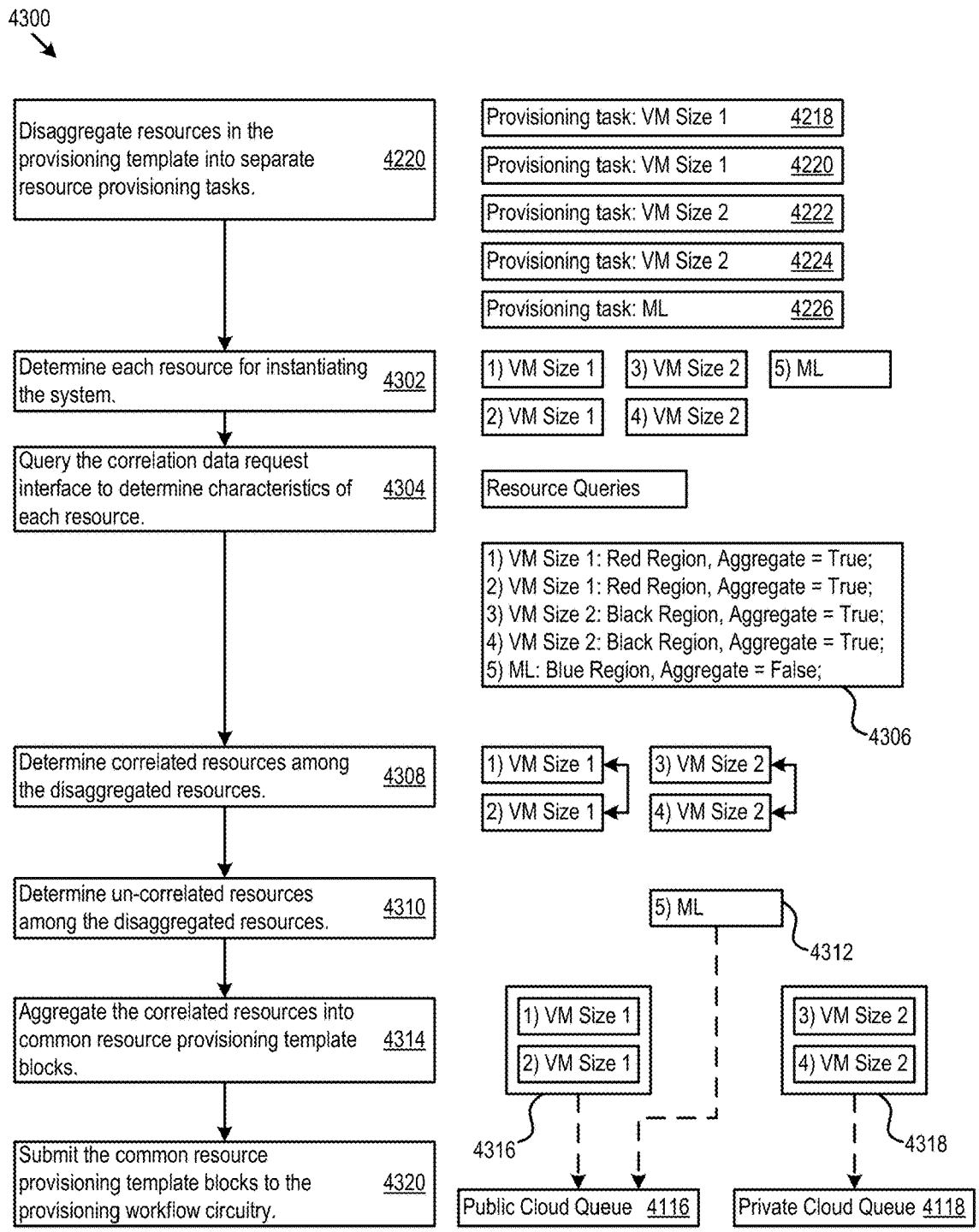
FIG. 43 shows an additional logical flow for a cloud resource provisioning architecture with template aggregation.
Figure 44:
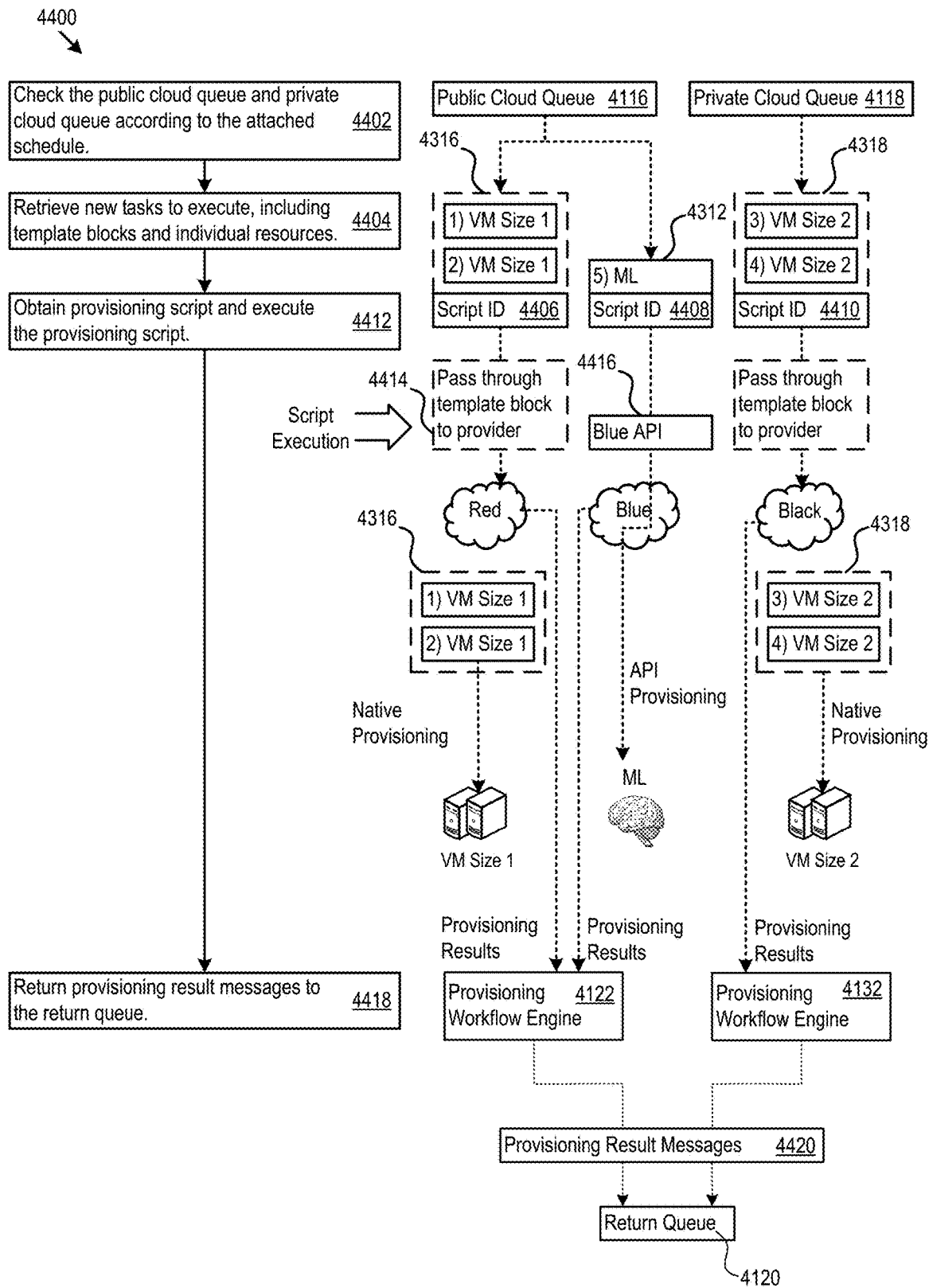
FIG. 44 shows an additional logical flow for a cloud resource provisioning architecture with template aggregation.

FIG. 41 shows a cloud resource provisioning architecture 4100 (architecture 4100) with template aggregation. This particular example of the architecture 4100 is divided, for purposes of explanation, into placement circuitry 4102 and provisioning circuitry 4104. Other implementations may vary widely. FIGS. 42, 43, and 44 show corresponding logical flows 4200, 4300, and 4400 that the architecture 4100 may implement.

The placement circuitry 4102 may operate as described above with respect to FIGS. 27, 28, 29, and 30, for example. For instance, the HCA 112 receives a technical service request (TSR) 2706 (4202) and initiates a placement analysis and provisioning (4204) for the resources in the corresponding baseline technical service template 4106 for the technical resource request 2706. As noted above, the placement analysis may include determining the placement options for the resources specified in the template, obtaining placement decisions for service provider regions from the resource requester 150, and executing TTT circuitry 116 to transform baseline resources to the form expected by the selected service provider regions (4206).

In this example, the TSR 2706 is for a development environment, and for the purposes of discussion below the corresponding baseline template 4106 specifies an instance of a Machine Learning (ML) service, and four VMs: Two of size 1 and two of size 2. It is also assumed that (whether through placement options selected by the resource requester 150, or due to other constraints) the two size 1 VMs will be placed in the Red service provider region 2730 (a public region), the two size 2 VMs will be placed in the Black service provider region 4108 (an on-premises region), and the ML instance will be placed in the Blue service provider region 2734 (a public region).

The provisioning circuitry 4104 in the architecture 4100 includes template dispatcher circuitry 4108, job preparation circuitry 4110, and resource correlation circuitry 4112. The job preparation circuitry 4110 communicates with a source of templates, such as the template database 4114. The templates follow a predefined format, for instance, the format of Azure Resource Management (ARM) templates, and specify the set of resources needed to instantiate the TSR 2706.

The resource correlation circuitry 4112 facilitates provisioning of resources to both public clouds and on-premises clouds. To that end, the provisioning circuitry 4104 includes a public cloud queue 4116, on-premises (private) cloud queues 4118, and a return queue 4120. In addition, the provisioning circuitry 4104 includes a public cloud provisioning workflow engine 4122, which is in communication with a source of provisioning scripts, such as the public cloud script database 4124.

As will be explained in more detail below, the resource correlation circuitry 4112 may issue resource queries 4126 to a source of resource information, such as the TTT circuitry 116. As examples, the resource queries may be made through a request interface, such as the correlation API 4128, or may be made as database management system queries. The request interface returns resource characteristics 4128 to the resource correlation circuitry 4112. Examples of resource characteristics 4128 include: the service provider region in which the resource will be placed, whether the resource may be aggregated together with other resources for provisioning, whether the resource is template deployable, and a script locator (e.g., a uniform resource indicator (URI)) that specifies a script that handles provisioning of the resource. The template deployability characteristic may specify whether the service provider region has the ability to natively deploy the resource, given a resource template that specifies the resource in the format defined by the specific service provider region. Not all resources are template deployable by the service provider region; in this example, the ML instance is not template deployable. Non-template deployable resources may be instantiated by calling specific pre-defined API functions exposed by the service provider region, to cause the service provider region to take the specific deployment actions needed to instantiate the resource.

FIG. 41 also shows an on-premises service provider 4130. The on-premises service provider 4130 locally handles provisioning of resources in the private on-premises environment. In support of local provisioning, the on-premises service provider 4130 includes a provisioning workflow engine 4132. The provisioning workflow engine 4132 is in communication with a source of provisioning scripts, such as the on-premises script database 4134. There may be any number of on-premises service providers 4130, and each may be in communication with a private cloud queue specific to that on-premises service provider. That is, the private cloud queues 4118 may define tenant specific queues for the on-premises service providers.

The job preparation circuitry 4110 is in communication with the template dispatcher circuitry 4108 and receives a provisioning request message for a system deployment (e.g., for the TSR 2706) from the template dispatcher circuitry 4108 (4208). The provisioning request message may be, or may include, a template identifier URI. The job preparation circuitry 4110 obtains the template identifier (4210), and retrieves a provisioning template specified by the template identifier for implementing the system deployment (4212). In that regard, for example, the URI may point to a specific provisioning template in the template database 4114.

To continue the example of the deployment of the development environment, FIG. 42 shows that the provisioning template 4214 specifies the set of resources included with the development environment. That is, the provisioning template 4214 includes resource specification sections 4216 that enumerate each of the resources in the development environment. In this case, the resource specification sections 4216 specify the characteristics for two VMs of size 1, two VMs of size 2, and instance of ML. The provisioning template 4214 may include any number and type of resources.

The job preparation circuitry 4110 disaggregates the resources in the provisioning template 4214 into separate resource provisioning tasks 4218, 4220, 4222, 4224, and 4226 for corresponding disaggregated resources (4220). That is, the job preparation circuitry 4110 prepares a separate provisioning task for each resource in the provisioning template 4214. The job preparation circuitry 4110 may assign correlation identifiers to each of the separate provisioning tasks 4218-4226. The correlation identifiers may identify the separate provisioning 4218-4226 tasks as belonging to the instantiation of the system requested by the TSR 2706.

The resource correlation circuitry 4112 communicates with the job preparation circuitry 4110, and determines each of the disaggregated resources for instantiating the requested system. In one implementation, the resource correlation circuitry 4112 receives and analyzes the separate provisioning tasks, or otherwise obtains an identification of each resource involved in the system deployment (FIG. 43, 4302). In the development environment example, the disaggregated resources are: 1) VM Size 1, 2) VM Size 1, 3) VM Size 2, 4) VM Size 2, and 5) ML.

The resource correlation circuitry 4112 queries the correlation data request interface (e.g., the correlation API 4128) to determine characteristics of each resource (4304). The resource characteristics provide information from which the resource correlation circuitry 4112 determines whether to aggregate resources. As examples, the characteristics may include the resource provider region for deployment of the resource, and whether the disaggregated resource may be aggregated with other resources for deployment. As another example, the characteristics may include the resource provider region for deployment of the resource, and whether the disaggregated resource is template deployable. The characteristics may also include a provisioning script identifier for each disaggregated resource for executing the provisioning steps for the resource.

As will be described further below, the resource correlation circuitry 4112 may communicate the provisioning script identifier to the public cloud queue 4116 for processing by the public cloud provisioning workflow engine 4122, or to the private cloud queue 4118 for processing by the on-premises provisioning workflow engine 4132. The provisioning script identifier may be or may specify a resource locator (e.g., a URI) for a provisioning script in a script repository in communication with the provisioning workflow circuitry.

For the development environment example, the resource characteristics 4306 that the correlation API 4128 returns to the resource correlation circuitry 4112 are:
1) VM Size 1: Red Region, Aggregate=True;
2) VM Size 1: Red Region, Aggregate=True;
3) VM Size 2: Black Region, Aggregate=True;
4) VM Size 2: Black Region, Aggregate=True; and
5) ML: Blue Region, Aggregate=False.

The resource correlation circuitry 4112 determines correlated resources among the disaggregated resources (4308). The resource correlation circuitry 4112 may apply any pre-defined correlation test to make this determination. For instance, the correlation test may be that disaggregated resources are correlated resources when they will be placed in a common resource provider region, and when each of the disaggregated resources is template deployable in the common resource provider region. As another example, the correlation test may be that disaggregated resources are correlated resources when they will be placed in a common resource provider region, and when the resource characteristics directly specify that the resource may be aggregated together.

For the development environment example, the two VMs of Size 1 are correlated. Also, the two VMs of Size 2 are correlated. The ML instance is un-correlated with any other resource because it has been flagged by the TTT circuitry 116 as a resource that cannot be aggregated, e.g., because that resource is not template deployable. That is, the resource correlation circuitry 4112 also determines the un-correlated resources among the disaggregated resources (4310).

The resource correlation circuitry 4112 aggregates sets of correlated resources into common resource provisioning template blocks (4314). For the development environment example, the two VMs of Size 1 are aggregated into a template block 4316 and the two VMs of Size 2 are aggregated into the template block 4318. The ML instance remains separate. The template blocks 4312 and 4314 may be single files, data structures, or other composite data entities that include resource characteristics and provisioning data for each resource aggregated into the template block.

The resource correlation circuitry 4112 submits the common resource provisioning template blocks to the provisioning workflow circuitry tasked with facilitating provisioning of the correlated resources (4320). For the development environment example, the resource correlation circuitry 4112 submits the VM Size 1 template block 4316 to the public cloud queue 4116, because these VMs will be placed in the Red service provider region, which is a public cloud region. For un-correlated resources, for which there is no template block, the resource correlation circuitry 4112 may submit a separate provisioning message to the provisioning workflow circuitry. For the development environment example, the resource correlation circuitry 4112 submits a provisioning message to the public cloud queue 4116 for the ML instance, for placement in the Blue public cloud service provider region.

Because the template block 4318 specifies resources for the Black on-premises service provider region, the resource correlation circuitry 4112 submits the template block 4318 to the private cloud queue 4118. Both the submission of a template block for correlated resources and the submission of a provisioning message for an un-correlated resource may include a provisioning script identifier. The provisioning script identifier may be, e.g., a URI into the script database 4124 or the script database 4134 that locates the particular provisioning script to run to cause deployment actions for the resource or template bock of resources.

The public cloud provisioning workflow engine 4122 and the on-premises provisioning workflow engine 4132 facilitate deployment of resources. The public cloud provisioning workflow engine 4122 may be implemented, as one example, as a C # .net component in an Azure web job, with an attached schedule. The on-premises provisioning workflow engine 4132 may be implemented as a Windows™ service running under Windows™ server, also operating under a schedule.

The public cloud provisioning workflow engine 4122 checks the public cloud queue 4116 according to the attached schedule (FIG. 44, 4402), and retrieves messages specifying new tasks to execute (4404). Similarly, the on-premises provisioning workflow engine 4132 connects to its tenant specific on-premises cloud queue 4118 to check for and retrieve messages specifying new tasks (4402, 4404). In that regard, the on-premises provisioning workflow engine 4132 is configured with the access credentials (e.g., login ID and password and encryption keys) to access its tenant specific queue.

As explained above, the tasks may be directed to deployment of multiple resources within a template block or to the deployment an individual resource. Each of the messages specifying a task may include a script identifier for a script that the particular provisioning workflow engine will execute to provision the resources. FIG. 44 shows an example script identifier 4406 attached to the template block 4316, a script identifier 4408 attached to the provisioning message 4312, and a script identifier 4410 attached to the template block 4318. The provisioning workflow engines 4122 and 4132 obtain the provisioning script (e.g., from the script database 4124 and 4134) and execute the script (4412).

In the example implementation discussed above, one condition for creating the template blocks was that the individual resources in the template block were template provisionable by the host service provider region. As such, the provisioning script for template blocks may be a pass-through execution instruction 4414 that forwards the template block to the resource provider region, with a provisioning request or instruction to the resource provider region to natively instantiate the correlated resources specified in the template block. The provisioning script for uncorrelated resources, however, may call service providers interfaces (e.g., the Blue interface API 4416) to invoke the specific functions made available by the service provider to instantiate resources.

The on-premises provisioning workflow engine 4132 and the public provisioning workflow engine 4122 save, in the return queue 4120, provisioning result messages 4420 that specify completions, failures, error conditions, or any other result information for the resource provisioning actions (4418). The return queue 4120 makes the result messages available for tracking status of resource provisioning requests back through the provisioning chain, to the resource correlation circuitry 4112, job preparation circuitry 4110, and dispatcher circuitry 4108. In that regard, the result messages may include a correlation identifier that identifies to which resources the result messages apply.

Expressed another way: a cloud resource provisioning architecture with template aggregation includes template dispatcher circuitry configured to prepare a provisioning request message. The provisioning request message includes a template identifier of a provisioning template that specifies implementation of a first resource and a second resource. The template dispatcher circuitry submits the provisioning request message to job preparation circuitry to initiate provisioning of the first resource and second resource.

Job preparation circuitry in communication with the template dispatcher circuitry receives the provisioning request message from the template dispatcher circuitry and obtains the template identifier from the provisioning request message. The job preparation circuitry also retrieves the provisioning template specified by the template identifier, the provisioning template specifying implementation for both the first resource and the second resource. The job preparation circuitry disaggregates the first resource from the second resource, by preparing separate resource provisioning tasks for the first resource and the second resource.

Resource correlation circuitry in communication with the job preparation circuitry queries a resource service (e.g., the correlation API 4128) on the first resource and obtains a first service provider region identifier and a first aggregation indicator. The resource correlation circuitry also queries the resource service on the second resource and obtains a second service provider region identifier and a second aggregation indicator. The resource correlation circuitry determines that the first service provider region identifier and the second service provider region identifier both identify a common service provider region, determines that the first aggregation indicator is True, determines that the second aggregation indicator is True, and then aggregates the first resource and the second resource into a common resource provisioning template block. The resource correlation circuitry also submits the common resource provisioning template block to workflow provisioning circuitry tasked with facilitating provisioning of the correlated resources.

The cloud resource provisioning architecture also includes tenant-specific queues for on-premises cloud regions. The tenant-specific queues are configured for secure access by on-premises cloud regions through access credentials specific to a given on-premises cloud region. The cloud resource provisioning architecture also includes a public cloud queue for a public cloud region. The public cloud region is configured to allow access by a provisioning workflow circuitry that communicates provisioning instructions to multiple different public cloud service providers.

The resource correlation circuitry is further configured to route the common resource provisioning template block to the public cloud queue for retrieval by the public cloud provisioning workflow circuitry, when the common service provider region is the public cloud region. The resource correlation circuitry is also configured to route the common resource provisioning template block to the tenant-specific queue for retrieval by the on-premises cloud region, when the common service provider region is the on-premises cloud region.

Expressed yet another way, the dispatcher circuitry 4108 calls the job preparation circuitry 4110 to initiate deployment of a resource set. The dispatcher circuitry 4108 may, e.g., call a method defined by the job preparation circuitry 4110 and pass a URI to the template that contains deployment instructions.

The job preparation circuitry 4110 uses the URI to retrieve the template, e.g., from the template database 4114. The job preparation circuitry 4110 breaks the template down (disaggregates them) into a series of tasks. For instance, each resource may have its own task for individual execution, e.g., by an automation script or runbook written for the resource type.

The resource correlation circuitry 4112 re-aggregates resources based on predefined correlation criteria. Multiple resources may be combined into template blocks of correlated resources. The resource correlation circuitry 4112 also decides whether the resources will be placed in a public cloud region or an on-premises region, based on the region resource characteristic associated with each resource. As noted above, there are tenant specific private cloud queues for on-premises regions and public cloud queues for public regions. That is, the resource correlation circuitry 4112 re-aggregates individual resources into a larger template (a template block), which are passed into the cloud queue as a queued item. The provisioning workflow engines read the messages on their queues and determine that they specify provisioning action. The provisioning workflow engines retrieve a script for that action, and the input data for the script includes the template.

The script, e.g., a PowerShell script, performs the deployment. For public cloud deployment using a template block, one advantage is that the public cloud provisioning workflow circuitry 4122 need not make calls to native APIs to deploy the resources. Instead, the workflow circuitry 4122 passes the template block through to the service provider, and requests the service provider to use its native templating ability to cause instantiation of the resources in the template block. This avoids an implementation in which there are many different scripts to write and maintain for each type of resource, and also avoids executing multiple scripts when resources can be combined into a template block. Instead, the workflow circuitry 4122 passes the template block through to the native provider deployment process.

In one implementation, the resource correlation circuitry 4122 obtains resource characteristics from the TTT circuitry 116. That is, the TTT circuitry 116 may be extended to store and define (e.g., in the type databases 230) whether a type can be aggregated, and a script to execute for deploying a template block that includes the resource type. If the resource cannot be aggregated, then the resource correlation circuitry 4122 keeps the resource separate, and sends a separate deployment message for that uncorrelated resource to the cloud queue. One test for setting the aggregate flag to true for a given type is that the service provider can natively deploy the resource given a template for it.

Figure 45:
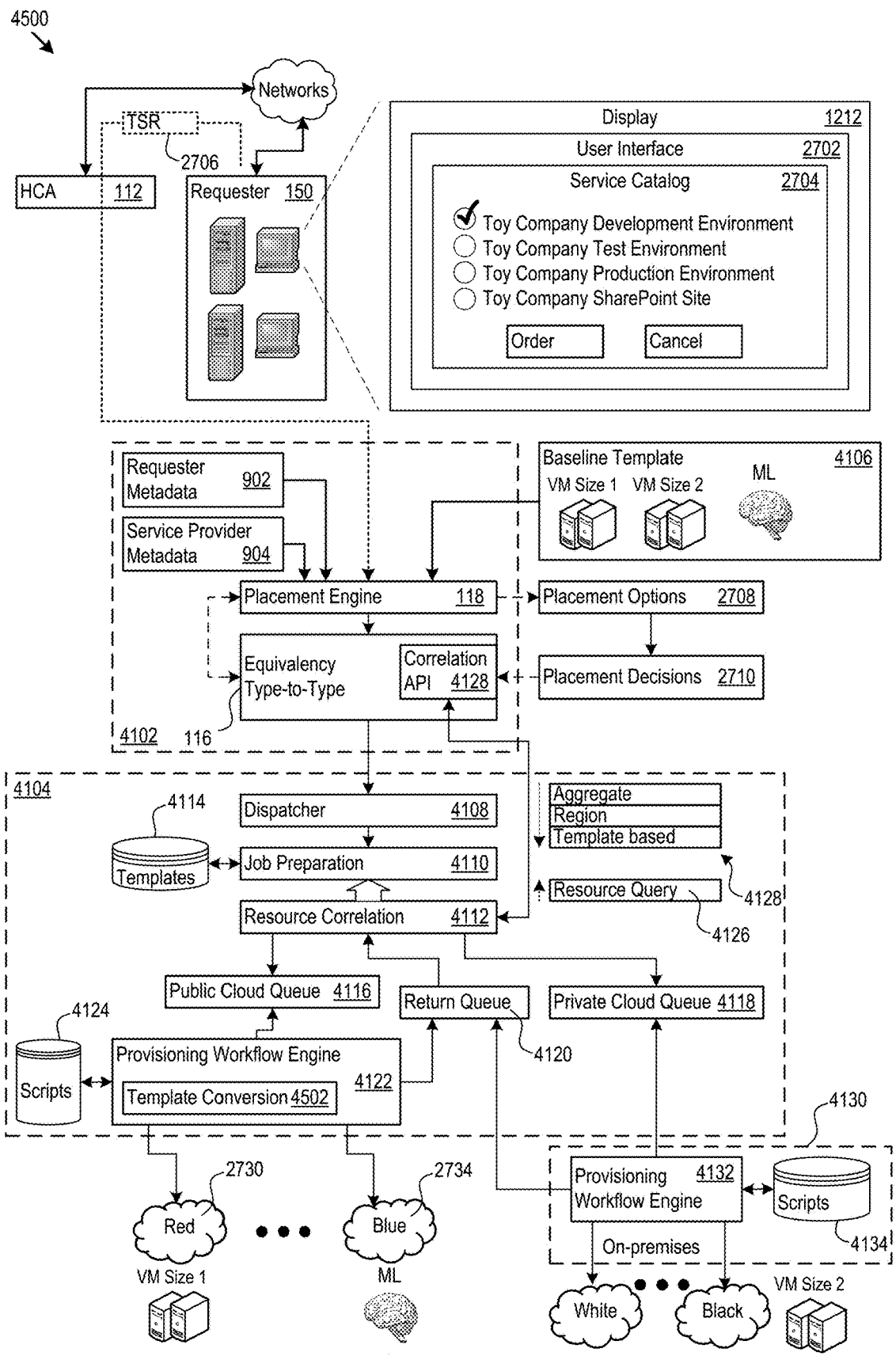
FIG. 45 shows another example of a cloud resource provisioning architecture with template aggregation.

The cloud resource provisioning architecture may work internally with templates having a given format. For instance, the architecture may internally use Azure Resource Manager (ARM) templates for specifying resources to deploy individually or in a template block. The provisioning workflow engines 4122 and 4132 may deploy to regions hosted by many different service providers. In some implementations, the provisioning workflow engines 4122 and 4132 may include template conversion circuitry, e.g., the template conversion circuitry 4502 shown in FIG. 45.

The template conversion circuitry 4502 converts the internal template format, e.g., ARM templates, to the format used by the service provider where the resources will be deployed when the formats are incompatible. For instance, the template conversion circuitry 4502 may convert ARM templates to cloud formation templates (CFTs), or any other template format. The TTT circuitry 116 may provide the translation, e.g., by converting resource types, such as an Azure VM, between service providers, e.g., to an Amazon Web Services VM.

In the return direction, the provisioning workflow circuitry retrieves provisioning messages saved on the cloud queues 4116 and 4118 by the resource correlation circuitry 4112. The provisioning messages specify what script the provisioning workflow circuitry should run, and what the data payload is. The provisioning workflow circuitry retrieves the script, passes the data payload to the script, and runs the script. The provisioning workflow circuitry need not know whether the data payload is a template block, or a specifier of an individual resource.

On the other hand, the resource correlation circuitry 4122 knows whether it has built a template block, and creates the provisioning message to give the instructions to the provisioning workflow engine to execute a specific script for the resource type. As noted above, the TTT circuitry 116 may be extended to include, as just one example set of resource characteristics: 1) whether the resource type may be aggregated; 2) if it can be aggregated then the URI of a script used to deploy a template block for a given service provider region; and 3) if the resource type cannot be aggregated, then the script for deploying the resource type as an uncorrelated resource.

For a template deployable resource, the script may simply pass the template block to the service provider, and instruct the service provider to instantiate the resources in the template block. In that respect, the template block may specify a single resource or multiple resources, each of which is template deployable by a given service provider region. The resource correlation circuitry 4112 may specify native service provider deployment for even a single resource, by passing the template for the resource to the service provider, and requesting the service provider to perform its native instantiation service on the template. For non-template enabled resources, the provisioning script may specify a sequence of calls to the native APIs of the service provider to provision the resource.

Note that even on-premises regions may deploy resources based on template blocks. For instance, an on-premises version of Azure Stack™ for software defined infrastructure may provide template deployment functionality. Other template interpreters may be implemented to provide on-premises template deployment functionality.

The provisioning workflow circuitry 4122 and 4132 pass return messages to the return queue 4120. The resource correlation circuitry 4112 monitors the return queue 4120 to determine that the specified provisioning actions have completed or failed. The return messages may include a correlation identifier. The resource correlation circuitry 4112 pulls return messages off of the return queue 4120, and sends them to the job preparation circuitry 4110 to inform the job preparation circuitry 4110 that the deployment associates with the correlation identifier is completed or failed. That is, the job preparation circuitry 4110 tracks when each resource is deployed, and when all resources in a specific deployment are completed. The dispatcher circuitry 4108 polls the job preparation circuitry 4110 to determine when the whole deployment is complete or has failed, and provides that status information back to the rest of the architecture.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways.

Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

The invention claimed is:

1. A system comprising:
template dispatcher circuitry;
job preparation circuitry in communication with the template dispatcher circuitry, the job preparation circuitry configured to:
  receive a provisioning request message for a system deployment from the template dispatcher circuitry, the system deployment including aggregated deployment of multiple virtual machines;
  obtain a template identifier from the provisioning request message;
  obtain a provisioning template specified by the template identifier for implementing the system deployment, the provisioning template providing a single resource provisioning task for the aggregate deployment of the multiple virtual machines; and
  disaggregate individual ones of the multiple virtual machines in the provisioning template into separately queueable resource provisioning tasks for corresponding disaggregated individual ones of the multiple virtual machines; and
resource correlation circuitry in communication with the job preparation circuitry, the resource correlation circuitry configured to:
  determine, based on one or more characteristics of individual ones of the multiple virtual machines and using a pre-defined correlation test, correlated virtual machines among the disaggregated individual ones of the multiple virtual machines;
  re-aggregate the correlated virtual machines into a common resource provisioning template block for provisioning the correlated virtual machines together on a cloud queue as a single queued item; and
  submit the common resource provisioning template block to provisioning workflow circuitry that handles provisioning of the correlated virtual machines.

2. The system of claim 1, where:
the resource correlation circuitry is further configured to:
  determine un-correlated virtual machines among the disaggregated individual ones of the multiple virtual machines; and
  for each of the un-correlated virtual machines, submit a separate provisioning message to the provisioning workflow circuitry.

3. The system of claim 1, where:
the resource correlation circuitry is configured to determine that disaggregated individual ones of the multiple virtual machines are correlated virtual machines when they have a common resource provider region specifier.

4. The system of claim 1, where:
the resource correlation circuitry is configured to determine that disaggregated individual ones of the multiple virtual machines are correlated virtual machines when they will be placed in a common resource provider region, and when each of the disaggregated individual ones of the multiple virtual machines is template deployable in the common resource provider region.

5. The system of claim 4, further comprising:
a correlation application programming interface (API) to resource information circuitry, the correlation API defining a correlation data request interface; and
where the resource correlation circuitry is configured to query the correlation data request interface to determine:
  whether the disaggregated individual ones of the multiple virtual machines will be placed in the common resource provider region; and
  whether the disaggregated individual ones of the multiple virtual machines are template deployable in the common resource provider region.

6. The system of claim 5, where:
the resource correlation circuitry is further configured to query the correlation data request interface for a provisioning script identifier; and
communicate the provisioning script identifier to the provisioning workflow circuitry with the common resource provisioning template block.

7. The system of claim 6, where:
the provisioning script identifier comprises a resource locator for a provisioning script in a script repository in communication with the provisioning workflow circuitry.

8. The system of claim 7, where:
the provisioning script comprises a pass-through execution instruction configured to pass the common resource provisioning template block to the common resource provider region, and communicate a provisioning instruction to the common resource provider region to natively instantiate the correlated virtual machines specified in the common resource provisioning template block.

9. The system of claim 1, further comprising:
a return queue configured to receive a provisioning result message from the provisioning workflow circuitry; and
where the resource correlation circuitry is configured to receive the provisioning result message and provide the provisioning result message to the job preparation circuitry.

10. A system comprising:
template dispatcher circuitry configured to:
prepare a provisioning request message comprising a template identifier of a provisioning template specifying implementation of a first virtual machine aggregated with implementation of a second virtual machine; and
submit the provisioning request message to initiate provisioning of the first virtual machine and second virtual machine;
job preparation circuitry in communication with the template dispatcher circuitry, the job preparation circuitry configured to:
receive the provisioning request message from the template dispatcher circuitry;
obtain the template identifier from the provisioning request message;
retrieve the provisioning template specified by the template identifier, the provisioning template specifying implementation for both the first virtual machine and the second virtual machine, the provisioning template providing a single resource provisioning task for aggregated deployment of the first and second virtual machines; and
disaggregate the first virtual machine from the second virtual machine, by preparing separately queueable resource provisioning tasks for the first virtual machine and the second virtual machine; and
resource correlation circuitry in communication with the job preparation circuitry, the resource correlation circuitry configured to:
query a resource service on the first virtual machine and obtain a first service provider region identifier and a first aggregation indicator;
query the resource service on the second virtual machine and obtain a second service provider region identifier and a second aggregation indicator;
determine that the first service provider region identifier and the second service provider region identifier both identify a common service provider region;
determine that the first aggregation indicator is True;
determine that the second aggregation indicator is True;
responsive to the first and second aggregation flags being determined to be True, determine that aggregation is allowed;
after determining aggregation is allowed, re-aggregate the first virtual machine and the second virtual machine into a common resource provisioning template block for provisioning the first and second virtual machines together on a cloud queue as a single queued item; and
submit the common resource provisioning template block to provisioning workflow circuitry tasked with facilitating provisioning of the correlated first and second virtual machines.

11. The system of claim 10, further comprising:
a tenant-specific queue for an on-premises cloud region, the tenant-specific queue configured for secure access by the on-premises cloud region through access credentials specific to the on-premises cloud region;
a public cloud queue for a public cloud region, the public cloud queue configured to allow access by public cloud provisioning workflow circuitry that communicates provisioning instructions to multiple different public cloud service providers; and
where the resource correlation circuitry is further configured to:
route the common resource provisioning template block to the public cloud queue for retrieval by the public cloud provisioning workflow circuitry, when the common service provider region is the public cloud region; and
route the common resource provisioning template block to the tenant-specific queue for retrieval by on-premises cloud provisioning workflow circuitry, when the common service provider region is the on-premises cloud region.

12. A method comprising:
in a multi-cloud provisioning machine:
with job preparation circuitry:
receiving a provisioning request message for a system deployment from template dispatcher circuitry, the system deployment including aggregated deployment of multiple virtual machines;
obtaining a template identifier from the provisioning request message;
obtaining a provisioning template specified by the template identifier for implementing the system deployment, the provisioning template providing a single resource provisioning task for the aggregate deployment of the multiple virtual machines; and
disaggregating individual ones of the multiple virtual machines in the provisioning template into separately queueable resource provisioning tasks for corresponding disaggregated the individual ones of the multiple virtual machines; and
with resource correlation circuitry:
determining, based on one or more characteristics of individual ones of the multiple virtual machines and using a pre-defined correlation test, correlated virtual machines among the disaggregated individual ones of the multiple virtual machines;
re-aggregating the correlated virtual machines into a common resource provisioning template block for provisioning the correlated virtual machines together on a cloud queue as a single queued item; and submitting the common resource provisioning template block to provisioning workflow circuitry for carrying out provisioning of the correlated resources.

13. The method of claim 12, further comprising:

with the resource correlation circuitry:

determining un-correlated virtual machines among the disaggregated individual ones of the multiple virtual machines; and submitting a separate provisioning message to the provisioning workflow circuitry for each of the un-correlated virtual machines.

14. The method of claim 12, further comprising:

with the resource correlation circuitry:

determining that disaggregated individual ones of the multiple virtual machines are correlated virtual machines when they are implemented in a common resource provider region.

15. The method of claim 12, further comprising:

with the resource correlation circuitry:

determining, as the correlated virtual machines, those disaggregated individual ones of the multiple virtual machines to be placed in a common resource provider region and that are template deployable in the common resource provider region.

16. The method of claim 15, further comprising:

with the resource correlation circuitry:

querying a correlation data request interface to determine:

whether the disaggregated individual ones of the multiple virtual machines will be placed in the common resource provider region; and whether the disaggregated individual ones of the multiple virtual machines are template deployable in the common resource provider region.

17. The method of claim 16, further comprising:

with the resource correlation circuitry:

querying the correlation data request interface for a provisioning script identifier; and communicating the provisioning script identifier to the provisioning workflow circuitry with the common resource provisioning template block.

18. The method of claim 17, further comprising:

receiving a resource locator as the provisioning script identifier, the resource locator pointing to a provisioning script in a script repository in communication with the provisioning workflow circuitry.

19. The method of claim 18, further comprising:

executing the provisioning script to pass the common resource provisioning template block to the common resource provider region; and communicating a provisioning instruction to the common resource provider region to request the common resource provider region to natively instantiate the correlated virtual machines specified in the common resource provisioning template block.

20. The method of claim 12, further comprising:

receiving, in a return queue, a provisioning result message from the provisioning workflow circuitry; and passing the provisioning result message to the job preparation circuitry.

\* \* \* \* \*